(12) United States Patent
Agiwal et al.

(10) Patent No.: US 10,455,415 B2
(45) Date of Patent: Oct. 22, 2019

(54) METHOD FOR SECURING DISCOVERY INFORMATION AND DEVICE THEREFOR

(71) Applicant: Samsung Electronics Co., Ltd., Suwon-si, Gyeonggi-do (KR)

(72) Inventors: Anil Agiwal, Bangalore (IN); Rajavelsamy Rajadurai, Bangalore (IN); Youngbin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 15/024,563

(22) PCT Filed: Sep. 26, 2014

(86) PCT No.: PCT/KR2014/009060
§ 371 (c)(1),
(2) Date: Mar. 24, 2016

(87) PCT Pub. No.: WO2015/046975
PCT Pub. Date: Apr. 2, 2015

(65) Prior Publication Data
US 2016/0242029 A1 Aug. 18, 2016

(30) Foreign Application Priority Data

Sep. 27, 2013 (KR) .................... 10-2013-0115737
Feb. 11, 2014 (KR) .................... 10-2014-0015699
May 2, 2014 (KR) .................... 10-2014-0053560

(51) Int. Cl.
*H04W 4/00* (2018.01)
*H04W 12/04* (2009.01)
(Continued)

(52) U.S. Cl.
CPC ............ *H04W 12/04* (2013.01); *G06F 21/35* (2013.01); *G06F 21/43* (2013.01); *H04L 9/08* (2013.01);
(Continued)

(58) Field of Classification Search
CPC ....... H04W 12/06; H04W 12/08; H04W 4/80; H04W 8/005
See application file for complete search history.

(56) References Cited

U.S. PATENT DOCUMENTS

2003/0177374 A1* 9/2003 Yung ...................... H04L 47/10
713/189
2007/0070973 A1* 3/2007 Kazmi ................. H04B 7/2693
370/350
(Continued)

FOREIGN PATENT DOCUMENTS

CN 1703023 A 11/2005
CN 102812688 A 12/2012
(Continued)

OTHER PUBLICATIONS

Motorola Solutions, Solution for identifiers used in ProSe Direct Discovery, 3GPP TSG-SA WG2 #98 S2-132862, Jul. 18, 2013.
(Continued)

*Primary Examiner* — Omoniyi Obayanju
(74) *Attorney, Agent, or Firm* — Jefferson IP Law, LLP

(57) ABSTRACT

The present invention relates to a method and a system for securing discovery information being transmitted through a direct radio signal in a wireless communication system which supports a device-to-device service, and a device-to-device communication method of a transmission terminal, according to one embodiment of the present invention, can comprise the steps of: synchronizing with a discovery resource cycle number; determining discovery channel logi-
(Continued)

cal timing information of a discovery physical channel through which discovery information is to be transmitted; generating security information by using a security key, the determined discovery channel logical timing information and the discovery information to be transmitted; and transmitting the discovery information including the security information through the discovery physical channel. According to one embodiment of the present invention, it is possible to prevent discovery information of a terminal to be wrongly transmitted due to a case where another rogue terminal receives and changes the discovery information of the terminal, or the like.

18 Claims, 42 Drawing Sheets

(51) Int. Cl.

| | | |
|---|---|---|
| *H04W 4/50* | (2018.01) | |
| *G06F 21/35* | (2013.01) | |
| *G06F 21/43* | (2013.01) | |
| *H04L 9/12* | (2006.01) | |
| *H04W 12/12* | (2009.01) | |
| *H04L 29/06* | (2006.01) | |
| *H04W 48/10* | (2009.01) | |
| *H04W 76/14* | (2018.01) | |
| *H04L 9/08* | (2006.01) | |
| *H04W 8/00* | (2009.01) | |
| *H04W 12/10* | (2009.01) | |

(52) U.S. Cl.
CPC .............. *H04L 9/0872* (2013.01); *H04L 9/12* (2013.01); *H04L 63/062* (2013.01); *H04W 4/50* (2018.02); *H04W 8/005* (2013.01); *H04W 12/10* (2013.01); *H04W 12/12* (2013.01); *H04W 48/10* (2013.01); *H04W 76/14* (2018.02)

(56) References Cited

U.S. PATENT DOCUMENTS

| | | | |
|---|---|---|---|
| 2009/0161614 | A1 | 6/2009 | Grandblaise et al. |
| 2009/0187978 | A1 | 7/2009 | Upendran et al. |
| 2011/0047380 | A1 | 2/2011 | Miller |
| 2011/0205969 | A1 | 8/2011 | Ahmad et al. |
| 2012/0173623 | A1 | 7/2012 | Vanderveen |
| 2013/0013926 | A1 | 1/2013 | Hakola et al. |
| 2013/0157656 | A1 | 6/2013 | Gao et al. |
| 2013/0188515 | A1 | 7/2013 | Pinheiro et al. |
| 2015/0006633 | A1* | 1/2015 | Vandwalle .......... H04L 67/1051 709/204 |
| 2015/0133083 | A1* | 5/2015 | Van Phan ............. H04L 63/068 455/411 |

FOREIGN PATENT DOCUMENTS

| | | |
|---|---|---|
| CN | 103297961 A | 9/2013 |
| KR | 10-2009-0005133 A | 1/2009 |
| KR | 10-2012-0139752 A | 12/2012 |
| KR | 10-2013-0004497 A | 1/2013 |
| WO | 2013/032364 A1 | 3/2013 |
| WO | 2013/170904 A1 | 11/2013 |

OTHER PUBLICATIONS

Ericsson, ST-Ericsson, Alignment with the updated MIKEY-TICKET draft, 3GPP TSG-SA WG3 #59 S3-100503, Apr. 19, 2010.
3GPP; TSG Services and System Aspects; Study on Security aspects of Public Warning System (PWS) (Release 12), 3GPP TR 33.869, Sep. 10, 2013.
Qualcomm, Time parameter for ProSe direct discovery MIC computation, 3GPP TSG-SA WG3 #76 S3-142191, Aug. 18, 2018.
3GPP Technical Specification Group Services and System Aspects; Study on security issues to support Proximity Service(Release 12), 3GPP TR 33.833 v0.5.0, Apr. 16, 2014.
Samsung, Security Aspects of ProSe Direct Discovery, 3GPP TSG-SA WG3 #73 S3-131041, Nov. 4, 2018.
Chinese Office Action dated Jul. 18, 2018, issued in Chinese Patent Application No. 201480064963.6.
Japanese Office Action dated Aug. 27, 2018 issued in Japanese Patent Application No. 2016-518143.

* cited by examiner

METHOD FOR SECURING DISCOVERY INFORMATION AND DEVICE THEREFOR

TECHNICAL FIELD

The present invention relates to a method and system for securing discovery information transmitted through a direct radio signal in a wireless communication system that support a device-to-device service. Particularly, the present invention relates to a method for replay protection and integrity protection of discovery information.

BACKGROUND ART

In a wireless communication system that supports a device-to-device discovery, discovery information is transmitted by user equipment (UE) that desires to be discovered. Such discovery information is transmitted on a discovery physical channel by UE. The discovery information is formed of an application user ID and any other information which receiving UE has interest in. Based on received discovery information, discovering UE determines whether other UE has interest in it. If proximity of UE needs to be known by one or more licensed applications in discovering UE, UE has interest in discovering ProSe-enabled UE. ProSe discovery may be, for example, a standalone service enabler that can use information from UE discovered with regard to specific applications. In this case, specific applications may be allowed to use such information, e.g., "find a taxi nearby" or "find me police officer X". Additionally, ProSe discovery obtained according to such information may be used, for example, in the following operation for triggering direct communication.

In a current system, discovery information transmitted by UE may be received by any other UE authorized to monitor a discovery physical channel. Such discovery information is transmitted by UE authorized for transmission. However, such discovery information is transmitted through a broadcast channel, and a discovery resource is not allocated to specific UE for transmission. In a certain case, even though a discovery resource may be allocated to specific UE for transmission, receiving UE does not know a specific discovery resource used by a transmitter. Discovery information transmitted by UE may be received and processed by any UE (in case of open discovery) or by a specific group of UE (in case of limited discovery).

In the above-type many-to-many communication on a discovery physical channel, discovery information may fail to be transmitted safely. Rogue UE may receive a discovery protocol data unit (PDU) transmitted on the discovery physical channel. Also, rogue UE may store the discovery PDU and transmit it onto the discovery physical channel. This may cause wrong information reception to UE receiving the discovery PDU transmitted by rogue UE. For example, pizza shop UE may signal an offer at specific time. When there is no offer, rogue UE may replay this message. In another example, rogue UE may replay a discovery signal of a user's friend. Due to this, even though a user's friend is not actually located nearby, a user may think a friend is located nearby. Therefore, a mechanism for replay protection should be provided to secure discovery information.

The discovery capability of a discovery physical channel is small. Therefore, the replay protection mechanism should minimize overhead. Currently the replay protection mechanism uses a counter or packet number. If transmission can be received by any UE, the counter or packet number cannot be maintained. Also, UEs that receive transmission may be varied according to time. In this case, it is not possible to have the counter or packet number synchronized between a transmitter and a receiver. A certain replay protection mechanism proposes using a system time such as hour, minute, second, or any other equivalent. However, it is not possible to always have such a system time synchronized through a transmitter and a receiver. Additionally, in case any applied system time is delivered to discovery information, a system time approach scheme may require further overhead. Most systems are synchronized in time by using their mechanism such as dividing time in a view of frame. For example, in some systems, a frame duration time is 10 ms, and a transmitter and a receiver are synchronized with frame boundaries. A frame is numbered and quickly rolls over. For example, a ten-bit frame number rolls over at every ten seconds. It is not desirable to use a frame number for a replay protection since a security key to be updated at every 10 seconds is needed. Some methods use a frame number and a rollover counter in order to reduce the frequency of a security key update. The rollover counter needs to be transmitted together with discovery information so that a transmitter and a receiver are synchronized with each other.

This, however, increases overhead. Furthermore, discovery information is transmitted by several UEs and received by several UEs. It is not possible to use a rollover counter synchronized with all UEs.

Accordingly, a method for securing discovery information is required.

DISCLOSURE OF INVENTION

Technical Problem

A device-to-device communication method according to an embodiment of the present invention is proposed to prevent UE discovery information from being transmitted wrong since any rogue UE receives and changes such UE discovery information.

The technical problems to be solved by this invention are not limited to those set forth herein, and any other technical problem will be understood by those skilled in the art.

Solution to Problem

In order to solve the above problem, a device-to-device communication method of transmitting user equipment according to an embodiment of the present invention may include steps of synchronizing with a discovery resource cycle number; determining discovery channel logical timing information of a discovery physical channel at which discovery information is to be transmitted; creating security information by using a security key, the determined discovery channel logical timing information, and the discovery information to be transmitted; and transmitting the discovery information including the security information to the discovery physical channel.

Additionally, the discovery channel logical timing information may include at least one of a discovery resource cycle number, a discovery subframe number, and a discovery physical channel index.

Additionally, the security information may include at least one of a message authentication code (MAC) or a digital signature (DS).

Additionally, the security information may include cyclical redundancy check (CRC).

Additionally, the synchronizing step may include receiving a discovery resource cycle number associated with a discovery resource cycle from a base station; and synchronizing with the received discovery resource cycle number.

Additionally, the step of creating the security information may include determining an absolute system time at which the discovery information is to be transmitted; and creating the security information by using the security key, the determined discovery channel logical timing information, the absolute system time, and the discovery information to be transmitted.

Additionally, in order to solve the above problem, a device-to-device communication method of receiving user equipment according to an embodiment of the present invention may include steps of synchronizing with a discovery resource cycle number; receiving discovery information including first security information on a discovery physical channel; determining discovery channel logical timing information of the discovery physical channel at which the discovery information is received; creating second security information by using a security key, the determined discovery channel logical timing information, and the received discovery information; and verifying the first security information and the second security information.

Additionally, the synchronizing step may include receiving a discovery resource cycle number associated with a discovery resource cycle from a base station; and synchronizing with the received discovery resource cycle number.

Additionally, the step of creating the second security information may include determining an absolute system time at which the discovery information is received; and creating the second security information by using the security key, the determined discovery channel logical timing information, the absolute system time, and the received discovery information.

Additionally, in order to solve the above problem, a device-to-device communication method of transmitting user equipment according to an embodiment of the present invention may include steps of determining a system frame and a system time of a discovery slot or a system frame corresponding to a discovery physical channel at which discovery information is to be transmitted; creating security information by using a security key, the determined system time, and the discovery information to be transmitted; and transmitting the discovery information including the security information to the discovery physical channel.

Additionally, the method may further include step of synchronizing with a universal coordinated time corresponding to the system frame.

Additionally, in order to solve the above problem, a device-to-device communication method of receiving user equipment according to an embodiment of the present invention may include steps of receiving discovery information including first security information on a discovery physical channel; determining a system frame and a system time of a discovery slot or a system frame corresponding to a discovery physical channel at which discovery information is received; creating second security information by using a security key, the determined system time, and the received discovery information; and verifying the first security information and the second security information.

Additionally, in order to solve the above problem, transmitting user equipment that supports a device-to-device communication according to an embodiment of the present invention may include a communication unit configured to communicate with other user equipment and a base station; and a control unit configured to control synchronizing with a discovery resource cycle number, determining discovery channel logical timing information of a discovery physical channel at which discovery information is to be transmitted, creating security information by using a security key, the determined discovery channel logical timing information, and the discovery information to be transmitted, and transmitting the discovery information including the security information to the discovery physical channel.

Additionally, in order to solve the above problem, receiving user equipment that supports a device-to-device communication according to an embodiment of the present invention may include a communication unit configured to communicate with other user equipment and a base station; and a control unit configured to control synchronizing with a discovery resource cycle number, receiving discovery information including first security information on a discovery physical channel, determining discovery channel logical timing information of the discovery physical channel at which the discovery information is received, creating second security information by using a security key, the determined discovery channel logical timing information, and the received discovery information, and verifying the first security information and the second security information.

Additionally, in order to solve the above problem, transmitting user equipment that supports a device-to-device communication according to an embodiment of the present invention may include a communication unit configured to communicate with other user equipment and a base station; and a control unit configured to control determining a system frame and a system time of a system frame corresponding to a discovery physical channel at which discovery information is to be transmitted, creating security information by using a security key, the determined system time, and the discovery information to be transmitted, and transmitting the discovery information including the security information to the discovery physical channel.

Additionally, in order to solve the above problem, receiving user equipment that supports a device-to-device communication according to an embodiment of the present invention may include a communication unit configured to communicate with other user equipment and a base station; and a control unit configured to control receiving discovery information including first security information on a discovery physical channel, determining a system frame and a system time of a system frame corresponding to a discovery physical channel at which the discovery information is received, creating second security information by using a security key, the determined system time, and the received discovery information, and verifying the first security information and the second security information.

Advantageous Effects of Invention

A device-to-device communication method according to an embodiment of the present invention can prevent UE discovery information from being transmitted wrong since any rogue UE receives and changes such UE discovery information.

The effects obtained from this invention are not limited to those set forth herein, and any other effect will be understood by those skilled in the art.

MODE FOR THE INVENTION

Hereinafter, embodiments of the present disclosure will be described with reference to the accompanying drawings.

In this disclosure, some techniques or elements, which are well known in the art or irrelevant to disclosed embodiments, may not be described or illustrated in detail. This is to avoid obscuring the subject matter of the present disclosure.

Additionally, the terms used herein are only used to describe specific various embodiments, and are not intended to limit this disclosure. The present disclosure may be embodied in many different forms and should not be construed as limited to the embodiments set forth herein.

Now, the present invention will be described in detail according to various embodiments.

<First Embodiment: MAC (Message Authentication Code)/DS (Digital Signature) Creation Using Discovery Channel Logical Timing Information>

First of all, the MAC/DS creation using discovery channel logical timing information will be described.

Figure 1:
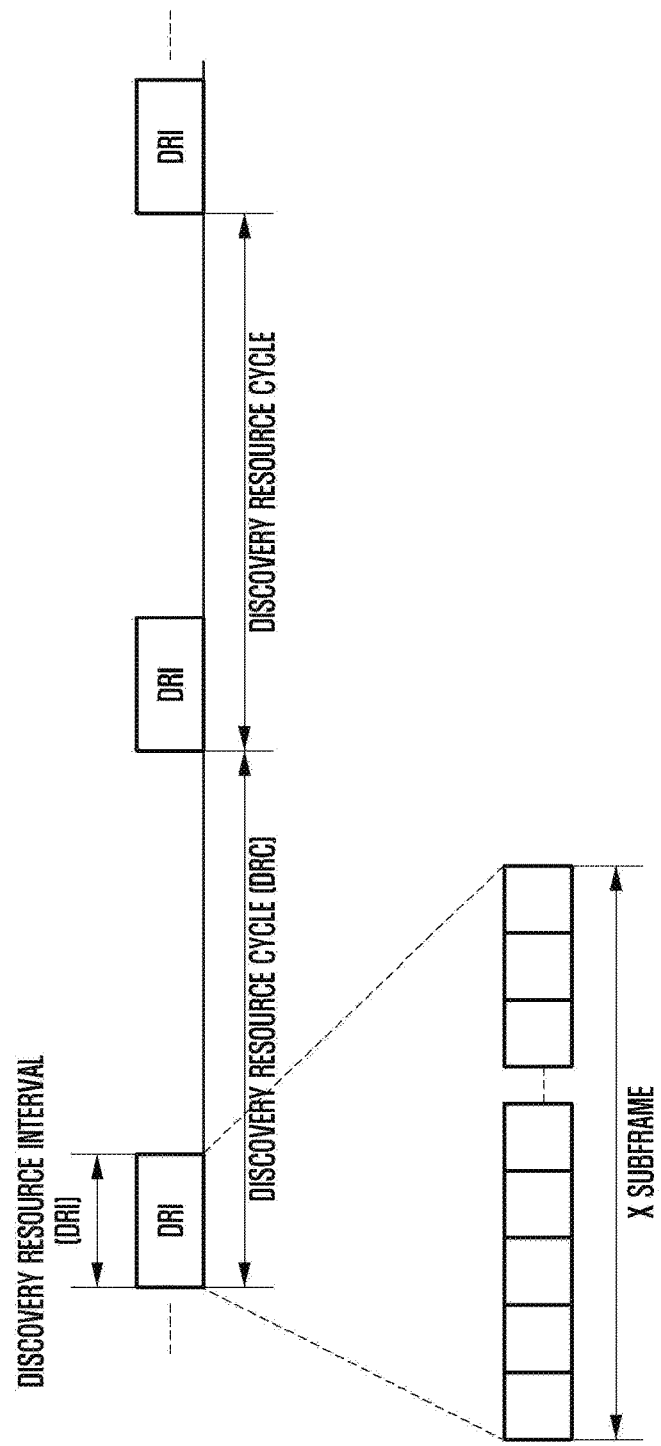
FIG. 1 is a diagram illustrating the allocation of discovery resources according to prior art.

FIG. 1 is a diagram illustrating the allocation of discovery resources according to prior art.

Discovery information is transmitted onto a discovery physical channel at discovery subframes. Referring to FIG. 1, the allocation of discovery resources in the current system or prior art is shown. A base station (BS) or a group leader allocates discovery subframes to every discovery resource cycle (DRC). At this time, information about discovery subframe is transmitted using system information to downlink. The BS exists when discovery and discovery-enabled user equipment (UE) is located within the coverage of a communication network. The group leader (i.e., specific UE having a function to regulate resources and offer timing synchronization, etc.) exists when discovery and discovery-enabled UE is not located within the coverage of a communication network. The DRC is formed of a discovery resource interval (DRI) and a non-discovery resource interval. The discovery subframe exists in the DRI. Each discovery subframe is formed of a discovery physical channel having a fixed size. Each discovery physical channel may carry a single discovery protocol data unit (PDU) having a small size. Since a large size of a physical channel reduces the coverage of the discovery physical channel (i.e., a distance capable of receiving the discovery physical channel), the discovery physical channel has a small size.

Figure 2:
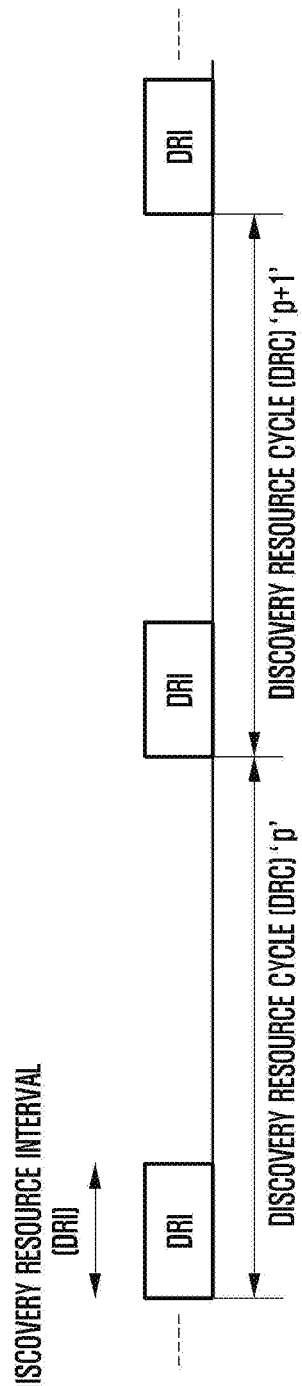
FIG. 2 is a diagram illustrating numbering of a discovery resource cycle according to an embodiment of the present invention.

FIG. 2 is a diagram illustrating numbering of a discovery resource cycle according to an embodiment of the present invention.

Referring to FIG. 2, in an embodiment of this invention, a number may be allocated to each discovery resource cycle (DRC). Such DRC numbers may be allocated sequentially to respective DRCs. In case of a discovery resource number of 'n'-bit size, DRC numbers roll over every 2n DRC. DRC number zero may be allocated to a DRC that begins with a frame number 'X' in which X mod 2n=Y (0 or positive integer). A BS or group leader may allocate a DRC number to a DRC. Also, a BS or group leader may broadcast a DRC number or transmit a DRC number to UE through dedicated signaling in a unicast manner. In an embodiment, a DRC number may be broadcasted every DRC. In another embodiment, a DRC number may be broadcasted every 't' DRC. According to an embodiment, a DRC number may be broadcasted using a system information message, a system information block, or a packet data common control channel.

According to an embodiment, a DRC number may be broadcasted or unicasted in broadcast or unicast information corresponding to a DRC in which the broadcast or unicast information is received. Alternatively, according to an embodiment, a DRC number may be broadcasted or unicasted in broadcast or unicast information corresponding to a DRC subsequent to a DRC in which the broadcast or unicast information is received. Alternatively, according to an embodiment, a DRC number may be broadcasted or unicasted in broadcast or unicast information corresponding to the 'P'-th DRC subsequent to a DRC in which the broadcast or unicast information is received.

Figure 3:
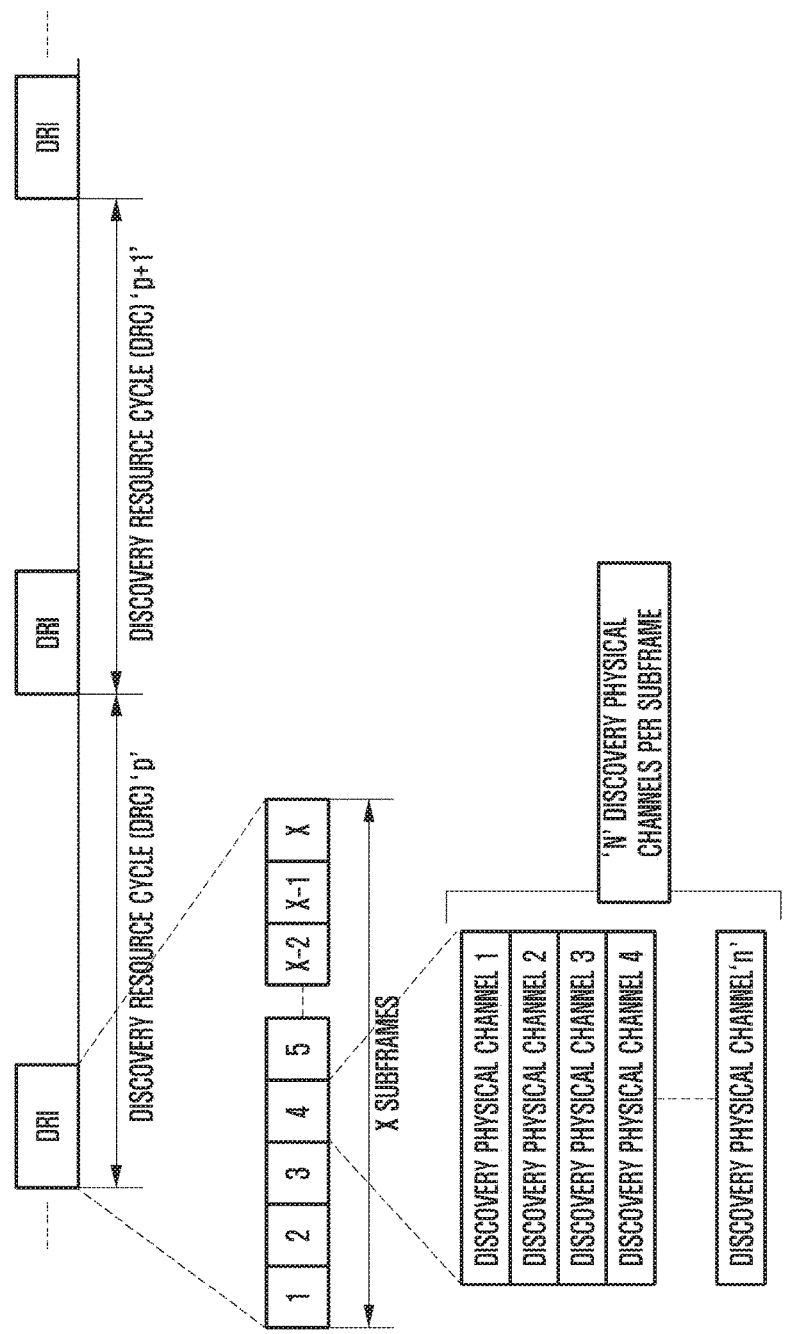
FIG. 3 is a diagram illustrating discovery subframe and physical channel numbering according to an embodiment of the present invention.
Figure 4:
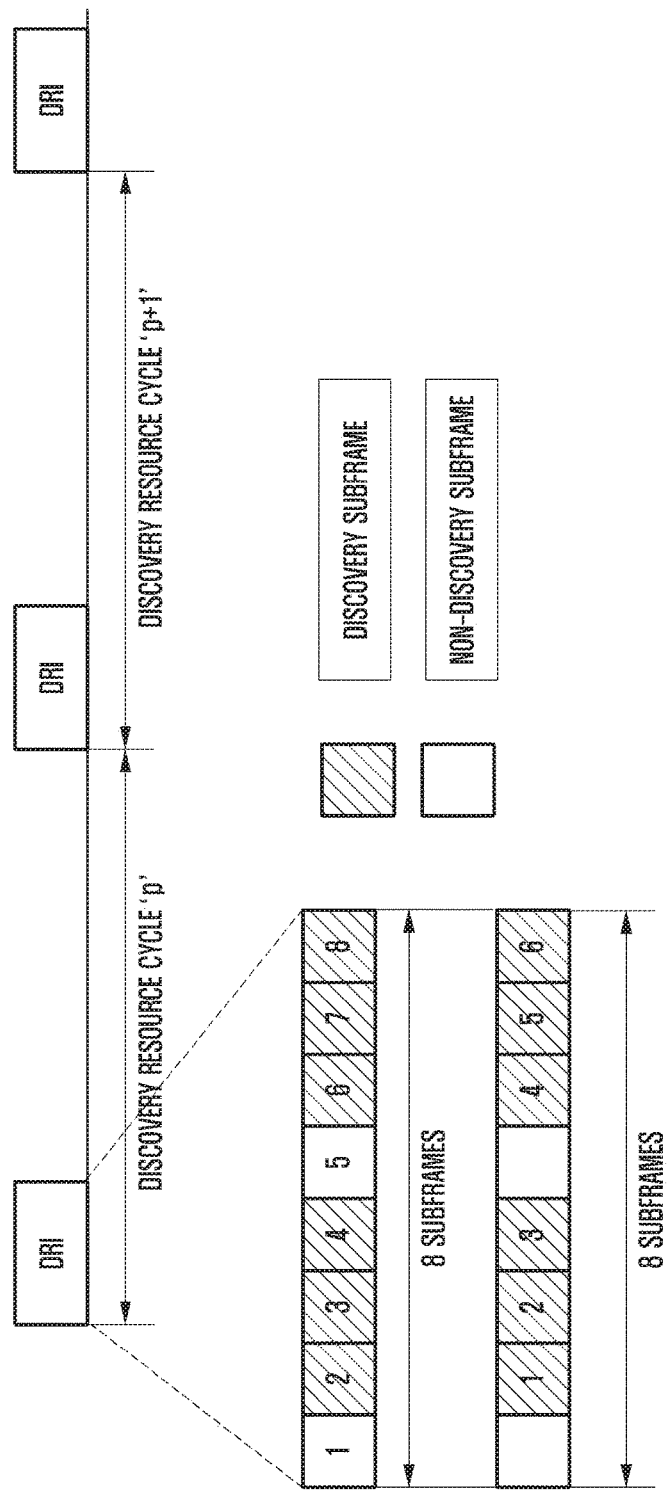
FIG. 4 is a diagram illustrating numbering of a discovery subframe according to an embodiment of the present invention.

FIG. 3 is a diagram illustrating discovery subframe and physical channel numbering according to an embodiment of the present invention, and FIG. 4 is a diagram illustrating numbering of a discovery subframe according to an embodiment of the present invention.

Referring to FIGS. 3 and 4, a discovery subframe may be numbered in a DRI. A person skilled in the art may also use any numbering technique other than FIGS. 3 and 4. Discovery subframe numbering may be unique through discovery subframes in a DRI. In another technique, discovery subframes may be numbered through a DRC. For example, a DRC 'P' may be numbered from 1 to X, and a DRC 'P+1' may be numbered from 'X+1' to 'X+N'.

According to an embodiment, discovery subframes in a DRI may be identified by means of a frame number and a subframe number. Each frame (i.e., 10 ms) may be numbered. Also, according to an embodiment, each frame may have ten subframes numbered from 0 to 9.

Additionally, according to an embodiment as shown in FIG. 4, all subframes may be numbered sequentially. Alternatively, according to an embodiment, discovery subframes only may be numbered.

According to an embodiment, as shown in FIG. 3, discovery physical channels may be also numbered. In an embodiment, discovery physical channel numbering may be unique through discovery physical channels in a discovery subframe. In another embodiment, discovery physical channels may be numbered through discovery subframes.

In an embodiment, a DRC may be formed of a plurality of DRIs. In this case, such DRIs in the DRC may be also numbered. According to an embodiment, a DRI may be identical with a DRC.

Figure 5:
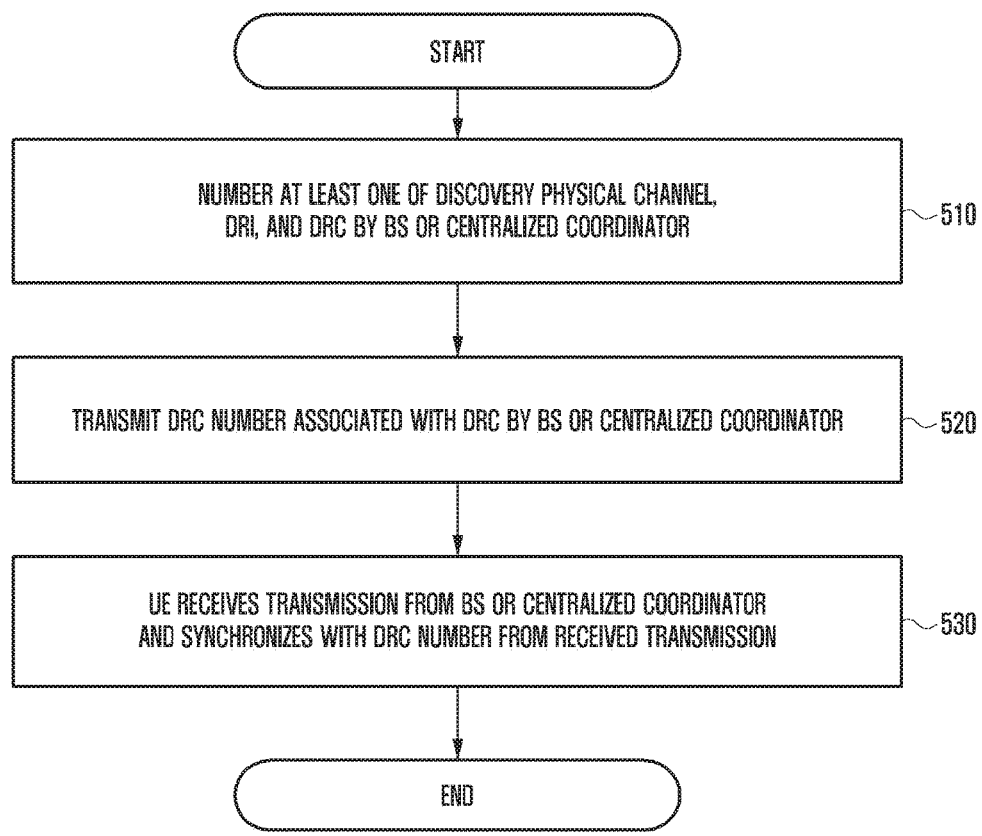
FIG. 5 is a flow diagram illustrating a method of discovery resource cycle numbering and synchronization according to an embodiment of the present invention.

FIG. 5 is a flow diagram illustrating a method of discovery resource cycle numbering and synchronization according to an embodiment of the present invention.

Referring to FIG. 5, DRC numbering and synchronization may be performed by UE (i.e., receiving UE as well as transmitting UE) that participates in discovery. At this time, a discovery subframe number, a DRI number, and a discovery physical channel index may be synchronized with a DRC number and then determined implicitly by UE.

Specifically, at step 510, a base station may number at least one of a discovery physical channel, a discovery subframe, a DRI, and a DRC.

Thereafter, the base station may transmit a DRC number associated with a DRC at step 520, and UE may receive transmission from the base station or a centralized coordinator and then synchronize with the DRC number from the received transmission information at step 530.

In an embodiment, a security key may be a symmetric key which is used equally by a transmitter and a receiver. In another embodiment, a security key may be an asymmetric key which is used differently by a transmitter and a receiver. According to an embodiment, a key pair of a public key and a private key in which the public key may be used by a transmitter and the private key may be used by a receiver. While a security algorithm creates a message authentication code (MAC) in case of the symmetric key, a security algorithm creates a digital signature (DS) in case of the asymmetric key.

In a security key according to an embodiment, a symmetric security key or asymmetric security key pair may be applied in common to open discovery for all types of services. In another embodiment, a symmetric security key or asymmetric security key pair may be applied to a specific type of service. For example, UE may support one or more services each of which is identified by means of a D2D application ID or D2D service ID. When requesting a D2D application code or D2D service code corresponding to a D2D application ID or D2D service ID, UE may obtain a security key from a D2D server. A D2D service code or D2D application code may be transmitted as part of discovery information by UE. Therefore, each UE may have a plurality of security keys each of which corresponds to each D2D application ID or D2D service ID or each D2D application code or D2D service code. In another embodiment, a symmetric security key or asymmetric security key pair may be also applied to specific UE that transmits discovery information. In still another embodiment, a symmetric security key or asymmetric security key pair may be also applied to specific UE that transmits discovery information to a group of UEs.

A security key used by a transmitter and a receiver is updated by UEs participating in discovery whenever DRC numbers roll over in such an approaching manner.

<Embodiment 1A>

Figure 6:
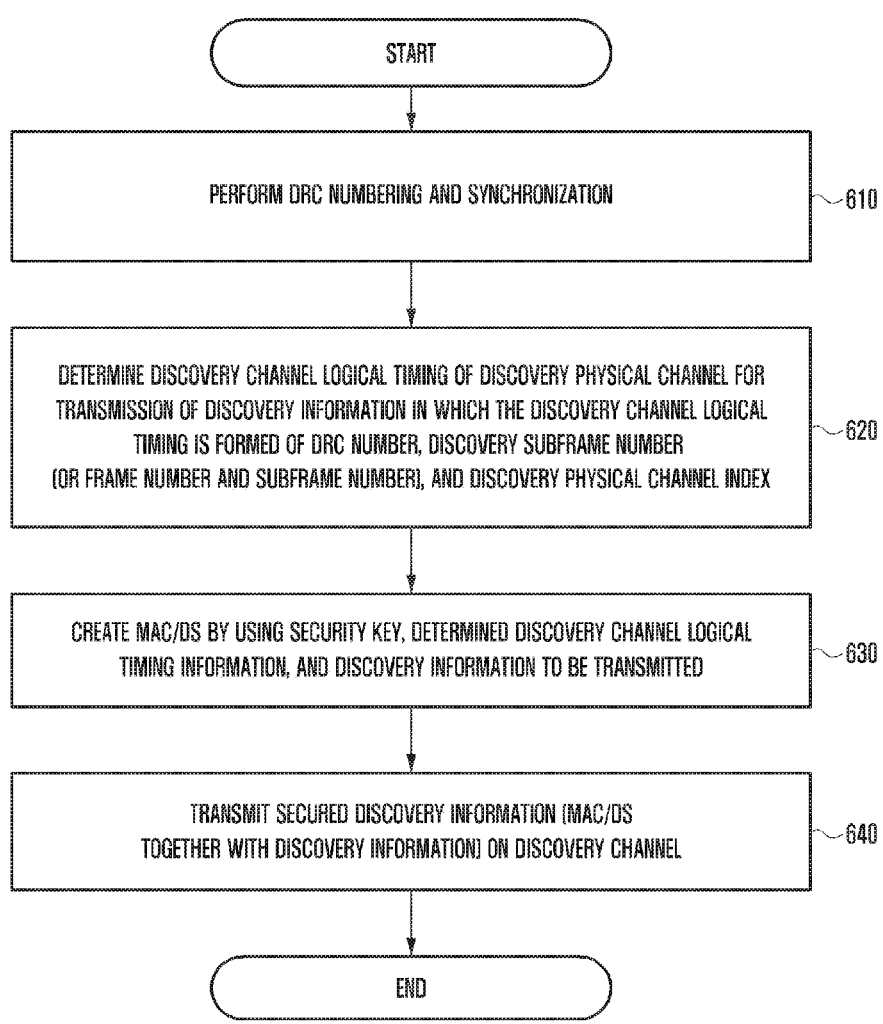
FIG. 6 is a flow diagram illustrating a method for securing discovery information at a transmitter according to an embodiment of the present invention.
Figure 7:
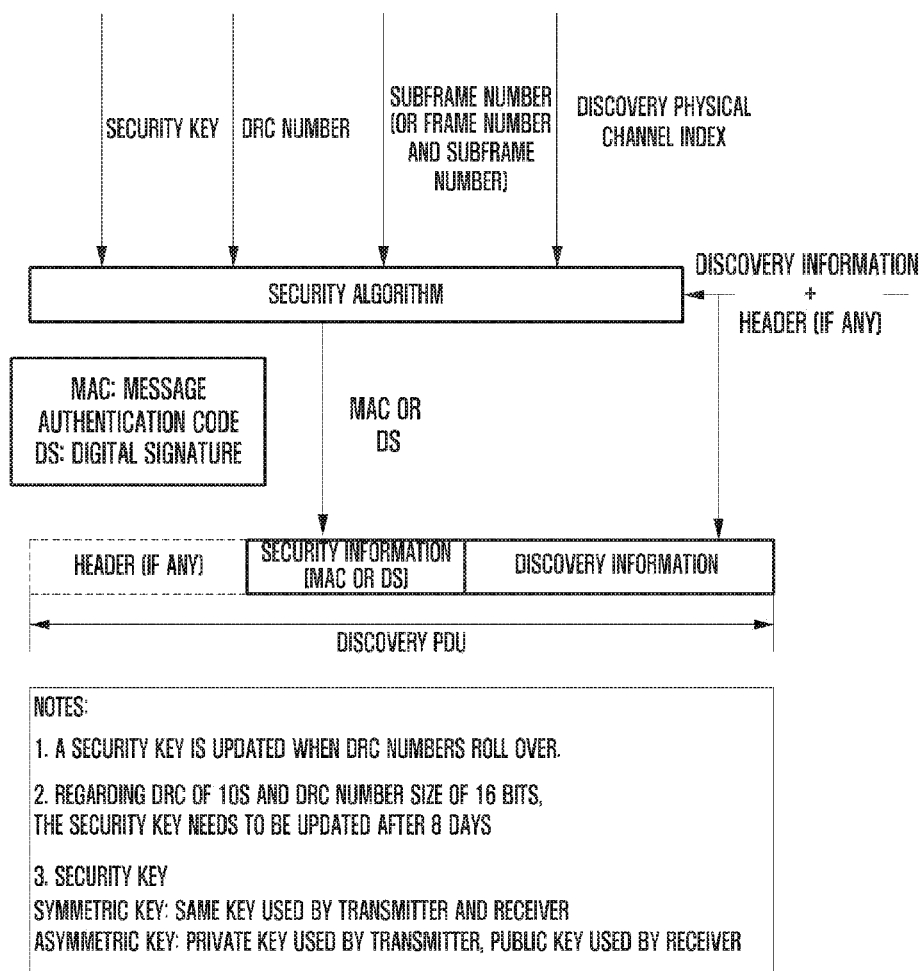
FIG. 7 is a diagram illustrating a method of MAC or DS creation according to an embodiment of the present invention.

FIG. 6 is a flow diagram illustrating a method for securing discovery information at a transmitter according to an embodiment of the present invention, and FIG. 7 is a diagram illustrating a method of MAC or DS creation according to an embodiment of the present invention.

Referring to FIG. 6, the transmitter (i.e., D2D UE) has discovery information that needs to be transmitted safely on a discovery channel. At step 610, the transmitter performs DRC numbering and synchronization in case of being not synchronized yet. The transmitter receives broadcast information that carries a DRC number, and synchronizes with a DRC. At this time, the broadcast information may be transmitted by a BS or a group leader. Before transmitting any discovery information, the transmitter should number a DRC and be synchronized with the DRC. Since the method of DRC numbering and synchronization is previously discussed in FIG. 5, a detailed description will be omitted.

In an embodiment, at step 620, the transmitter determines information about a logical time at which a discovery physical channel that carries discovery information is transmitted. The determined timing information may include at least one of a DRC number, a discovery subframe number, and a discovery physical channel index of a discovery physical channel. According to an embodiment, when a single DRC has a plurality of DRIs which are numbered, a DRI number may be also determined. According to an embodiment, a frame number and a subframe number may be used instead of the discovery subframe number, and in this case a subframe in the frame may be numbered.

Thereafter, at step 630, the transmitter may create a message authentication code (MAC) or a digital signature (DS) by using a security key, the determined discovery channel logical timing information, and discovery information to be transmitted.

Specifically, according to an embodiment, in addition to discovery information to be secured and a security key, a discovery physical channel index of a discovery physical channel used for transmission of discovery information to be secured, a DRC number, and a discovery subframe number (or a frame number and a subframe number) may be offered to a security algorithm as shown in FIG. 7. If a security key is specified to discovery information to be transmitted, the transmitter may use a suitable security key. In an embodiment in which a single DRC has a plurality of DRIs numbered, a DRI number may be also used as an additional input to the security algorithm.

Thereafter, the security algorithm creates a MAC or a DS. Then the created MAC or DS may be added to discovery information. In some systems, the MAC may be referred to as a message integrity code (MIC).

Then, at step 640, the discovery information secured using the MAC or DS may be transmitted on a discovery channel.

According to an embodiment, the secured discovery information may be fragmented and transmitted through a plurality of discovery physical channels. In this case, a discovery physical channel index, a discovery subframe number (or a frame number and a subframe number), and a DRC number of one of fragments (the first fragment or the last fragment) may be used for securing discovery information. In some embodiments, discovery information may be secured after fragmented rather than non-fragmented discovery information is secured. In this case, a discovery physical channel index, a discovery subframe number (or a frame number and a subframe number), and a DRC number of each fragment may be used for securing discovery information.

Referring to FIG. 7, in an embodiment, a discovery PDU that carries secured discovery information may include discovery information and a MAC or DS. Additionally, the discovery PDU may further include a security indicator that indicates whether security is applied. According to an embodiment, in case security is always applied, no security indicator may be needed. According to an embodiment, if security is based on a discovery type or category and if the discovery type or category is indicated using one of fields in a header of the discovery PDU, no security indicator may be needed. The discovery PDU that carries secured discovery information may also include a security key index for identifying a security key to be used for securing discovery information.

Figure 8:
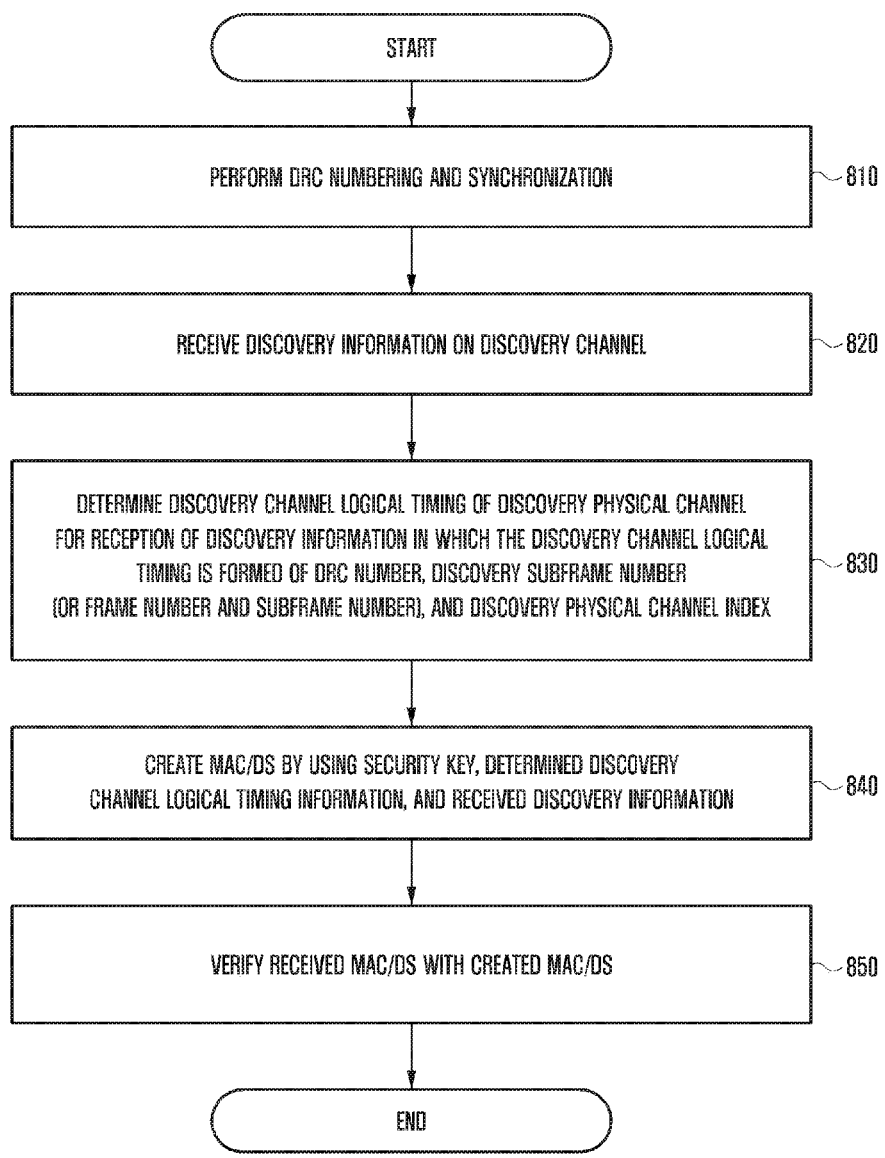
FIG. 8 is a flow diagram illustrating a method for verifying received discovery information at a receiver according to an embodiment of the present invention.

FIG. 8 is a flow diagram illustrating a method for verifying received discovery information at a receiver according to an embodiment of the present invention.

Referring to FIG. 8, at step 810, the receiver performs DRC numbering and synchronization in case of being not synchronized yet. The receiver receives broadcast information that carries a DRC number, and synchronizes with a DRC. At this time, the broadcast information may be transmitted by a BS or a group leader. Before receiving any discovery information, the receiver should number a DRC and be synchronized with the DRC.

After DRC numbering and synchronization, at step 820, the receiver monitors a discovery channel. The receiver (e.g., D2D UE) may receive secured discovery information on the discovery channel.

Thereafter, at step 830, the receiver determines information about a time at which a discovery physical channel that carries discovery information is received. The determined timing information may include at least one of a DRC number, a discovery subframe number (or a frame number and a subframe number), and a discovery physical channel index of a discovery physical channel. In an embodiment in which a single DRC has a plurality of DRIs which are numbered, a DRI number may be also determined.

Thereafter, at step 840, the receiver may create a message authentication code (MAC) or a digital signature (DS) by using a security key, the determined discovery channel logical timing information, and received discovery information.

Specifically, according to an embodiment, in addition to discovery information to be secured and a security key, a discovery physical channel index of a discovery physical channel used for reception of discovery information to be secured, a discovery subframe number (or a frame number and a subframe number), and a DRC number may be offered to the security algorithm as shown in FIG. 7. The security algorithm may be executed in the receiver or a D2D server. Also, the receiver may transmit the received information (a MAC or DS, a DRC number, a discovery subframe number, and a discovery physical channel index) and discovery information to the D2D server. In an embodiment in which a single DRC has a plurality of DRIs which are numbered, a DRI number may be also used as an additional input to the security algorithm. Thereafter, the security algorithm creates a MAC or a DS.

Then, at step 850, the receiver may compare the created MAC or DS with a MAC or DS received together with discovery information from a transmitter. If a rogue transmitter replays a message, a DRC number, a discovery subframe number (or a frame number and a subframe number), and a discovery physical channel index of a discovery physical channel, received at the receiver, may be different from those used for transmission in a genuine transmitter. This may cause a failure in MAC or DS verification at the receiver.

<Embodiment 1B>

Figure 9:
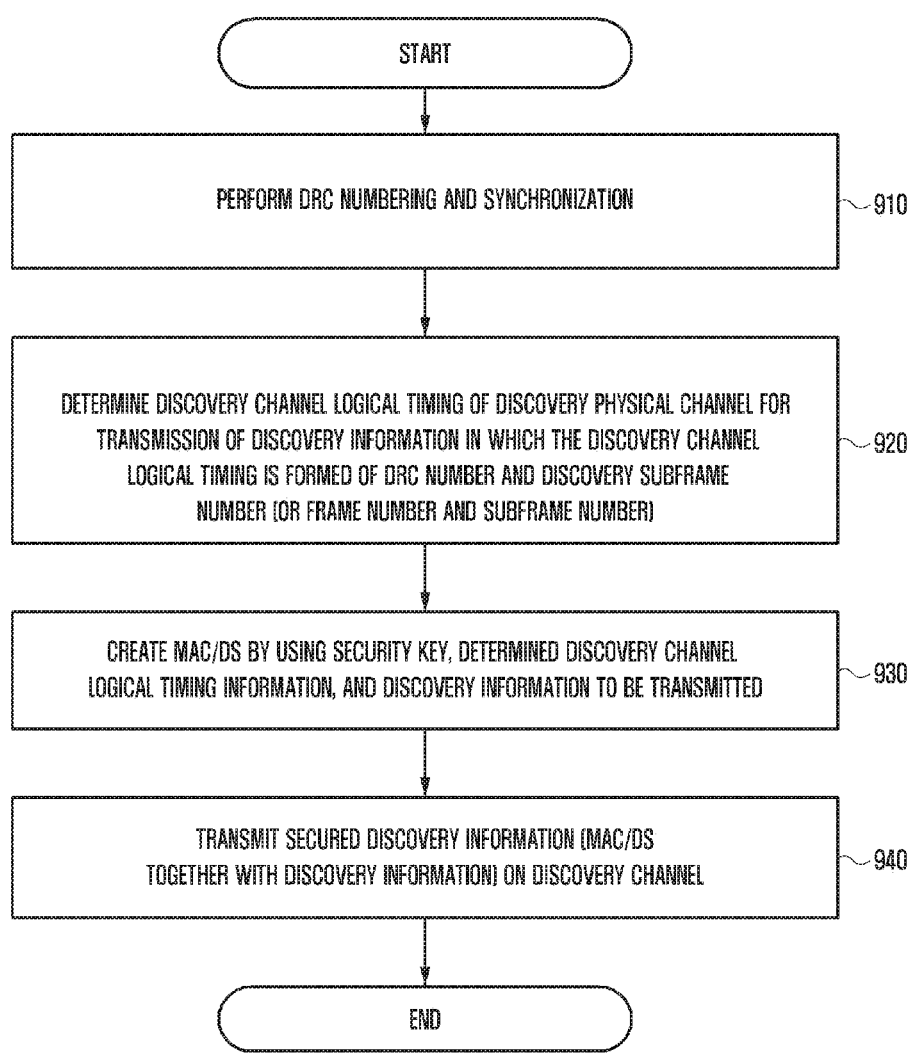
FIG. 9 is a flow diagram illustrating a method for securing discovery information at a transmitter according to another embodiment of the present invention.
Figure 10:
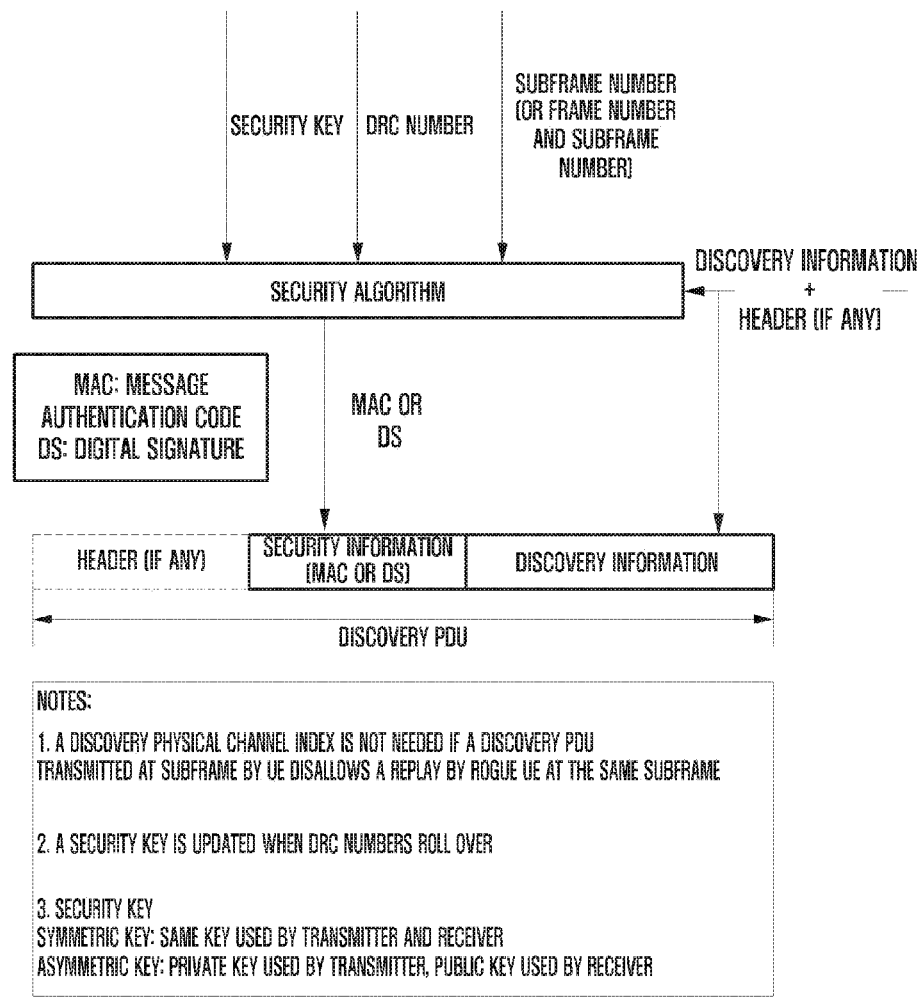
FIG. 10 is a diagram illustrating a method of MAC or DS creation according to another embodiment of the present invention.
Figure 11:
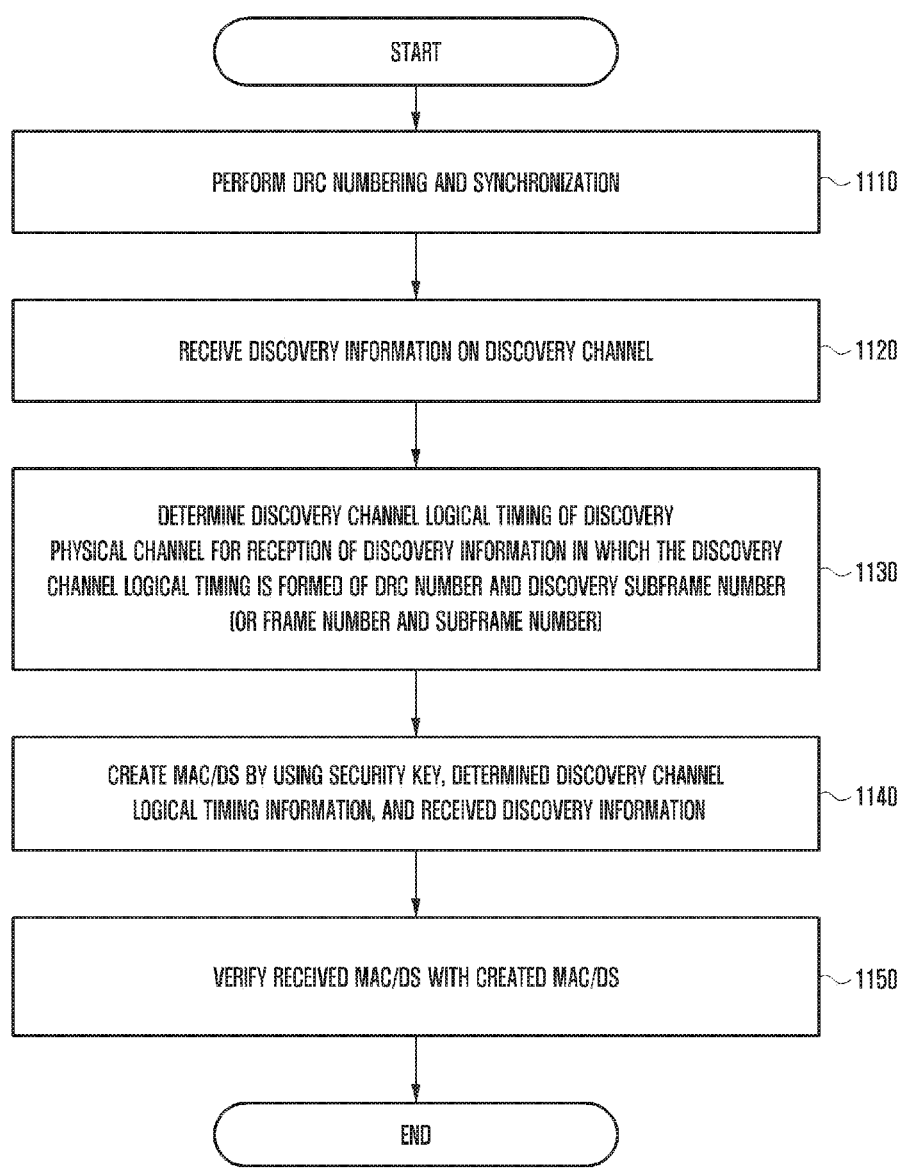
FIG. 11 is a flow diagram illustrating a method for verifying received discovery information at a receiver according to another embodiment of the present invention.

FIG. 9 is a flow diagram illustrating a method for securing discovery information at a transmitter according to another embodiment of the present invention, FIG. 10 is a diagram illustrating a method of MAC or DS creation according to another embodiment of the present invention, and FIG. 11 is a flow diagram illustrating a method for verifying received discovery information at a receiver according to another embodiment of the present invention.

The present embodiment 1B is identical to the embodiment 1A shown as the replay protection method in FIGS. 6, 7 and 8 except that the transmitter and the receiver do not use a discovery physical channel index of a discovery physical channel for transmission and reception of discovery information.

In case of frequency division multiplexing of a discovery physical channel at subframe, a discovery physical channel index may not be used if a discovery PDU transmitted at subframe by UE disallows a replay by rogue UE at the same subframe. On the other hand, in case of time division multiplexing of a discovery physical channel at a single subframe, a replay attack of rogue UE is possible and thus the replay protection method previously discussed in the embodiment 1A should be used. However, if a subframe duration time is very small in case of time division multiplexing of a discovery physical channel at a single subframe, a method of the present embodiment 1B may be used.

Hereinafter, the embodiment 1B will be described. For convenience, the repetition of the same as described in the embodiment 1 A will be avoided.

Referring to FIG. 9, the transmitter has discovery information that needs to be transmitted safely on a discovery channel. At step 910, the transmitter performs DRC numbering and synchronization in case of being not synchronized yet. Since a detailed description is previously given with reference to FIG. 6, the same will be omitted.

Thereafter, at step 920, the transmitter determines information about a logical time at which a discovery physical channel that carries discovery information is transmitted. The determined timing information may include a DRC number and a discovery subframe number (or a frame number and a subframe number). However, contrary to the embodiment 1A discussed with reference to FIG. 6, a discovery physical channel index of a discovery physical channel is not included.

Additionally, at step 930, the transmitter may create a MAC or a DS by using a security key, the determined discovery channel logical timing information, and discovery information to be transmitted. At this time, in addition to discovery information to be secured and a security key, a DRC number and a discovery subframe number (or a frame number and a subframe number) may be offered to a security algorithm as shown in FIG. 10. However, contrary to FIG. 7, an index of a discovery physical channel is not offered to the security algorithm. Thereafter, the security algorithm creates a MAC or a DS. Then the created MAC or DS may be added to discovery information.

Then, at step 940, the discovery information secured using the MAC or DS may be transmitted on a discovery channel.

Referring to FIG. 11, at step 1110, the receiver performs DRC numbering and synchronization in case of being not synchronized yet. The receiver receives broadcast information that carries a DRC number, and synchronizes with a DRC. At this time, the broadcast information may be transmitted by a BS or a group leader. Before receiving any discovery information, the receiver should number a DRC and be synchronized with the DRC.

After DRC numbering and synchronization, at step 1120, the receiver monitors a discovery channel. The receiver may receive secured discovery information on the discovery channel.

Thereafter, at step 1130, the receiver determines information about a time at which a discovery physical channel that carries discovery information is received. The determined timing information may include at least one of a DRC number and a discovery subframe number (or a frame number and a subframe number). However, contrary to the embodiment 1A discussed with reference to FIG. 8, a discovery physical channel index of a discovery physical channel is not included.

Thereafter, at step 1140, the receiver may create a MAC or a DS by using a security key, the determined discovery channel logical timing information, and received discovery information. At this time, in addition to discovery information to be secured and a security key, a discovery subframe number (or a frame number and a subframe number) for reception of discovery information to be secured, and a DRC number may be offered to the security algorithm as shown in FIG. 10. However, contrary to FIG. 7, an index of a discovery physical channel is not offered to the security algorithm. Thereafter, the security algorithm creates a MAC or a DS.

Then, at step 1150, the receiver may compare the created MAC or DS with a MAC or DS received together with discovery information from a transmitter.

<Embodiment 1C>

Figure 12:
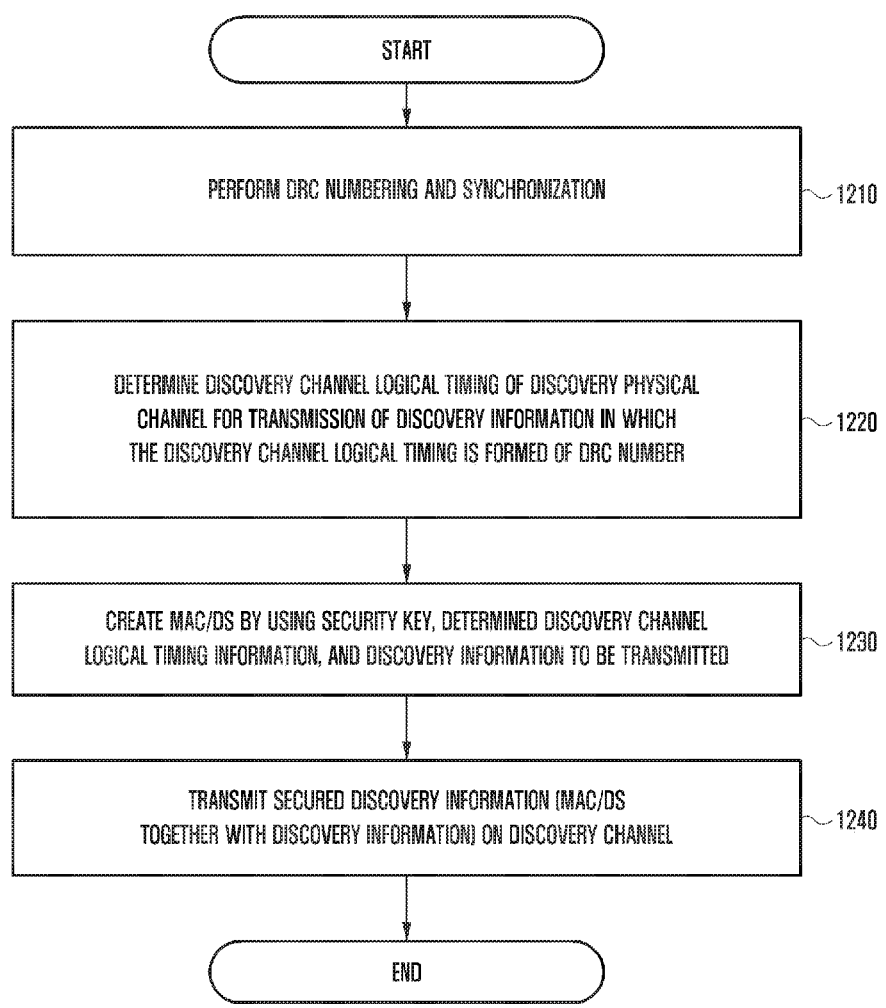
FIG. 12 is a flow diagram illustrating a method for securing discovery information at a transmitter according to still another embodiment of the present invention.
Figure 13:
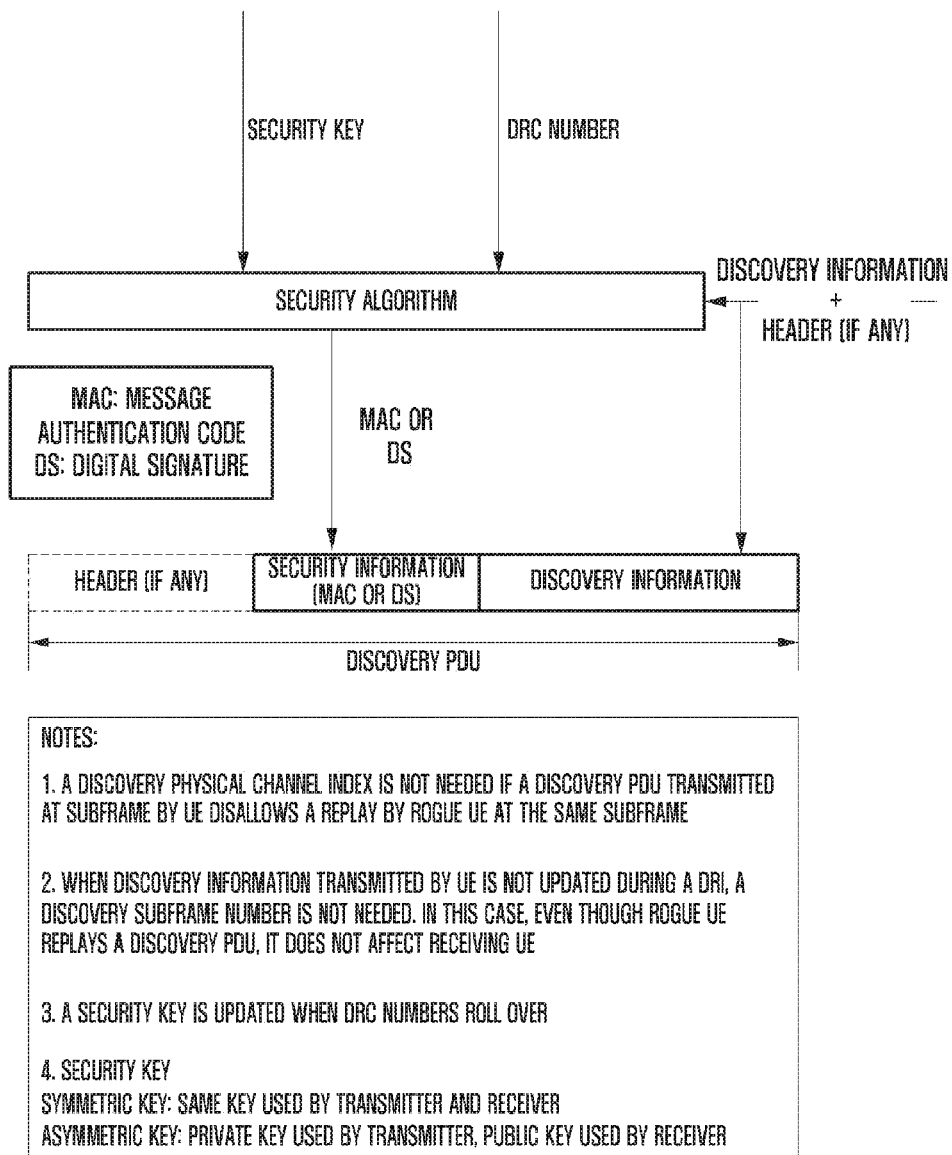
FIG. 13 is a diagram illustrating a method of MAC or DS creation according to still another embodiment of the present invention.
Figure 14:
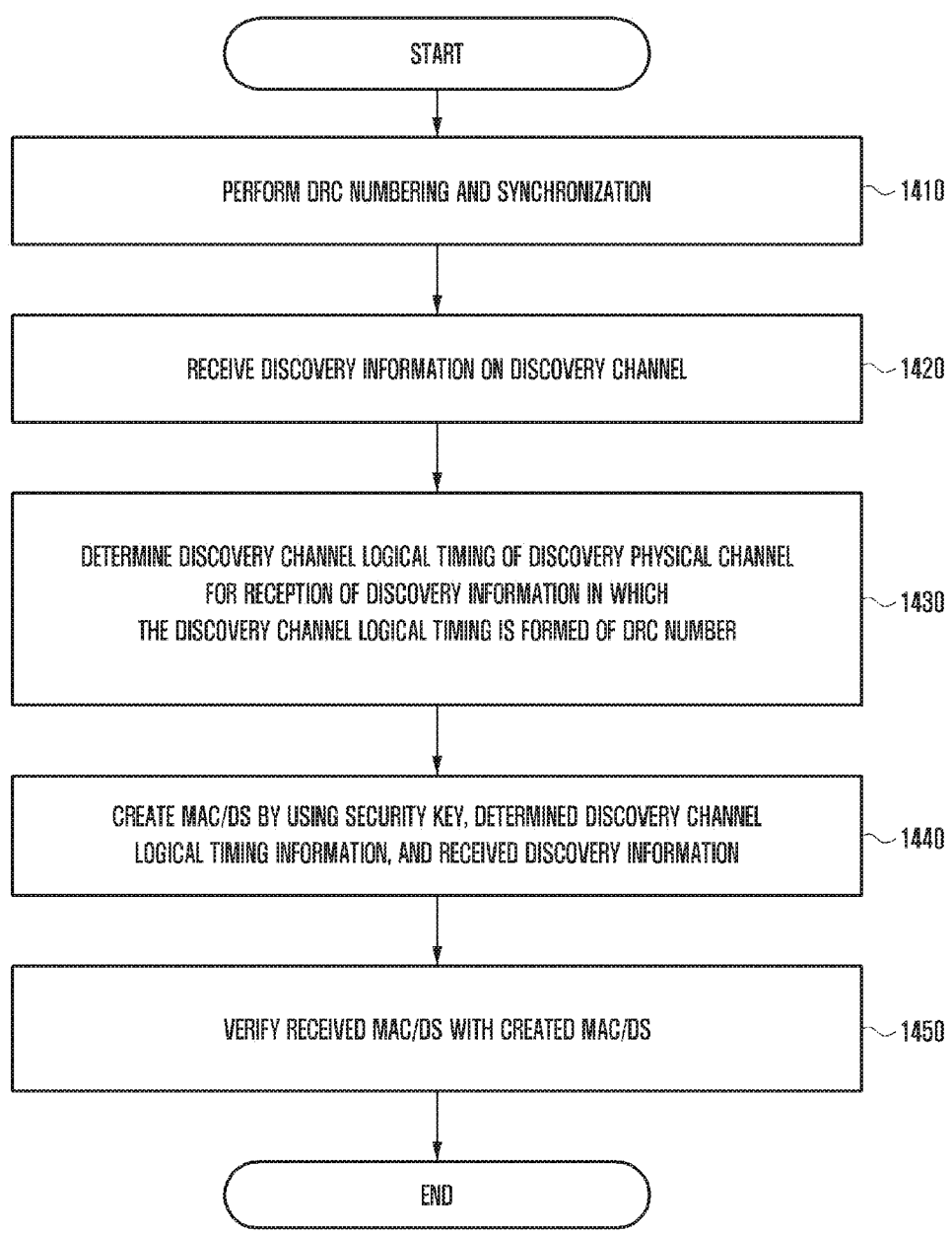
FIG. 14 is a flow diagram illustrating a method for verifying received discovery information at a receiver according to still another embodiment of the present invention.

FIG. 12 is a flow diagram illustrating a method for securing discovery information at a transmitter according to still another embodiment of the present invention, FIG. 13 is a diagram illustrating a method of MAC or DS creation according to still another embodiment of the present invention, and FIG. 14 is a flow diagram illustrating a method for verifying received discovery information at a receiver according to still another embodiment of the present invention.

The present embodiment 1C is identical to the embodiment 1B shown as the replay protection method in FIGS. 9, 10 and 11 except that the transmitter and the receiver do not use a discovery subframe number of a discovery physical channel for transmission and reception of discovery information.

When it is estimated that discovery information transmitted by UE is not updated during a DRI, a discovery subframe number is not needed. In this case, even though rogue UE replays a discovery PDU during a DRI, it does not affect receiving UE. This is fact in case of open discovery (e.g., advertisement, etc.). In case of limited discovery, it is desirable to always use a discovery subframe number. However, if a DRI is small, rogue UE cannot perform a replay in the DRI even in case of limited discovery and thus may need no discovery subframe number. Therefore, the present embodiment 1C may be used when a DRI is small.

Hereinafter, the embodiment 1C will be described. For convenience, the repetition of the same as described in the embodiments 1A and 1B will be avoided.

Referring to FIG. 12, the transmitter has discovery information that needs to be transmitted safely on a discovery channel. At step 1210, the transmitter performs DRC numbering and synchronization in case of being not synchronized yet. Since a detailed description is previously given with reference to FIG. 6, the same will be omitted.

Thereafter, at step 1220, the transmitter determines information about a logical time at which a discovery physical channel that carries discovery information is transmitted. The determined timing information may include a DRC number. However, contrary to the embodiment 1B discussed with reference to FIG. 9, a discovery subframe number is not included.

Additionally, at step 1230, the transmitter may create a MAC or a DS by using a security key, the determined discovery channel logical timing information, and discovery information to be transmitted. At this time, in addition to discovery information to be secured and a security key, a DRC number for transmission of discovery information to be secured may be offered to a security algorithm as shown in FIG. 13. However, contrary to FIG. 10, a discovery subframe number is not offered to the security algorithm. Thereafter, the security algorithm creates a MAC or a DS. Then the created MAC or DS may be added to discovery information.

Then, at step 1240, the discovery information secured using the MAC or DS may be transmitted on a discovery channel.

Referring to FIG. 14, at step 1410, the receiver performs DRC numbering and synchronization in case of being not synchronized yet. The receiver receives broadcast information that carries a DRC number, and synchronizes with a DRC. At this time, the broadcast information may be transmitted by a BS or a group leader. Before receiving any discovery information, the receiver should number a DRC and be synchronized with the DRC.

After DRC numbering and synchronization, at step 1420, the receiver monitors a discovery channel. The receiver may receive secured discovery information on the discovery channel.

Thereafter, at step 1430, the receiver determines information about a time at which a discovery physical channel that carries discovery information is received. The determined timing information may include a DRC number. However, contrary to the embodiment 1B discussed with reference to FIG. 11, a discovery subframe number of a discovery physical channel is not included.

Thereafter, at step 1440, the receiver may create a MAC or a DS by using a security key, the determined discovery channel logical timing information, and received discovery information. At this time, in addition to discovery information to be secured and a security key, a DRC number for reception of discovery information to be secured may be offered to the security algorithm as shown in FIG. 13. However, contrary to FIG. 10, a discovery subframe number is not offered to the security algorithm. Thereafter, the security algorithm creates a MAC or a DS.

Then, at step 1450, the receiver may compare the created MAC or DS with a MAC or DS received together with discovery information from a transmitter.

<Embodiment 1D>

Figure 15:
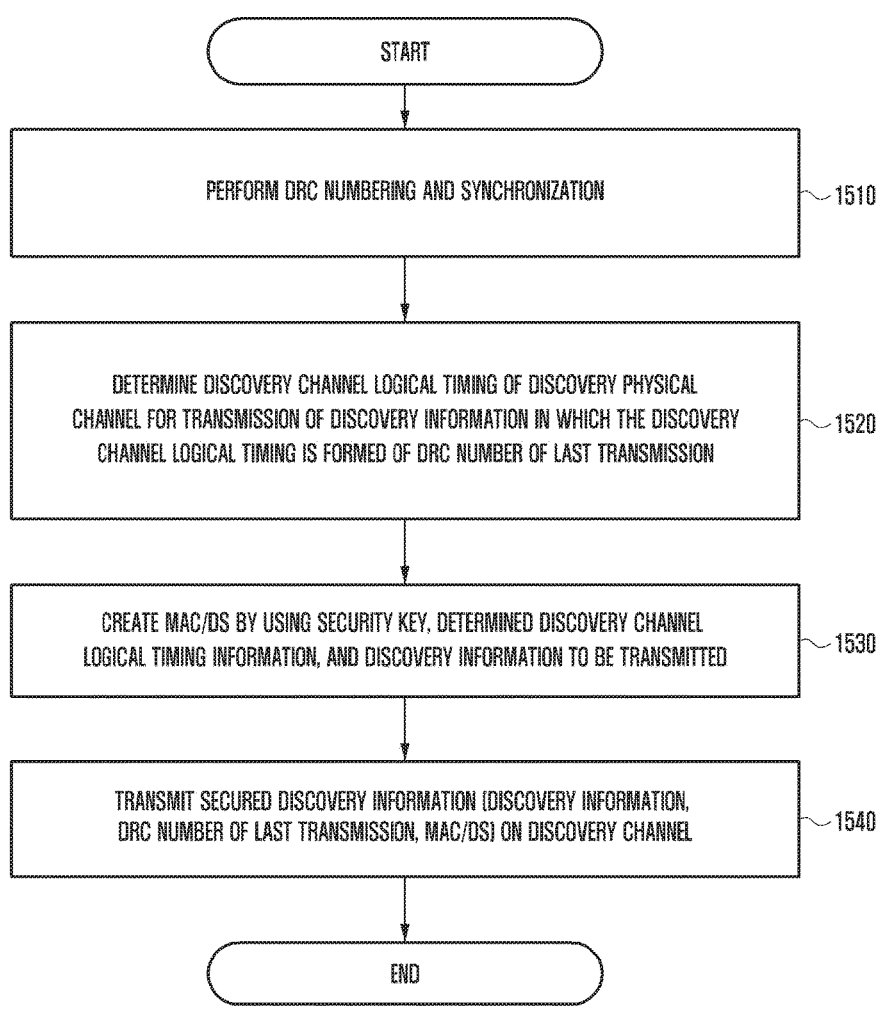
FIG. 15 is a flow diagram illustrating a method for securing discovery information at a transmitter according to yet another embodiment of the present invention.
Figure 16:
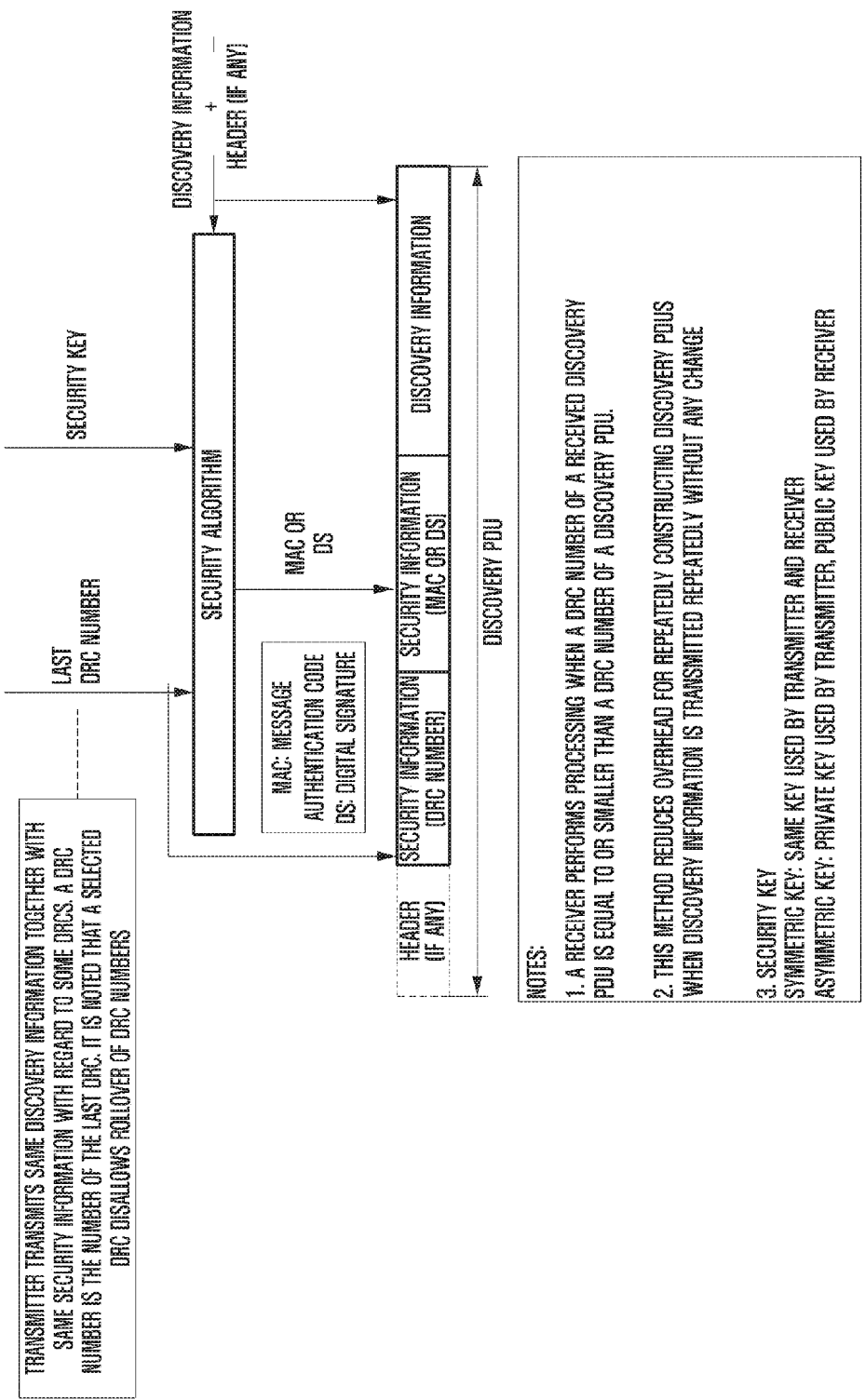
FIG. 16 is a diagram illustrating a method of MAC or DS creation according to yet another embodiment of the present invention.
Figure 17:
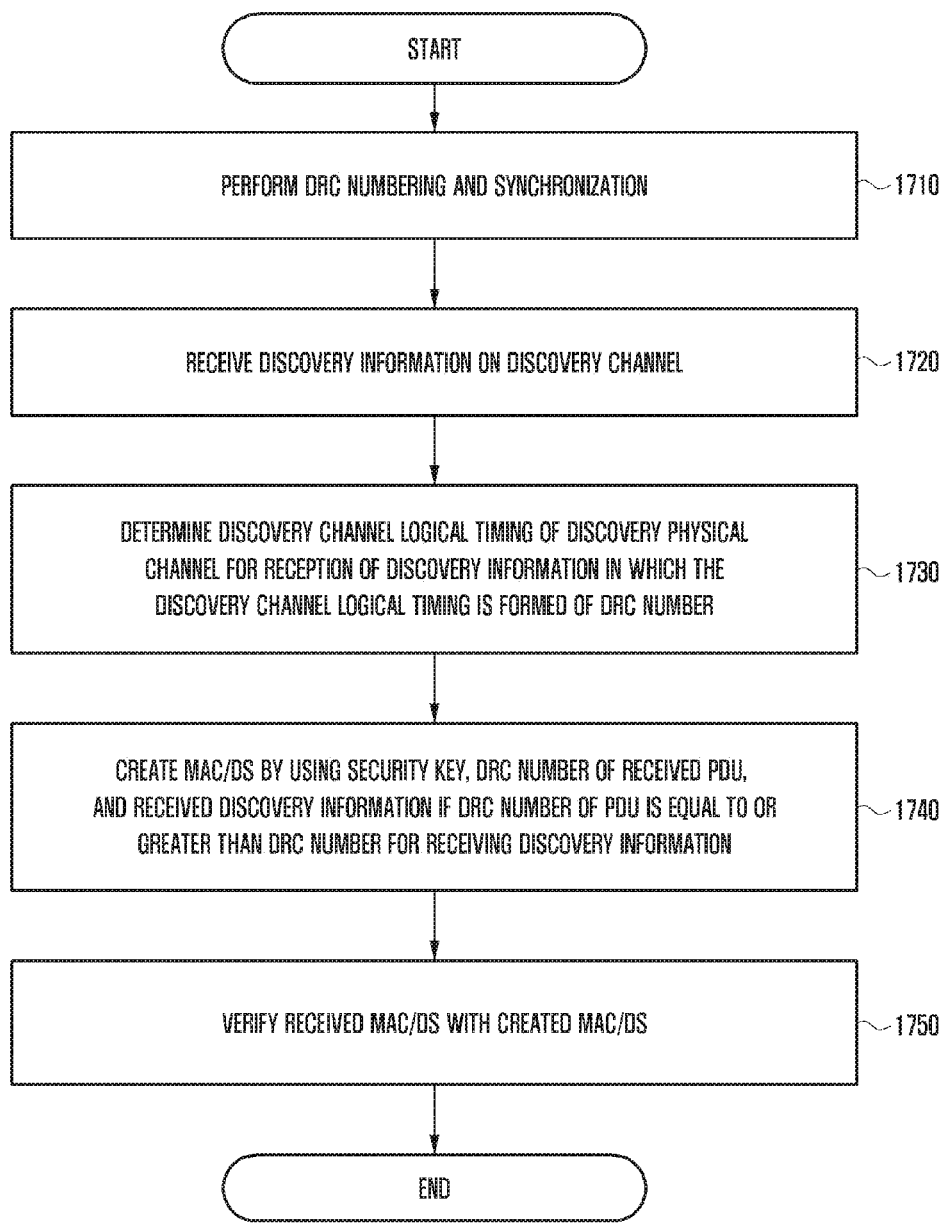
FIG. 17 is a flow diagram illustrating a method for verifying received discovery information at a receiver according to yet another embodiment of the present invention.

FIG. 15 is a flow diagram illustrating a method for securing discovery information at a transmitter according to yet another embodiment of the present invention, FIG. 16 is a diagram illustrating a method of MAC or DS creation according to yet another embodiment of the present invention, and FIG. 17 is a flow diagram illustrating a method for verifying received discovery information at a receiver according to yet another embodiment of the present invention.

The present embodiment 1D is identical to the embodiment 1C shown as the replay protection method in FIGS. 12, 13 and 14 except that the last DRC number of a discovery physical channel for the last transmission of discovery information to be secured is offered, to a security algorithm, instead of a DRC number of a discovery physical channel for transmission of discovery information.

In this method, it is supposed that the same discovery information is transmitted to a plurality of DRCs. In this case of the plurality of DRCs, the discovery information is secured once and then transmitted for the plurality of DRCs. As a result, the transmitter does not need to create secured discovery information at each transmission. This may reduce transmission processing.

Referring to FIG. 16, the last DRC number as well as a MAC or DS may be added to a discovery PDU.

In some embodiments, if a discovery PDU is transmitted with the same discovery physical channel index and/or discovery subframe number at all DRCs up to the last DRC indicated by the last DRC number, the discovery physical channel index and/or discovery subframe number may be used together with the last DRC number.

If a DRC number of the PDU is equal to or greater than a DRC number of a discovery physical channel for receiving discovery information, receiving UE processes received PDU. In order to create a MAC, the receiving UE uses the DRC number of the PDU together with a security key. Then the created MAC is compared with a received MAC. If rogue UE replays a message, a DRC number of a discovery physical channel received by UE may be different from a number used for transmission. This may cause a failure in MAC verification. A tuple of a security key and timing information of discovery physical channel indicated by a DRC number is unique in transmission of discovery information.

Hereinafter, the embodiment 1D will be described. For convenience, the repetition of the same as described in the embodiments 1A to 1C will be avoided.

Referring to FIG. 15, the transmitter has discovery information that needs to be transmitted safely on a discovery channel. At step 1510, the transmitter performs DRC numbering and synchronization in case of being not synchronized yet. Since a detailed description is previously given with reference to FIG. 6, the same will be omitted.

Thereafter, at step 1520, the transmitter determines information about a logical time at which a discovery physical channel that carries discovery information is transmitted. The determined timing information may include a DRC number.

Additionally, at step 1530, the transmitter may create a MAC or a DS by using a security key, the determined discovery channel logical timing information, and discovery information to be transmitted. At this time, in addition to discovery information to be secured and a security key, the last DRC number may be offered to a security algorithm as shown in FIG. 16. Thereafter, the security algorithm creates a MAC or a DS. Then the created MAC or DS may be added to discovery information.

Then, at step 1540, the discovery information secured using the MAC or DS may be transmitted on a discovery channel.

Referring to FIG. 17, at step 1710, the receiver performs DRC numbering and synchronization in case of being not synchronized yet. The receiver receives broadcast information that carries a DRC number, and synchronizes with a DRC. At this time, the broadcast information may be transmitted by a BS or a group leader. Before receiving any discovery information, the receiver should number a DRC and be synchronized with the DRC.

After DRC numbering and synchronization, at step 1720, the receiver monitors a discovery channel. The receiver may receive secured discovery information on the discovery channel.

Thereafter, at step 1730, the receiver determines information about a time at which a discovery physical channel that carries discovery information is received. The determined timing information may include a DRC number.

If a DRC number of a PDU is equal to or greater than a DRC number for receiving discovery information, the receiver may create, at step 1740, a MAC or a DS by using a security key, the determined discovery channel logical timing information, and received discovery information. At this time, in addition to discovery information to be secured and a security key, the last DRC number may be offered to the security algorithm as shown in FIG. 16. Thereafter, the security algorithm creates a MAC or a DS.

Then, at step 1750, the receiver may compare the created MAC or DS with a MAC or DS received together with discovery information from a transmitter.

<Embodiment 1E>

Figure 18:
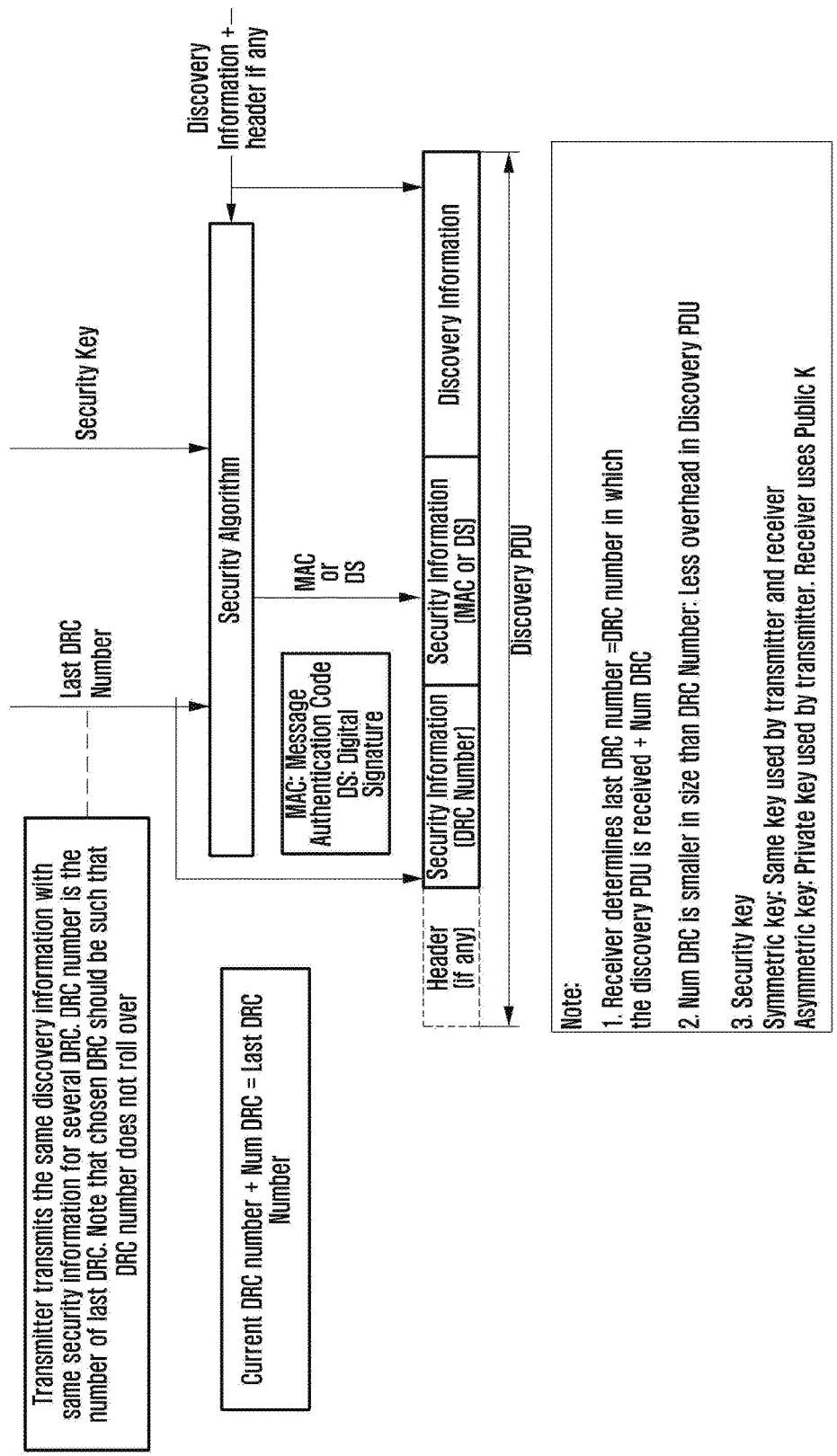
FIG. 18 is a diagram illustrating a method of MAC or DS creation according to further another embodiment of the present invention.

FIG. 18 is a diagram illustrating a method of MAC or DS creation according to further another embodiment of the present invention.

The present embodiment 1E is identical to the embodiment 1D shown as the replay protection method in FIGS. 15, 16 and 17 except that a difference between a current DRC number and the last DRC number of a DRC for transmission of discovery information is included, instead of the last DRC number, in a discovery PDU.

This reduces overhead. However, this needs an update of a DRC number field of a discovery PDU at each transmission. The methods performed by the transmitter and the receiver are the same as discussed in FIGS. 15 and 17, respectively, so a detailed description will be omitted.

<Second Embodiment: MAC (Message Authentication Code)/DS (Digital Signature) Creation Using Discovery Channel Logical Timing Information and Partial Absolute System Time Information>

In the second embodiment, a discovery resource and DRC numbering, discovery subframe numbering, discovery physical channel numbering, and synchronization of DRC numbering are the same as discussed in the first embodiment.

In an embodiment, a security key may be a symmetric key which is used equally by a transmitter and a receiver. In another embodiment, a security key may be an asymmetric key which is used differently by a transmitter and a receiver. According to an embodiment, a key pair of a public key and a private key in which the public key may be used by a transmitter and the private key may be used by a receiver. While a security algorithm creates a MAC in case of the symmetric key, a security algorithm creates a DS in case of the asymmetric key.

In an embodiment, a symmetric security key or asymmetric security key pair may be applied in common to open discovery for all types of services. In another embodiment, a symmetric security key or asymmetric security key pair may be applied to a specific type of service. For example, UE may support one or more services each of which is identified by means of a D2D application ID or D2D service ID. When requesting a D2D application code or D2D service code corresponding to a D2D application ID or D2D service ID, UE may obtain a security key from a D2D server. A D2D service code or D2D application code may be transmitted as part of discovery information by UE. Therefore, each UE may have a plurality of security keys each of which corresponds to each D2D application ID or D2D service ID or each D2D application code or D2D service code. In another embodiment, a symmetric security key or asymmetric security key pair may be also applied to specific UE that transmits discovery information. In still another embodiment, a symmetric security key or asymmetric security key pair may be also applied to specific UE that transmits discovery information to a group of UEs.

As for a security key update trigger according to an embodiment, a security key does not need to be updated when DRCs roll over in such an approaching manner.

Figure 19:
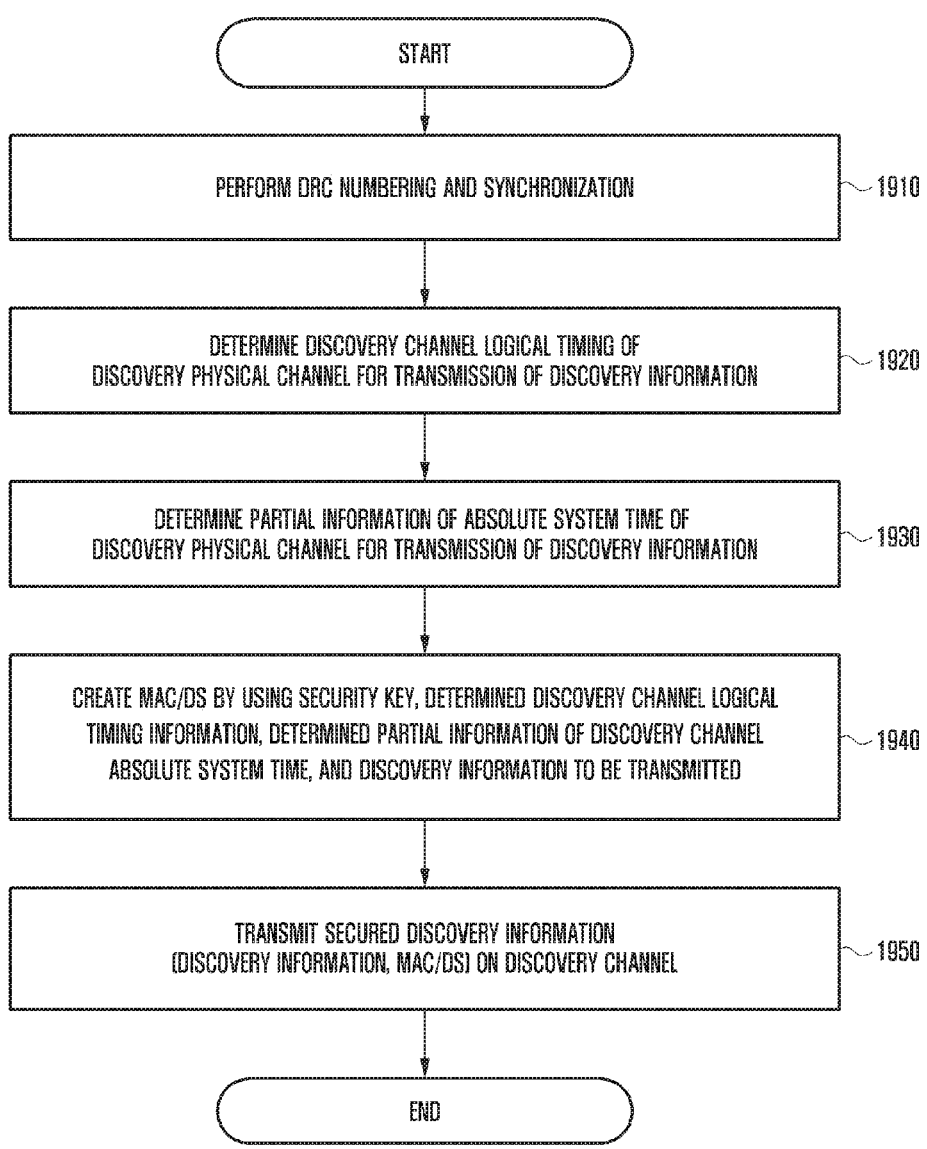
FIG. 19 is a flow diagram illustrating a method for securing discovery information at a transmitter according to an embodiment of the present invention.
Figure 20:
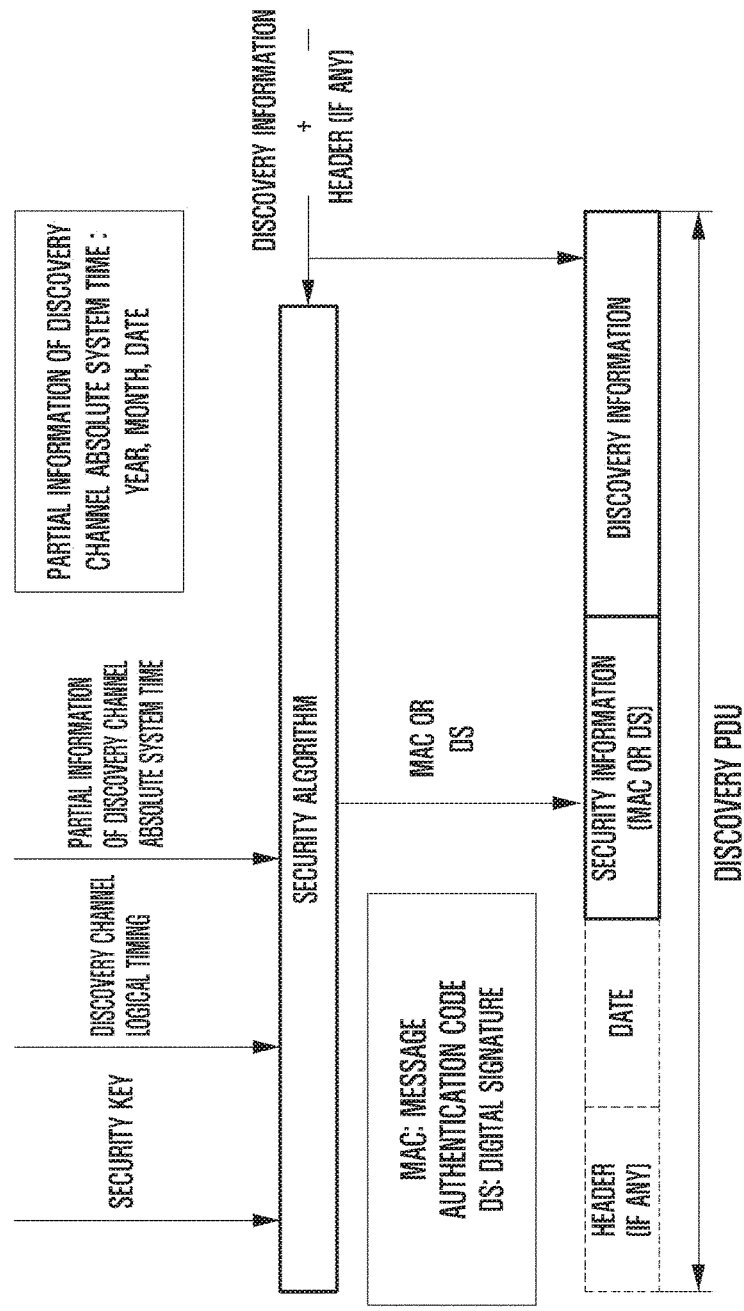
FIG. 20 is a diagram illustrating a method of MAC or DS creation according to an embodiment of the present invention.

FIG. 19 is a flow diagram illustrating a method for securing discovery information at a transmitter according to an embodiment of the present invention, and FIG. 20 is a diagram illustrating a method of MAC or DS creation according to an embodiment of the present invention.

Referring to FIG. 19, the transmitter (i.e., D2D UE) has discovery information that needs to be transmitted safely on a discovery channel. At step 1910, the transmitter performs DRC numbering and synchronization in case of being not synchronized yet. The transmitter receives broadcast information that carries a DRC number, and synchronizes with a DRC. At this time, the broadcast information may be transmitted by a BS or a group leader. Before transmitting any discovery information, the transmitter should number a DRC and be synchronized with the DRC. Since the method of DRC numbering and synchronization is previously discussed in FIG. 5, a detailed description will be omitted.

In an embodiment, at step 1920, the transmitter determines information about a logical time at which a discovery physical channel that carries discovery information is transmitted. The determined timing information may include at least one of a DRC number, a discovery subframe number (or a frame number and a subframe number), and a discovery physical channel index of a discovery physical channel. According to an embodiment, when a single DRC has a plurality of DRIs which are numbered, a DRI number may be also determined.

Thereafter, at step 1930, the transmitter determines partial information about an absolute system time at which a discovery physical channel that carries discovery information is transmitted. The absolute system time may include year, month, date, hour, minute, and second. The determined partial absolute system time information may include year, month, and date at which such discovery information is transmitted.

1. According to an embodiment, the transmitter may determine this by using a system clock. Since all UEs maintain a system time, such information may be easily determined. In another embodiment, a network may transmit partial information about a system together with D2D configuration. For some hours during the change of date, a transmitter and a receiver may have a difference between their dates. In this method for solving a difference between system times of the transmitter and the receiver, the transmitter may not perform transmission within a fixed period of time after the date is changed. In another method, the transmitter may perform transmission without worry about a difference in the system time. In case there is any difference in date, the receiver may not receive it. In another method, the transmitter may add date information to discovery information. This may be added for all cases of discovery information transmission. Alternatively, it may be added to discovery information during a time window when the change of date occurs.

2. In another embodiment, a BS may transmit partial information about a system time together with a DRC number. The BS may indicate a date corresponding to a DRC. This may solve a difference in time associated with the change of date.

3. In another method, the network may transmit partial information about a system together with D2D configuration.

In some embodiments, the determined partial information about absolute system time information may include hour, minute, second, or additional information such as week information.

Thereafter, at step 1940, the transmitter may create a MAC or a DS by using a security key, the determined discovery channel logical timing information, the determined discovery channel absolute system time, and discovery information to be transmitted.

Specifically, according to an embodiment, in addition to discovery information to be secured and a security key, a discovery physical channel index of a discovery physical channel for transmission of discovery information to be secured, a discovery subframe number, a DRC number, and partial information about an absolute system time for transmission of discovery information to be secured may be offered to a security algorithm as shown in FIG. 20.

Thereafter, the security algorithm creates a MAC or a DS. Then the created MAC or DS may be added to discovery information.

Then, at step 1950, the discovery information secured using the MAC or DS may be transmitted on a discovery channel.

In some embodiments, the secured discovery information may be fragmented and transmitted through a plurality of discovery physical channels. In this case, a discovery physical channel index, a discovery subframe number, and a DRC number of one of fragments (the first fragment or the last fragment) may be used for securing discovery information. Alternatively, a discovery physical channel index, a discovery subframe number, and a DRC number of one of all fragments may be used. In some embodiment, the discovery information may be secured after fragmented rather than non-fragmented discovery information is secured. In this case, a discovery physical channel index, a discovery subframe number, and a DRC number of each fragment may be used for securing discovery information.

Referring to FIG. 20, in an embodiment, a discovery PDU that carries secured discovery information may include discovery information and a MAC or DS. Additionally, the discovery PDU may further include a security indicator that indicates whether security is applied. According to an embodiment, in case security is always applied, no security indicator may be needed. According to an embodiment, if security is based on a discovery type or category and if the discovery type or category is indicated using one of fields in a header of the discovery PDU, no security indicator may be needed. The discovery PDU that carries secured discovery information may also include a security key index for identifying a security key to be used for securing discovery information. Also, as shown in FIG. 20, the discovery PDU may further include information about date in addition to discovery information and MAC or DS.

Figure 21:
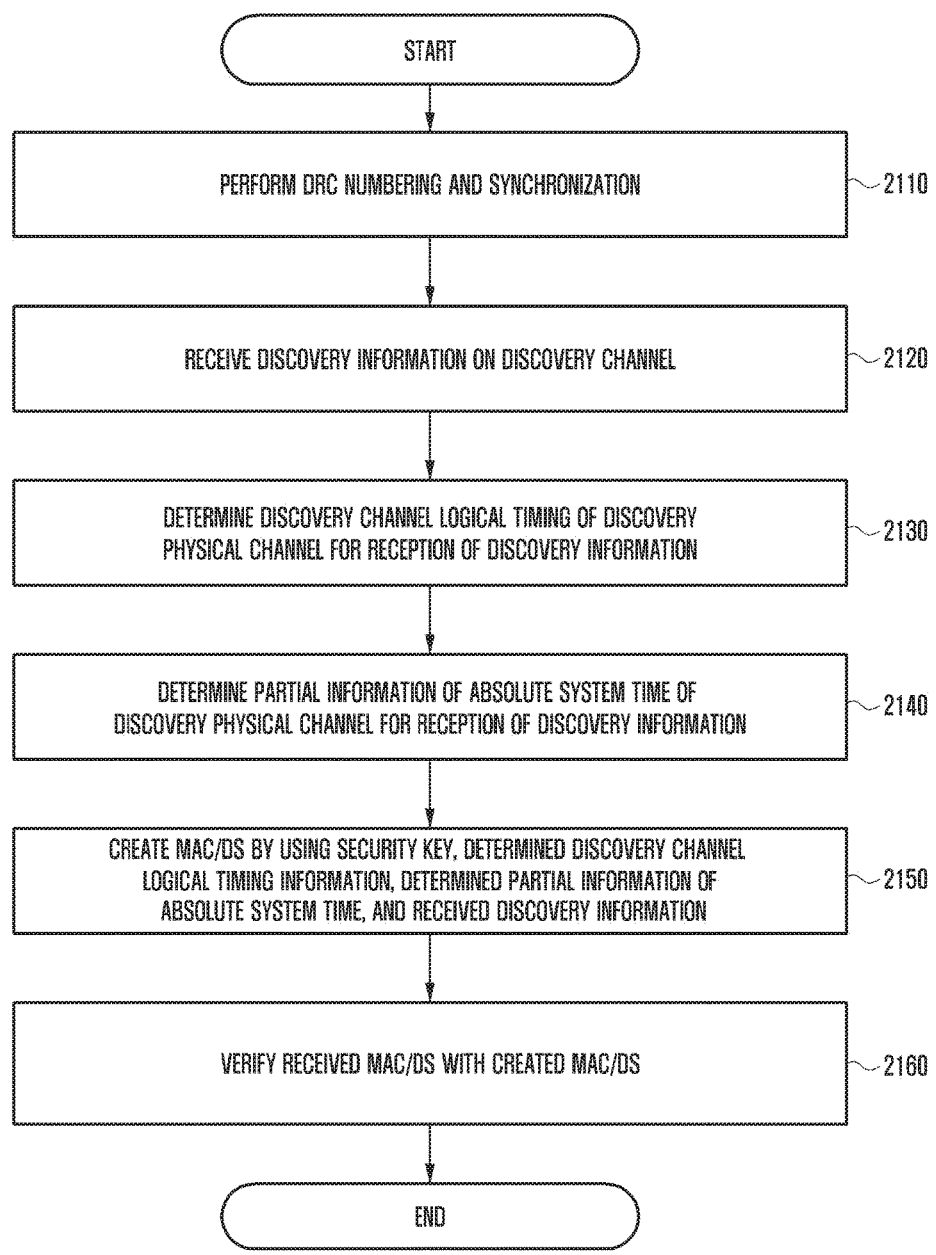
FIG. 21 is a flow diagram illustrating a method for verifying received discovery information at a receiver according to an embodiment of the present invention.

FIG. 21 is a flow diagram illustrating a method for verifying received discovery information at a receiver according to an embodiment of the present invention.

Referring to FIG. 21, at step 2110, the receiver performs DRC numbering and synchronization in case of being not synchronized yet. The receiver receives broadcast information that carries a DRC number, and synchronizes with a DRC. At this time, the broadcast information may be transmitted by a BS or a group leader. Before receiving any discovery information, the receiver should number a DRC and be synchronized with the DRC.

After DRC numbering and synchronization, at step 2120, the receiver monitors a discovery channel. The receiver (e.g., D2D UE) may receive secured discovery information on the discovery channel.

Thereafter, at step 2130, the receiver determines information about a time at which a discovery physical channel that carries discovery information is received. The determined timing information may include at least one of a DRC number, a discovery subframe number (or a frame number and a subframe number), and a discovery physical channel index of a discovery physical channel. In an embodiment in which a single DRC has a plurality of DRIs which are numbered, a DRI number may be also determined.

Additionally, at step 2140, the receiver determines partial information about an absolute system time at which a discovery physical channel that carries discovery information is transmitted. The determined partial information about absolute system time information may include information about year, month, and date at which such discovery information is received.

1. In an embodiment, the receiver may determine this absolute system time information by using its own system clock. Since all UEs maintain a system time, such information may be easily determined. In another embodiment, a network may transmit partial information about a system together with D2D configuration. For some hours during the change of date, a transmitter and a receiver may have a difference between their dates. In this method for solving a difference between system times of the transmitter and the receiver, the receiver may not perform reception within a fixed period of time after the date is changed. In another method, the receiver may perform reception without worry about a difference in the system time. In case there is any difference in date, the receiver may not receive it. In another method, the receiver may use data information received in the discovery information instead of its own date.

2. In another embodiment, a BS may transmit partial information about a system time together with a DRC number. The BS may indicate a date corresponding to a DRC. This may solve a difference in time associated with the change of date.

3. In another method, the network may transmit partial information about a system together with D2D configuration.

In some embodiments, the determined partial information about absolute system time information may be formed of hour, minute, second, or additional information such as week information.

Thereafter, at step 2150, the receiver may create a MAC or a DS by using a security key, the determined discovery channel logical timing information, and received discovery information.

Specifically, according to an embodiment, in addition to discovery information to be secured and a security key, a discovery physical channel index of a discovery physical channel for reception of discovery information to be secured, a discovery subframe number (or a frame number and a subframe number), and a DRC number may be offered to the security algorithm as shown in FIG. 20. The security algorithm may be executed in the receiver or a D2D server. Also, the receiver may transmit the received information (a MAC or DS, a DRC number, a discovery subframe number (or a frame number and a subframe number), partial information of a system time, and a discovery physical channel index) and discovery information to the D2D server. In an embodiment in which a single DRC has a plurality of DRIs which are numbered, a DRI number may be also used as an additional input to the security algorithm. Thereafter, the security algorithm creates a MAC or a DS.

Then, at step 2160, the receiver may compare the created MAC or DS with a MAC or DS received together with discovery information from a transmitter. If a rogue transmitter replays a message, a DRC number, a discovery subframe number, and a discovery physical channel index of a discovery physical channel, received at the receiver, may be different from those used for transmission in a genuine transmitter. This may cause a failure in MAC or DS verification at the receiver.

In an alternate embodiment of the present second embodiment, logical timing information may include the following information.

a) DRC Number and Discovery Subframe Number: If a discovery physical channel is frequency division multiplexed at subframe, a discovery physical channel index may not be used if a discovery PDU transmitted at subframe by UE disallows a replay by rogue UE at the same subframe. On the other hand, in case of time division multiplexing of a discovery physical channel at a single subframe, a replay attack of rogue UE is possible and thus the replay protection method previously discussed in the embodiment 1A may be used. However, if a subframe duration time is very small in case of time division multiplexing of a discovery physical channel at a single subframe, this method may be used. Since this method is similar to the above-discussed embodiment 1B, a detailed description will be omitted.

b) DRC Number: When it is estimated that discovery information transmitted by UE is not updated during a DRI, a discovery subframe number is not needed. In this case, even though rogue UE replays a discovery PDU during a DRI, it does not affect receiving UE. This is fact in case of open discovery (e.g., advertisement, etc.). In case of limited discovery, it is desirable to always use a discovery subframe number. However, if a DRI is small, rogue UE cannot perform a replay in the DRI even in case of limited discovery and thus may need no discovery subframe number. Therefore, this method may be used when a DRI is small. Since this method is similar to the above-discussed embodiment 1C, a detailed description will be omitted.

c) Last DRC Number: The last DRC number of a discovery physical channel for the last transmission of discovery information to be secured may be offered to a security algorithm. In this method, it is supposed that the same discovery information is transmitted to a plurality of DRCs. In this case of the plurality of DRCs, the discovery information is secured once and then transmitted for the plurality of DRCs. As a result, the transmitter does not need to create secured discovery information at each transmission. This reduces transmission processing. The last DRC number may be added to a discovery PDU other than MAC. Since this method is similar to the above-discussed embodiments 1D and 1E, a detailed description will be omitted.

<Third Embodiment: CRC Creation Using Discovery Channel Logical Timing Information>

In the third embodiment, a discovery resource and DRC numbering, discovery subframe numbering, discovery physical channel numbering, and synchronization of DRC numbering, associated with discovery channel logical timing, are the same as discussed in the first embodiment.

In an embodiment, a security key may be a symmetric key which is used equally by a transmitter and a receiver. In another embodiment, a security key may be an asymmetric key which is used differently by a transmitter and a receiver. According to an embodiment, a key pair of a public key and a private key in which the public key may be used by a transmitter and the private key may be used by a receiver. While a security algorithm creates a MAC in case of the symmetric key, a security algorithm creates a DS in case of the asymmetric key.

In an embodiment, a symmetric security key or asymmetric security key pair may be applied in common to open discovery for all types of services. In another embodiment, a symmetric security key or asymmetric security key pair may be applied to a specific type of service. For example, UE may support one or more services each of which is identified by means of a D2D application ID or D2D service ID. When requesting a D2D application code or D2D service code corresponding to a D2D application ID or D2D service ID, UE may obtain a security key from a D2D server. A D2D service code or D2D application code may be transmitted as part of discovery information by UE. Therefore, each UE may have a plurality of security keys each of which corresponds to each D2D application ID or D2D service ID or each D2D application code or D2D service code. In another embodiment, a symmetric security key or asymmetric security key pair may be also applied to specific UE that transmits discovery information. In still another embodiment, a symmetric security key or asymmetric security key pair may be also applied to specific UE that transmits discovery information to a group of UEs.

A security key used by a transmitter and a receiver is updated by UEs participating in discovery whenever DRC numbers roll over.

Hereinafter, a method for creating a discovery PDU CRC will be described.

Figure 22:
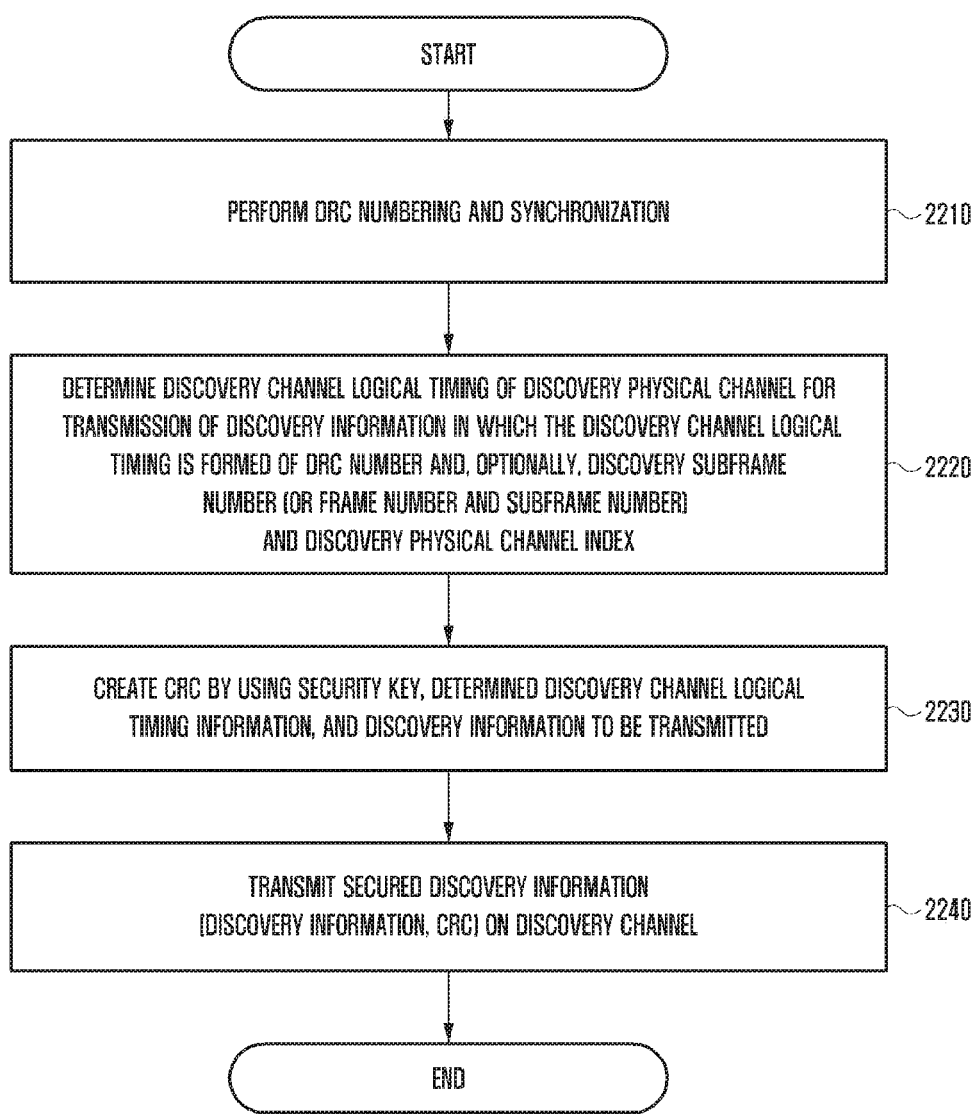
FIG. 22 is a flow diagram illustrating a method for securing discovery information at a transmitter according to an embodiment of the present invention.
Figure 23:
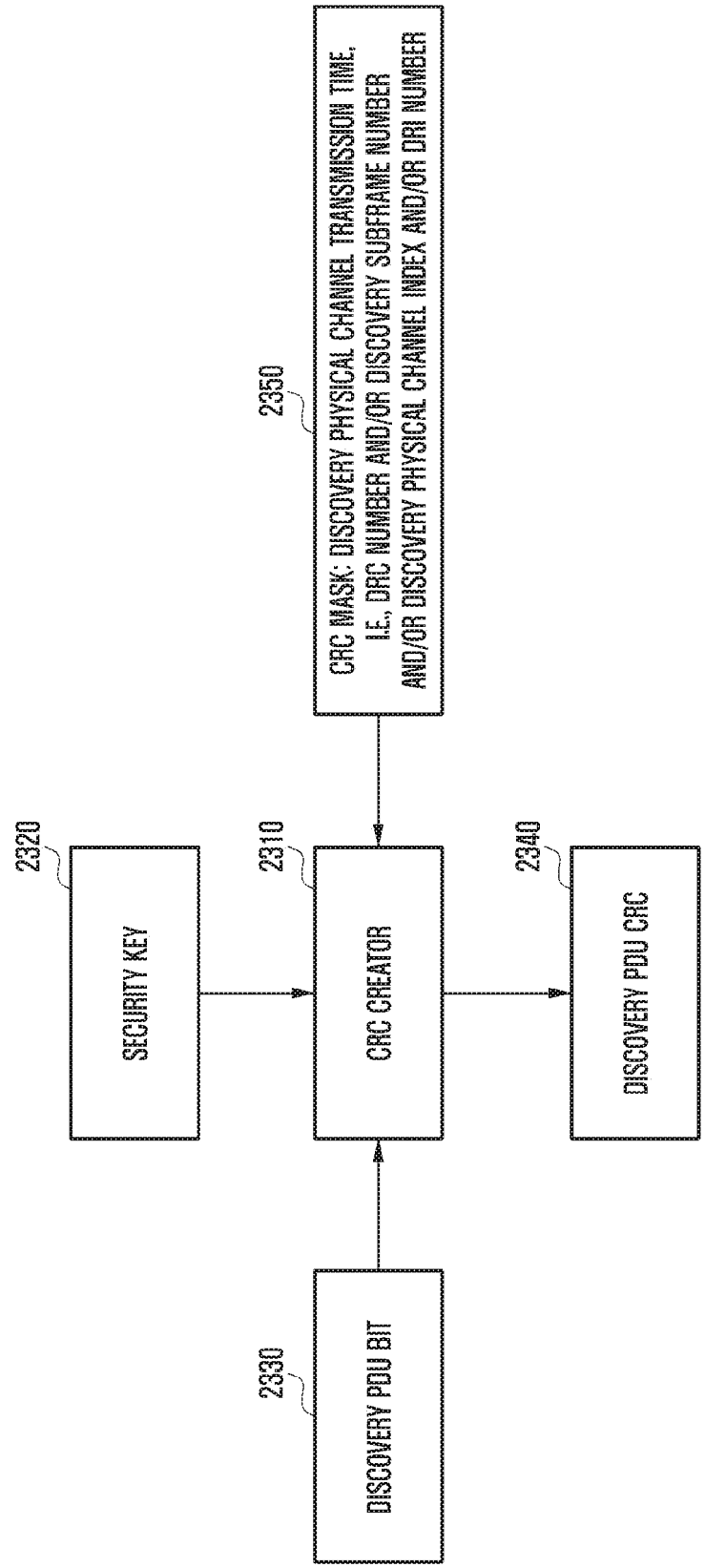
FIG. 23 is a diagram illustrating a method of CRC creation according to an embodiment of the present invention.
Figure 24:
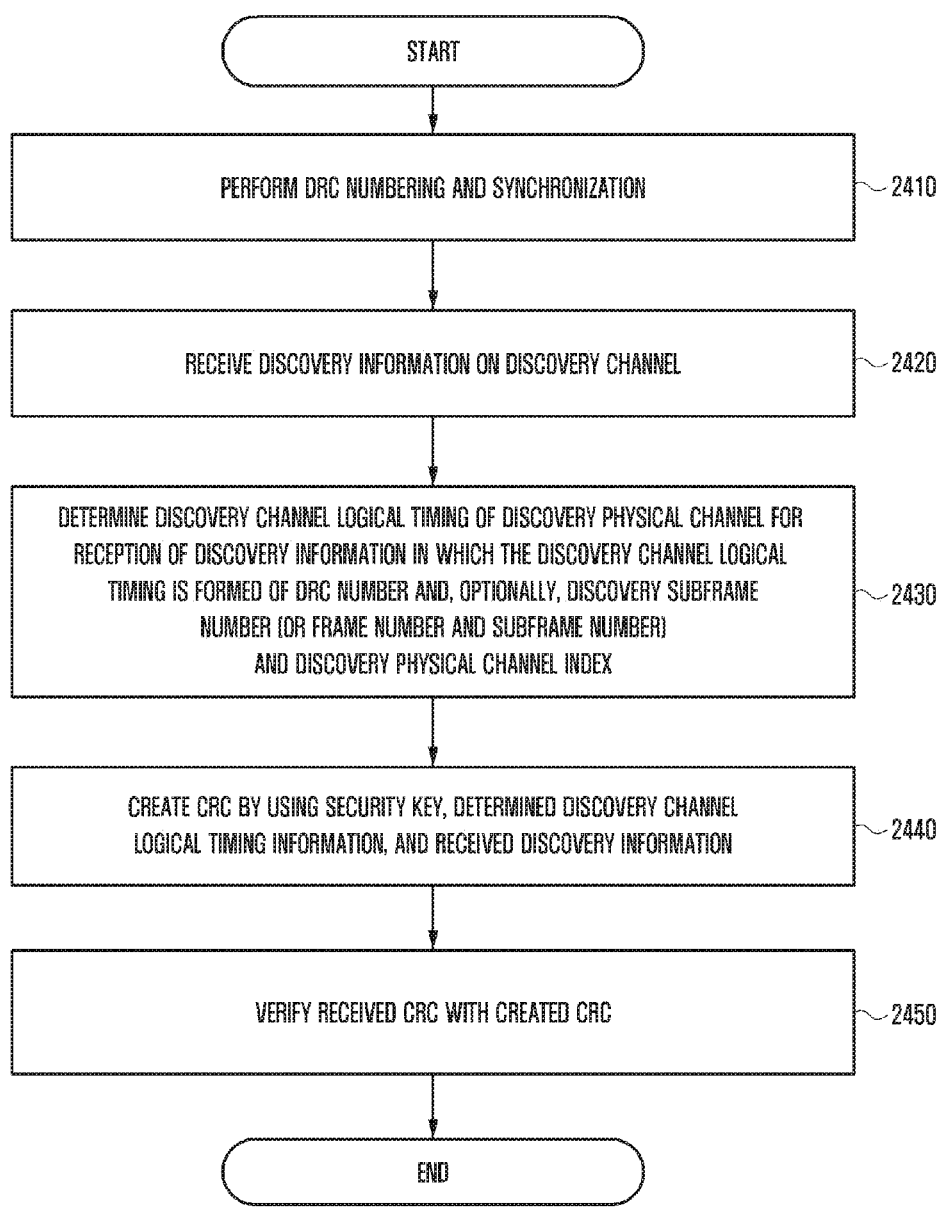
FIG. 24 is a flow diagram illustrating a method for verifying received discovery information at a receiver according to an embodiment of the present invention.

FIG. 22 is a flow diagram illustrating a method for securing discovery information at a transmitter according to an embodiment of the present invention, FIG. 23 is a diagram illustrating a method of CRC creation according to an embodiment of the present invention, and FIG. 24 is a flow diagram illustrating a method for verifying received discovery information at a receiver according to an embodiment of the present invention.

Referring to FIG. 22, at step 2210, the transmitter performs DRC numbering and synchronization in case of being not synchronized. Before transmitting any information, the transmitter should number a DRC and be synchronized with the DRC. Since the method of DRC numbering and synchronization is previously discussed in FIG. 5, a detailed description will be omitted.

Thereafter, at step 2220, the transmitter may determine information about a discovery channel logical time of a discovery channel that carries discovery information. The determined discovery channel logical timing information may include a DRC number. At this time, depending on embodiments, at least one of a discovery subframe number (or a frame number and a subframe number) and a discovery physical channel index may be further included.

Additionally, at step 2230, the transmitter may create a CRC by using a security key, the determined discovery channel logical timing information, and discovery information to be transmitted.

Specifically, referring to FIG. 23, a CRC creator 2310 may create a CRC 2340 by using a discovery PDU bit 2330, a security key 2320, and a CRC mask 2350. The CRC mask 2350 may include a discovery physical channel transmission time, i.e., a DRC number and/or a discovery subframe number (or a frame number and a subframe number) and/or a discovery physical channel index.

Thereafter, at step 2240, the transmitter may transmit discovery information obtained in a discovery channel, together with the CRC.

Referring to FIG. 24, at step 240, the receiver performs DRC numbering and synchronization in case of being not synchronized yet. Before receiving any discovery information, the receiver should number a DRC and be synchronized with the DRC. Since the method of DRC numbering and synchronization is previously discussed in FIG. 5, a detailed description will be omitted.

After DRC numbering and synchronization, at step 2420, the receiver monitors a discovery channel. The receiver (e.g., D2D UE) may receive secured discovery information on the discovery channel.

Thereafter, at step 2430, the receiver determines information about a discovery channel logical time of a discovery channel that carries discovery information. The determined discovery channel logical timing information may include a DRC number. At this time, depending on embodiments, at least one of a discovery subframe number and a discovery physical channel index may be further included.

Additionally, at step 2440, the transmitter may create a CRC by using a security key, the determined discovery channel logical timing information, and discovery information to be transmitted.

Specifically, referring to FIG. 23, the CRC creator 2310 may create the CRC 2340 by using the discovery PDU bit 2330, the security key 2320, and the CRC mask 2350. The CRC mask 2350 may include a discovery physical channel transmission time, i.e., a DRC number and/or a discovery subframe number and/or a discovery physical channel index.

Thereafter, at step 2450, the receiver may compare the created CRC with a CRC received together with discovery information from a transmitter.

At this time, rogue UE may obtain a discovery PDU bit and, based on a new discovery physical channel transmission time, may create a new CRC. However, rogue UE has no security key, and thus a CRC created by the rogue UE may be not identical to a CRC created by the receiver. Additionally, even in case the rogue UE replays a received discovery PDU without any change, a discovery CRC created by the receiver may be different from that obtained by a received discovery PDU since a discovery PDU transmission time by the rogue UE may be different from a real transmission time of a discovery PDU. Meanwhile, depending on embodiments, a discovery PDU bit may be formed of encrypted discovery information bits.

Figure 25:
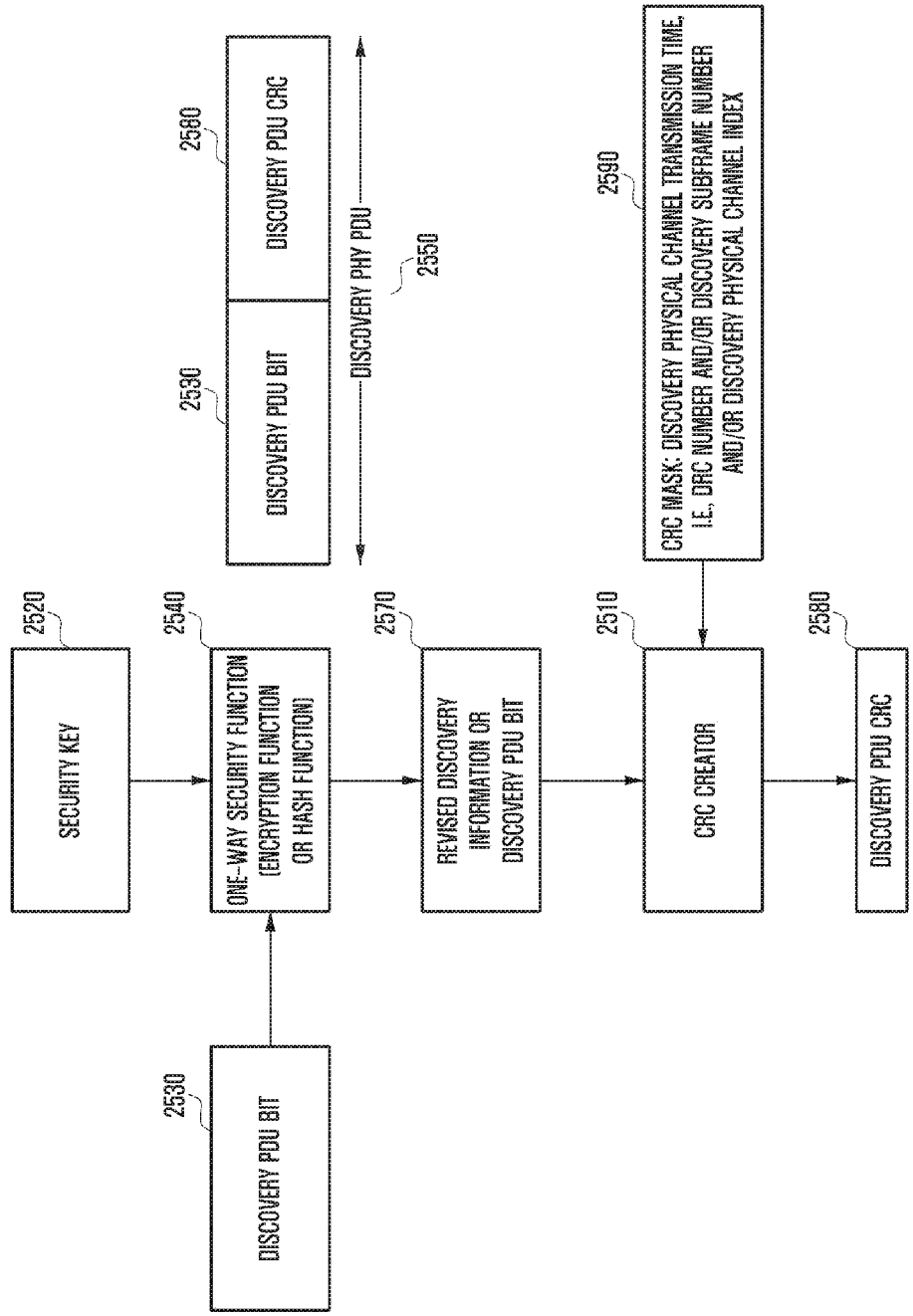
FIG. 25 is a diagram illustrating a method of CRC creation according to another embodiment of the present invention.

FIG. 25 is a diagram illustrating a method of CRC creation according to another embodiment of the present invention.

Referring to FIG. 25, a discovery PDU bit 2530 may be revised using a security key 2520 and a one-way security function 2540 (e.g., an encryption function or a hash function). Thus, revised discovery information or a revised discovery PDU bit 2570 may be created. Thereafter, the revised discovery PDU bit 2570 may be used for creating a CRC 2580 as shown in FIG. 23. Namely, a CRC creator 2510 may create the CRC 2580 by using the revised discovery information or the revised discovery PDU bit 2570 and a CRC mask 2590. At this time, the CRC mask 2590 may include a discovery physical channel transmission time, i.e., a DRC number and/or a discovery subframe number and/or a discovery physical channel index.

Thereafter, a discovery physical PDU 2550 including the raw, before revised, discovery PDU bit 2530 and the created discovery PDU CRC 2580 may be transmitted on a discovery physical channel. At this time, the revised discovery PDU bit 2570 is not transmitted on the discovery physical channel.

Figure 26:
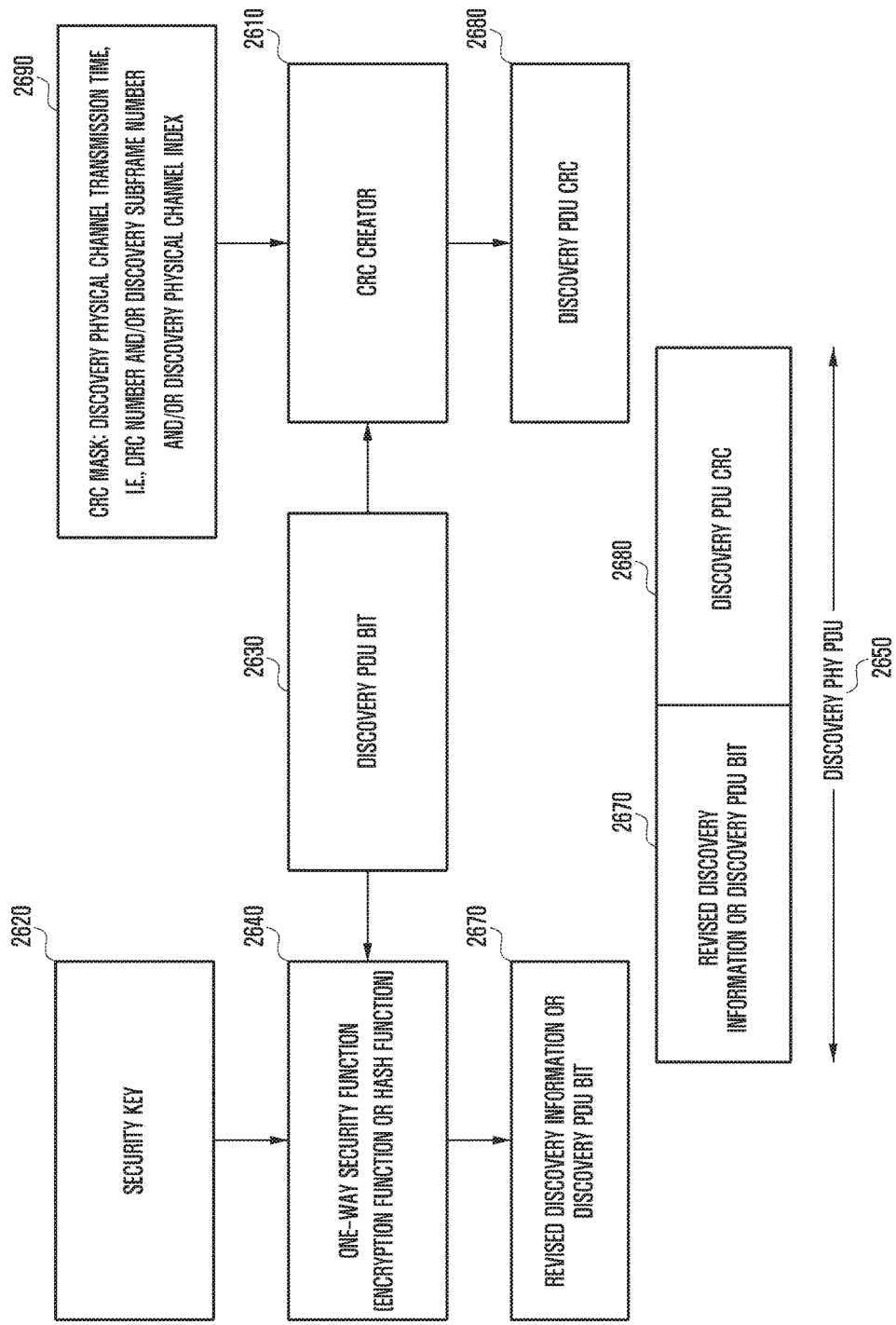
FIG. 26 is a diagram illustrating a method of CRC creation according to still another embodiment of the present invention.

FIG. 26 is a diagram illustrating a method of CRC creation according to still another embodiment of the present invention.

Referring to FIG. 26, a discovery PDU bit 2630 may be revised using a security key 2620 and a one-way security function 2640 (e.g., an encryption function or a hash function). Thus, revised discovery information or a revised discovery PDU bit 2670 may be created. Thereafter, the non-revised, raw discovery PDU bit 2630 may be used for creating a CRC 2680 as shown in FIG. 23. Namely, a CRC creator 2610 may create the CRC 2680 by using the non-revised discovery PDU bit 2630 and a CRC mask 2690. At this time, the CRC mask 2690 may include a discovery physical channel transmission time, i.e., a DRC number and/or a discovery subframe number and/or a discovery physical channel index.

Thereafter, a discovery physical PDU 2650 including the revised discovery PDU bit 2670 and the created discovery PDU CRC 2680 may be transmitted on a discovery physical channel. At this time, the non-revised raw discovery PDU bit 2630 is not transmitted on the discovery physical channel.

The replay protection method discussed hereinbefore may be applied to any type discovery as well as open or limited discovery. Although a security key may be varied according to different cases, the same method may be used. Normally, this method may be also applied to any information transmission and discovery information.

<Fourth Embodiment: CRC Creation Using Discovery Channel Logical Timing Information and Partial Absolute System Time Information>

In the fourth embodiment, a discovery resource and DRC numbering, discovery subframe numbering, discovery physical channel numbering, and synchronization of DRC numbering, associated with discovery channel logical timing, are the same as discussed in the first embodiment.

In an embodiment, a security key may be a symmetric key which is used equally by a transmitter and a receiver. In another embodiment, a security key may be an asymmetric key which is used differently by a transmitter and a receiver.

According to an embodiment, a key pair of a public key and a private key in which the public key may be used by a transmitter and the private key may be used by a receiver. While a security algorithm creates a MAC in case of the symmetric key, a security algorithm creates a DS in case of the asymmetric key.

In an embodiment, a symmetric security key or asymmetric security key pair may be applied in common to open discovery for all types of services. In another embodiment, a symmetric security key or asymmetric security key pair may be applied to a specific type of service. For example, UE may support one or more services each of which is identified by means of a D2D application ID or D2D service ID. When requesting a D2D application code or D2D service code corresponding to a D2D application ID or D2D service ID, UE may obtain a security key from a D2D server. A D2D service code or D2D application code may be transmitted as part of discovery information by UE. Therefore, each UE may have a plurality of security keys each of which corresponds to each D2D application ID or D2D service ID or each D2D application code or D2D service code. In another embodiment, a symmetric security key or asymmetric security key pair may be also applied to specific UE that transmits discovery information. In still another embodiment, a symmetric security key or asymmetric security key pair may be also applied to specific UE that transmits discovery information to a group of UEs.

As for a security key update trigger according to an embodiment, a security key used by a transmitter and a receiver does not need to be updated by UEs participating in discovery when DRCs roll over.

According to this embodiment, this method is identical to the method in the third embodiment except that discovery channel absolute system time information is further used in addition to discovery channel logical timing information. Additionally, partial absolute system time information may be determined by a transmitter and a receiver as discussed earlier in the second embodiment. So, a detailed description of the replay protection method will be omitted.

<Fifth Embodiment: MAC (Message Authentication Code)/DS (Digital Signature) Creation Using Discovery Channel System Time Information>

In the fifth embodiment, a security key may be a symmetric key which is used equally by a transmitter and a receiver. In another embodiment, a security key may be an asymmetric key which is used differently by a transmitter and a receiver. According to an embodiment, a key pair of a public key and a private key in which the public key may be used by a transmitter and the private key may be used by a receiver. While a security algorithm creates a MAC in case of the symmetric key, a security algorithm creates a DS in case of the asymmetric key.

In an embodiment, a symmetric security key or asymmetric security key pair may be applied in common to open discovery for all types of services. In another embodiment, a symmetric security key or asymmetric security key pair may be applied to a specific type of service. For example, UE may support one or more services each of which is identified by means of a D2D application ID or D2D service ID. When requesting a D2D application code or D2D service code corresponding to a D2D application ID or D2D service ID, UE may obtain a security key from a D2D server. A D2D service code or D2D application code may be transmitted as part of discovery information by UE. Therefore, each UE may have a plurality of security keys each of which corresponds to each D2D application ID or D2D service ID or each D2D application code or D2D service code. In another embodiment, a symmetric security key or asymmetric security key pair may be also applied to specific UE that transmits discovery information. In still another embodiment, a symmetric security key or asymmetric security key pair may be also applied to specific UE that transmits discovery information to a group of UEs.

<Embodiment 5A>

In this method, it is supposed that there is synchronization between a system frame and an absolute system time.

Figure 27:
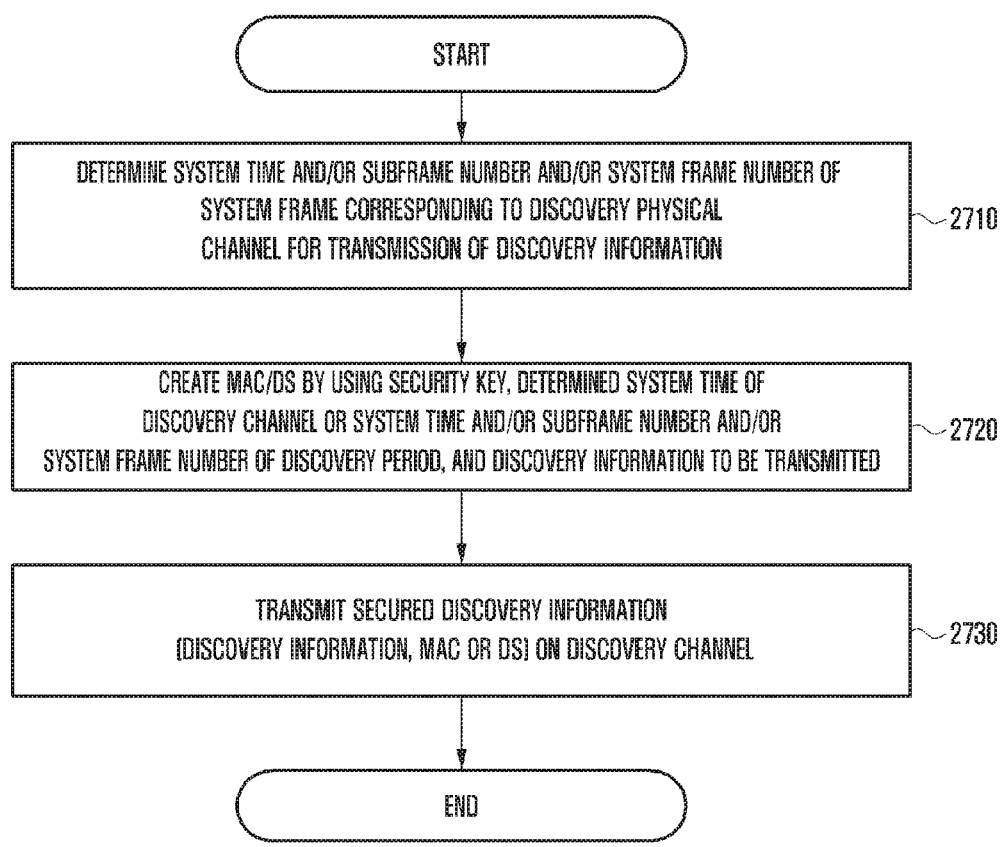
FIG. 27 is a flow diagram illustrating a method for securing discovery information at a transmitter according to an embodiment of the present invention.
Figure 28:
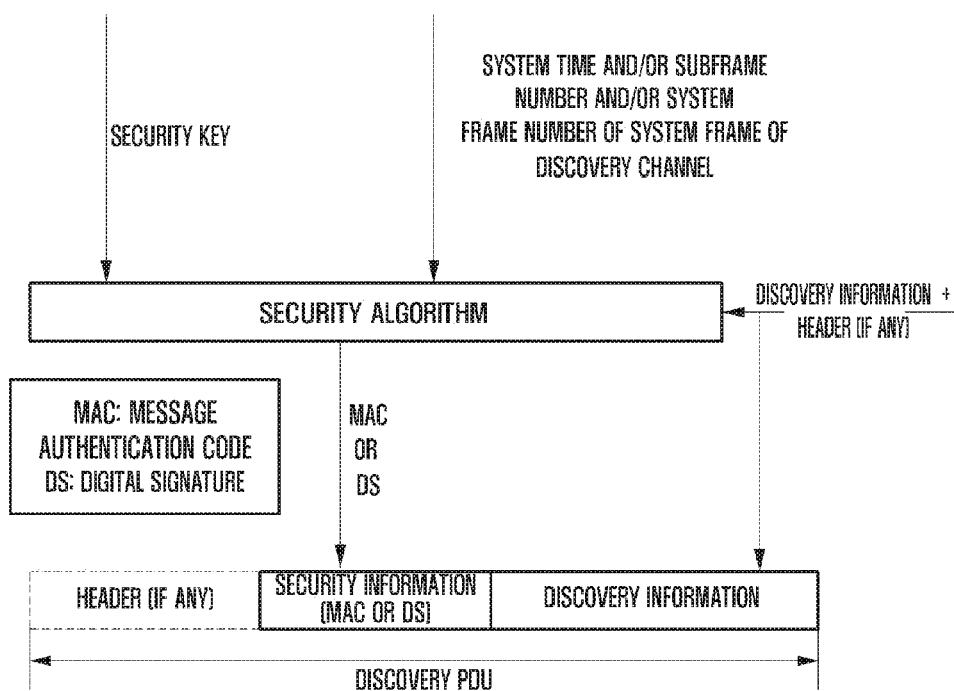
FIG. 28 is a diagram illustrating a method of MAC or DS creation according to an embodiment of the present invention.

FIG. 27 is a flow diagram illustrating a method for securing discovery information at a transmitter according to an embodiment of the present invention, and FIG. 28 is a diagram illustrating a method of MAC or DS creation according to an embodiment of the present invention.

Referring to FIG. 27, the transmitter (i.e., D2D UE) has discovery information that needs to be transmitted safely on a discovery channel. At the outset, in case of being not synchronized yet, the transmitter is synchronized with a system frame and/or a universal coordinated time corresponding to the system frame. The synchronization with the universal coordinated time corresponding to the system frame may be obtained by reading system information, transmitted by a BS, carrying the universal coordinated time corresponding to a system frame number. The universal coordinated time indicates an integer count in the unit of 10 ms after 00:00:00, Jan. 1, 1900. The synchronization with the system frame number may be obtained by reading broadcast information carrying the system frame number. At this time, the broadcast information may be transmitted by a BS or a group leader. According to an embodiment, the system frame number may be transmitted by means of two parts by the BS. The first part that carries MSB of the system frame number and LSB of the system frame number may be transmitted in different blocks of broadcast information. For example, a system information block 'x' may carry LSBs of the system frame number, and a system information block 'y' may carry MSBs of the system frame number. The transmitter may determine the system frame number by reading all blocks of system information. Alternatively, the D2D UE may determine the universal coordinated time from other source, e.g., GPS, NITZ, or the like.

In an embodiment, thereafter, at step 2710, the transmitter may determine information about a system time (e.g., a universal coordinated time, i.e., a system time counter that offers an integer count in the unit of 10 ms after 00:00:00, Jan. 1, 1900) and/or a subframe number and/or a system frame number of a system frame/a discovery slot at which a discovery physical channel that carries discovery information is transmitted. In an embodiment, a system time or a system time counter may be maintained in the unit of 10 ms, and a specific value of a system time counter or system time of each frame may be offered. Alternatively, a system time counter may be maintained in the unit of second. The system time counter may be initialized by means of a value of the universal coordinated time offered by a network (or obtained from GPS, NITZ, etc.) Also, the system time counter may be initialized according to a value obtained from a value of the universal coordinated time offered by the network (or obtained from GPS, NITZ, etc.). For example, when the obtained system time is used in the unit of 10 ms after 00:00:00, Jan. 1, 1900, UE may divide the value by 100 and then set the system time counter for that value. In another example, when the obtained system time is used in the unit of second after 00:00:00, Jan. 1, 1900, UE may set the system time for that value. The counter may be updated one by one per 100 frames. The system time or system time counter value may be equal in 100 frames. According to an alternative embodiment, the system time or system time counter may be maintained during another time unit.

Additionally, in this disclosure, the system time and the system time counter may be used alternatively.

In an embodiment, a system time at which a DRC (also referred to as a discovery period) begins may be determined instead of a system time of a system frame at which a discovery physical channel that carries discovery information is transmitted. The system time at which the discovery period begins may correspond to a system time of the first system frame in the discovery period. Also, the system time at which the discovery period begins may correspond to a system time of a system frame corresponding to the first subframe in the discovery period.

Thereafter, at step 2720, the transmitter may create MAC/DS by using a security key, the determined system time of a discovery channel, and discovery information to be transmitted.

Specifically, according to an embodiment, in addition to a security key and discovery information to be secured, a system time of a discovery period of a discovery physical channel at which discovery information to be secured is transmitted, or a system time and/or a subframe number and/or a system frame number of a system frame/a discovery slot may be offered to a security algorithm as shown in FIG. 28. Thereafter, the security algorithm creates a MAC or a DS. Then the created MAC or DS may be added to discovery information. According to an embodiment, other parameter such as a length of discovery information or a length of a system time counter may be also offered for the creation of a MAC or DS to the security algorithm.

Meanwhile, according to an embodiment, the 'x' lowermost bit of a system time used for the creation of a MAC or DS may be added to a header or tail of a PDU that carries discovery information. This may handle circumstances where receiving UE and transmitting UE are located at different BS and where BS timing of the receiving UE is different from timing of the transmitting UE.

Thereafter, at step 2730, the transmitter may transmit secured discovery information on discovery channel by using a MAC or DS.

Figure 29:
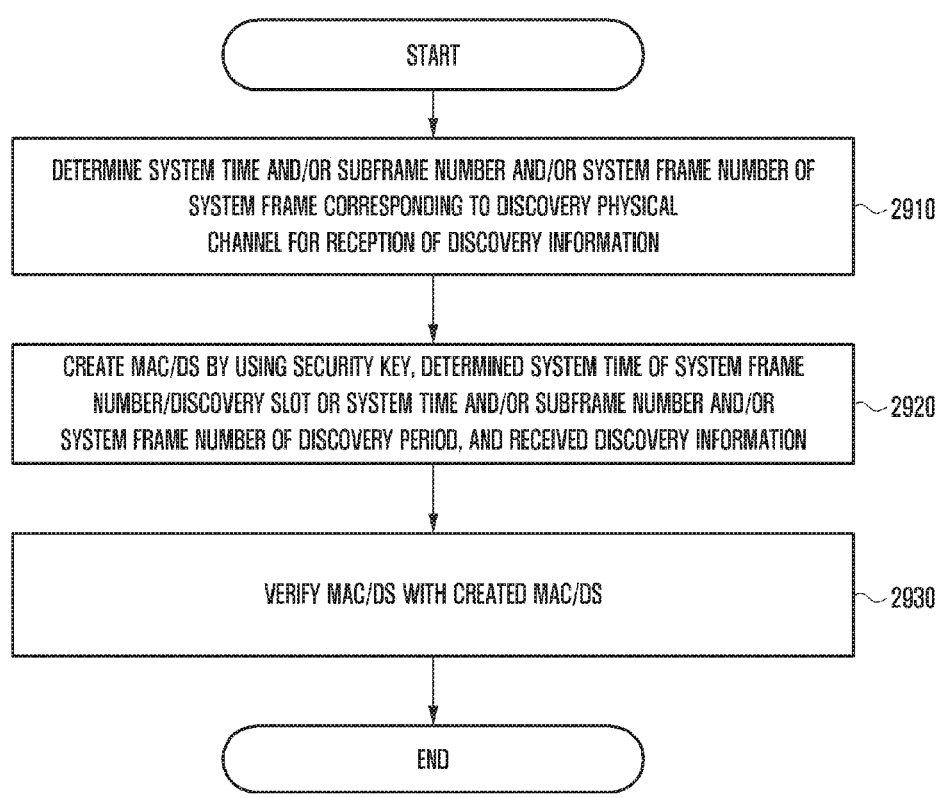
FIG. 29 is a flow diagram illustrating a method for verifying received discovery information at a receiver according to an embodiment of the present invention.

FIG. 29 is a flow diagram illustrating a method for verifying received discovery information at a receiver according to an embodiment of the present invention.

Referring to FIG. 29, the receiver is synchronized with a system frame and/or a universal coordinated time corresponding to the system frame in case of being not synchronized yet. The synchronization with the universal coordinated time corresponding to the system frame may be obtained by reading system information, transmitted by a BS, carrying the universal coordinated time corresponding to a system frame number. The universal coordinated time indicates an integer count in the unit of 10 ms after 00:00:00, Jan. 1, 1900. The synchronization with the system frame number may be obtained by reading broadcast information carrying the system frame number. At this time, the broadcast information may be transmitted by a BS or a group leader. According to an embodiment, the system frame number may be transmitted by means of two parts by the BS. The first part that carries MSB of the system frame number and LSB of the system frame number may be transmitted in different blocks of broadcast information. For example, a system information block 'x' may carry LSBs of the system frame number, and a system information block 'y' may carry MSBs of the system frame number. The transmitter may determine the system frame number by reading all blocks of system information. Alternatively, the D2D UE may determine the universal coordinated time from other source, e.g., GPS, NITZ, or the like.

In an embodiment, thereafter, the receiver monitors a discovery channel at step 2910 after being synchronized with the system frame and/or the universal coordinated time corresponding to the system frame. The receiver (e.g., D2D UE) may receive secured discovery information on a discovery channel.

Additionally, at step 2910, the receiver may determine information about a system time or system time counter (i.e., a universal coordinated time, i.e., an integer count in the unit of 10 ms after 00:00:00, Jan. 1, 1900) and/or a subframe number and/or a system frame number of a system frame/a discovery slot at which a discovery physical channel that carries discovery information is received. In an embodiment, a system time or system time counter may be maintained in the unit of 10 ms, and a specific value of a system time counter or system time of each frame may be offered. Alternatively, a system time counter may be maintained in the unit of second. The system time counter may be initialized by means of a value of the universal coordinated time offered by a network (or obtained from GPS, NITZ, etc.) Also, the system time counter may be initialized according to a value obtained from a value of the universal coordinated time offered by the network (or obtained from GPS, NITZ, etc.). For example, when the obtained system time is used in the unit of 10 ms after 00:00:00, Jan. 1, 1900, UE may divide the value by 100 and then set the system time counter for that value. In another example, when the obtained system time is used in the unit of second after 00:00:00, Jan. 1, 1900, UE may set the system time for that value. The counter may be updated one by one per 100 frames. The system time or system time counter value may be equal in 100 frames. According to an alternative embodiment, the system time or system time counter may be maintained during another time unit.

In an embodiment, a system time at which a DRC (also referred to as a discovery period) begins may be determined instead of a system time of a system frame at which a discovery physical channel that carries discovery information is transmitted. The system time at which the discovery period begins may correspond to a system time of the first system frame in the discovery period. Also, the system time at which the discovery period begins may correspond to a system time of a system frame corresponding to the first subframe in the discovery period.

According to an embodiment, the 'x' lowermost bits of a system time may be received within a header or a tail of a PDU that carries discovery information. Additionally, the receiver may replace the 'x' lowermost bits of a system time, determined according to discovery information received using the system time, with the received 'x' lowermost bits of the PDU, and may use it as a system time of a discovery slot at which the discovery information is received. Alternatively, a system time may be used, together with the 'x' lowermost bits identical to those received with a discovery message and being near a system time in receiving UE corresponding to a discovery slot at which the discovery information is received, as a system time of such a discovery slot.

Thereafter, at step 2920, the receiver may create a MAC or DS by using a security key, the determined system time of a system frame number, and received discovery information.

Specifically, according to an embodiment, in addition to a security key and discovery information to be secured, a system time of a system frame/a discovery slot of a discovery physical channel at which discovery information to be secured is received, or a system time and/or a subframe number and/or a system frame number of a discovery period may be offered to a security algorithm as shown in FIG. 28. Thereafter, the security algorithm creates a MAC or a DS. The security algorithm may be executed at the receiver or a D2D server. Additionally, the receiver may transmit, to the D2D server, received information (a MAC or DS, and/or a discovery subframe number (or a frame number and a subframe number), system time information and discovery information to the D2D server, and/or a sync/async identifier). Here, the sync identifier is transmitted when a cell associated with receiving UE is synchronized with transmitting UE, and the async identifier is transmitted when a cell associated with receiving UE is not synchronized with transmitting UE. Alternatively, the sync/async identifier may indicate whether the transmitter and the receiver are synchronized in time with each other.

Then, at step 2930, the receiver may compare the created MAC or DS with a MAC or DS received together with discovery information from a transmitter. If a rogue transmitter replays a message, a system time of a frame received by the receiver may be different from a time used for transmission in a genuine transmitter. This may cause a failure in MAC or DS verification at the receiver.

According to an embodiment, for verification of a MAC or DS, the receiver or the D2D server may use a value within a range between the determined system time of received discovery information minus offset and the determined system time of received discovery information plus offset. For example, a system time or system time counter corresponding to a frame at which discovery information is received may be 1000, and the system time or system time counter may be maintained in the unit of second. Also, the offset may be 2. The offset may be predetermined or signaled to receiving UE by a network. For verification of a MAC or DS, the receiver or the D2D server may use 999, 998, 1000, 1001 and 1002 as a value of the system time counter. According to an embodiment, this method may be performed only when discovery information is received from any async cell. Similarly, a system time corresponding to a discovery period at which discovery information is received may be 1000, and the counter may be maintained in the unit of second. Also, the offset may be 2. The offset may be predetermined or signaled to receiving UE by a network. For verification of a MAC or DS, the receiver or the D2D server may use 999, 998, 1000, 1001 and 1002 as a value of the system time counter. According to an embodiment, this method may be performed only when discovery information is received from any async cell. In an alternative embodiment, a system frame number at which a discovery channel is transmitted and received, and/or a discovery channel logical timing which is a subframe of a system frame may be used for the transmitter and the receiver, in addition to or instead of a system time of a system frame/a discovery period.

<Embodiment 5B>

Figure 30:
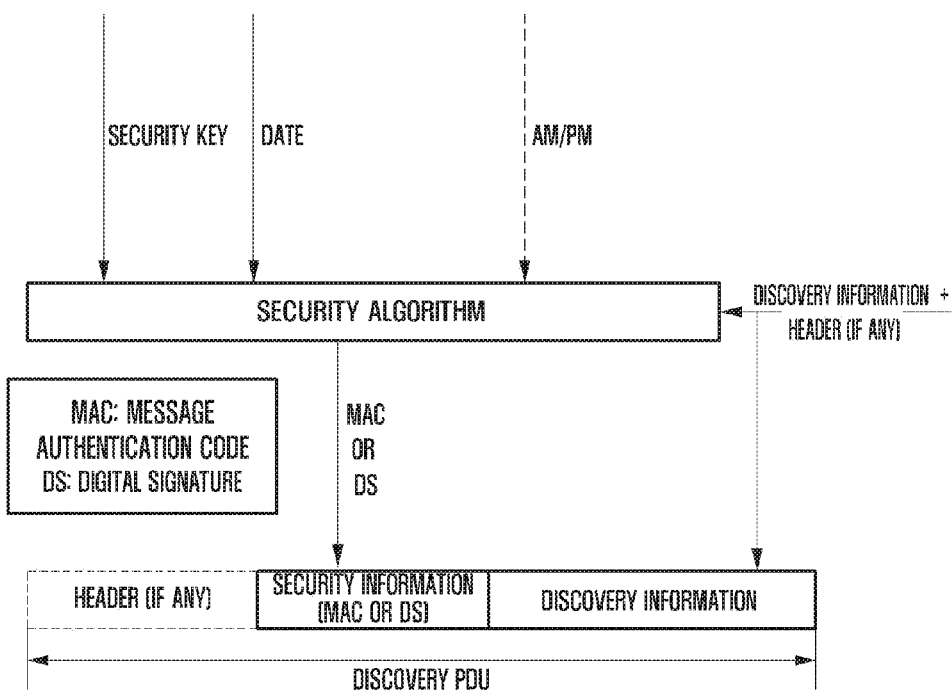
FIG. 30 is a diagram illustrating a method of MAC or DS creation according to another embodiment of the present invention.

FIG. 30 is a diagram illustrating a method of MAC or DS creation according to another embodiment of the present invention.

In this embodiment, no synchronization is performed between a system frame and an absolute system time. In an embodiment, a packet transmission date and a security key may be offered for the creation of a MAC or DS to a security algorithm as shown in FIG. 30. This is useful in case discovery information is not changed for a day. During the transition of day, a time window in which received discovery information is ignored may be offered. This is performed only when the transition of day is not synchronized through the transmitting and receiving UEs. In an embodiment, in order to create a MAC or DS, date information including AM or PM may be used together with a security key. This may allow UE to update discovery information at every half day. Alternatively, any other part of a day such as a quarter period may be also used together with a certain timing window between changes in quarters.

<Embodiment 5C>

This embodiment corresponds to case in which there is no synchronization between a system frame and an absolute system time. In an embodiment, discovery information may be transmitted periodically. A transmission period is equal to or greater than the maximum time variation between system times of transmitting and receiving UEs. The system time at which the transmitting UE transmits discovery information is encoded in a discovery PDU. In case the reception time of the receiving UE is within a receiving window, the receiving UE processes a discovery PDU. In this case, the receiving window is as follows.

a) a system time of a discovery PDU+a delta time
b) a system time of a discovery PDU−a delta time This delta time may include a difference between system times of the transmitting and receiving UEs, processing times at the transmitting and receiving UEs, and a transmission time on a radio interface.

<Embodiment 5D>

Figure 31:
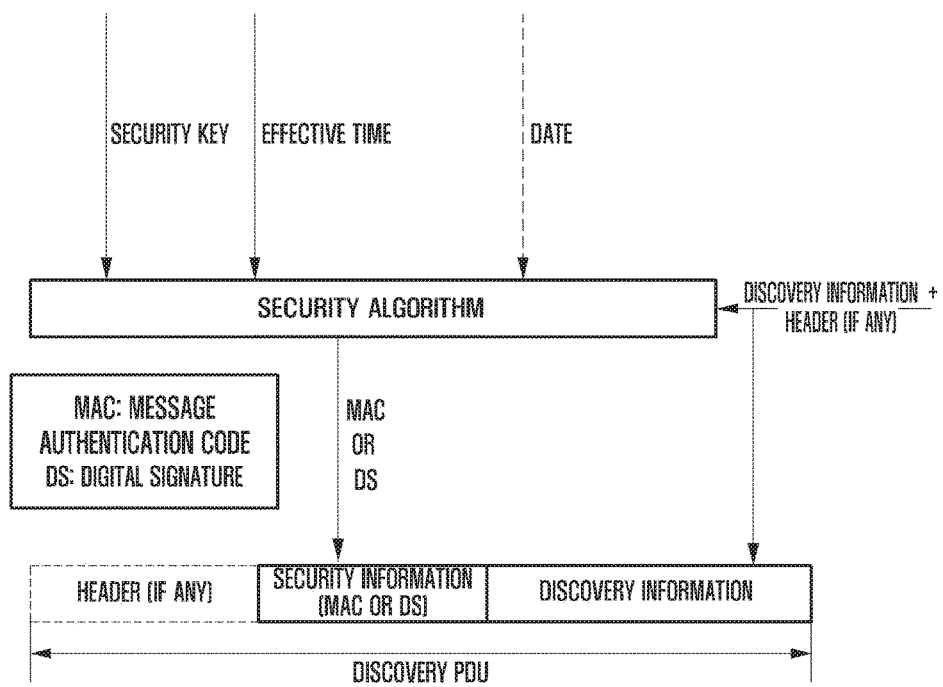
FIG. 31 is a diagram illustrating a method of MAC or DS creation according to still another embodiment of the present invention.

FIG. 31 is a diagram illustrating a method of MAC or DS creation according to still another embodiment of the present invention.

Referring to FIG. 31, in still another embodiment, a network time received from a macro network may be used as reference by all of the transmitter and the receiver. An effective time (a time in which discovery information is valid) may be used as one of inputs together with a key for calculation of a MAC or DS and any other parameter. The effective time may be always ascertained with a macro network time. A discovery message may carry the effective time. In an embodiment, as shown in FIG. 31, the effective time may be used together with a date for calculation of a MAC or DS. In an embodiment, when the effective time and date are used for the calculation of a MAC or DS in the transmitter, the discovery message may carry the effective time together with an indicator for indicating an entry of date for MAC calculation.

<Security Key Creation and Update Procedure>

Hereinafter, a security key creation method and an update procedure will be described.

Figure 32:
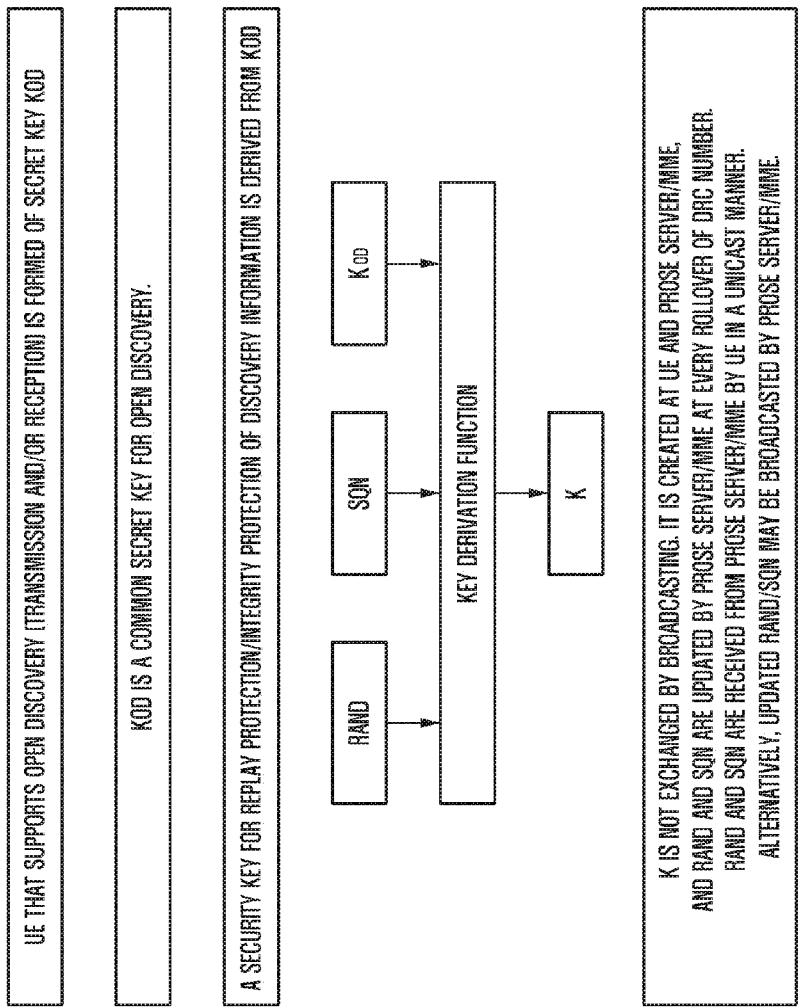
FIG. 32 is a diagram illustrating a method of security key creation according to an embodiment of the present invention.
Figure 33:
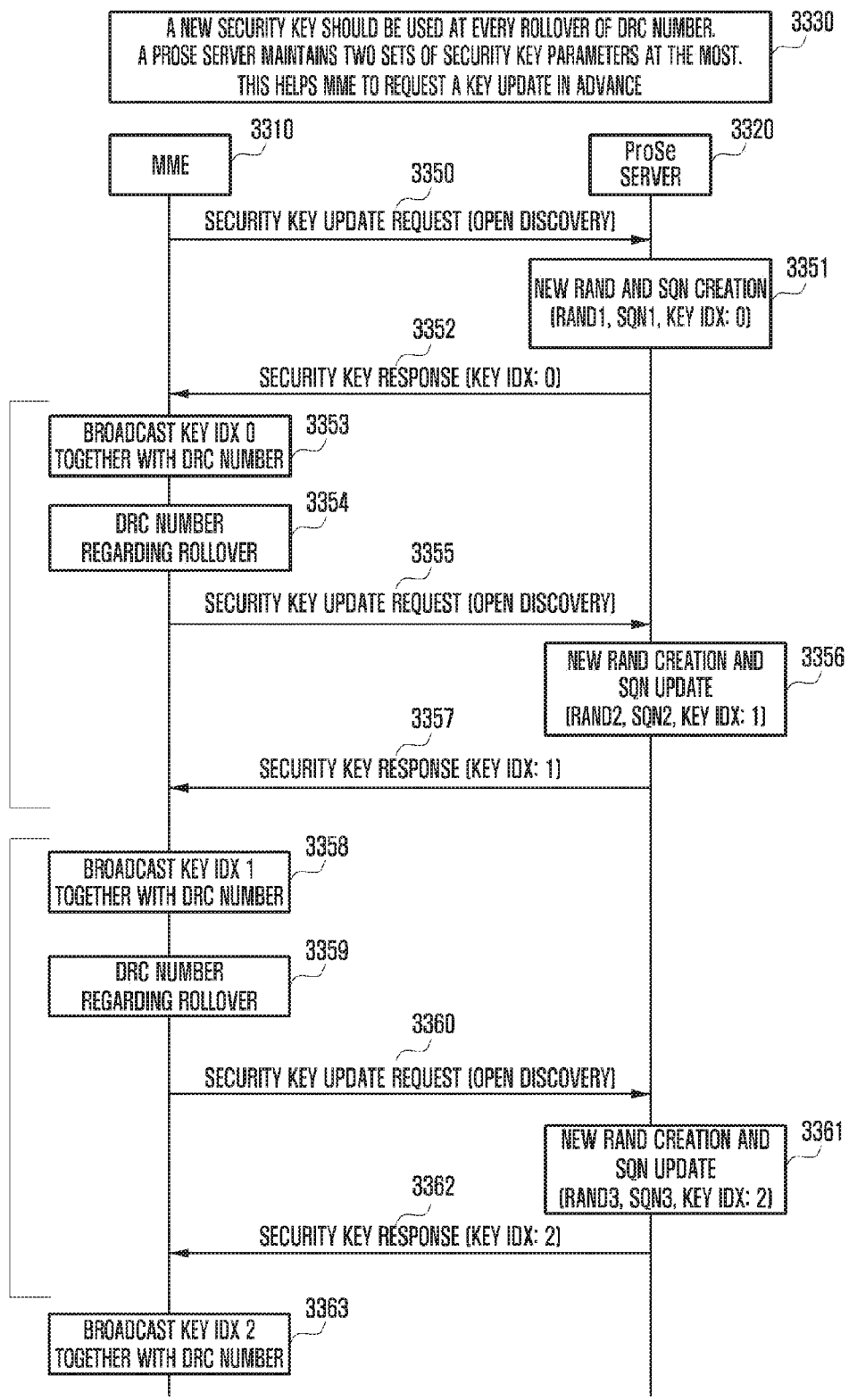
FIG. 33 is a flow diagram illustrating a method of security key update according to an embodiment of the present invention.
Figure 34:
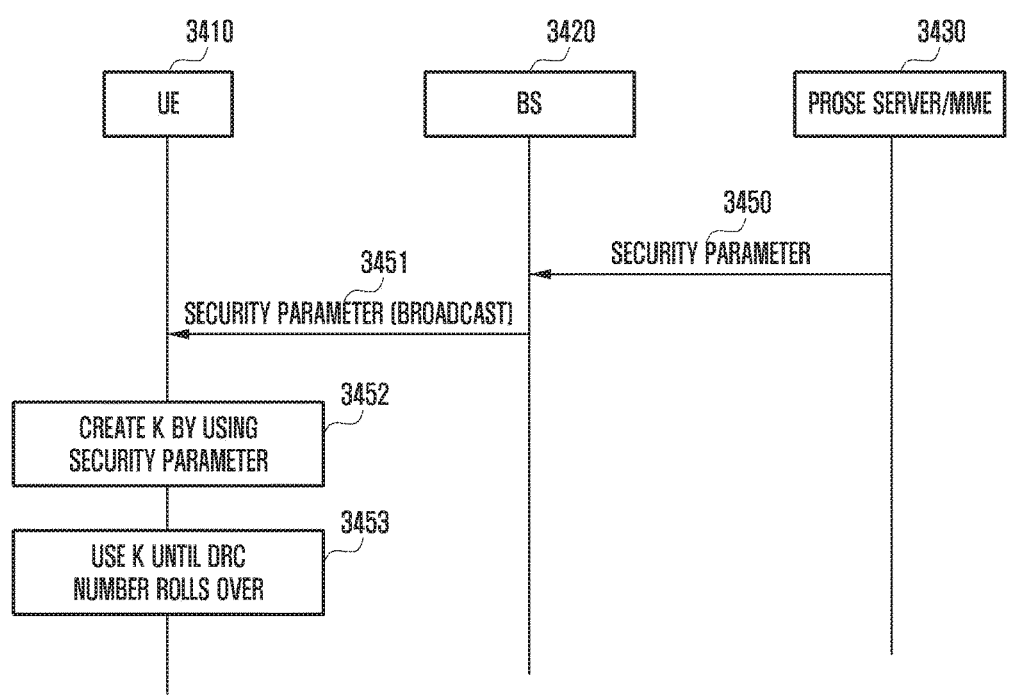
FIG. 34 is a flow diagram illustrating a method of security key exchange according to an embodiment of the present invention.
Figure 35:
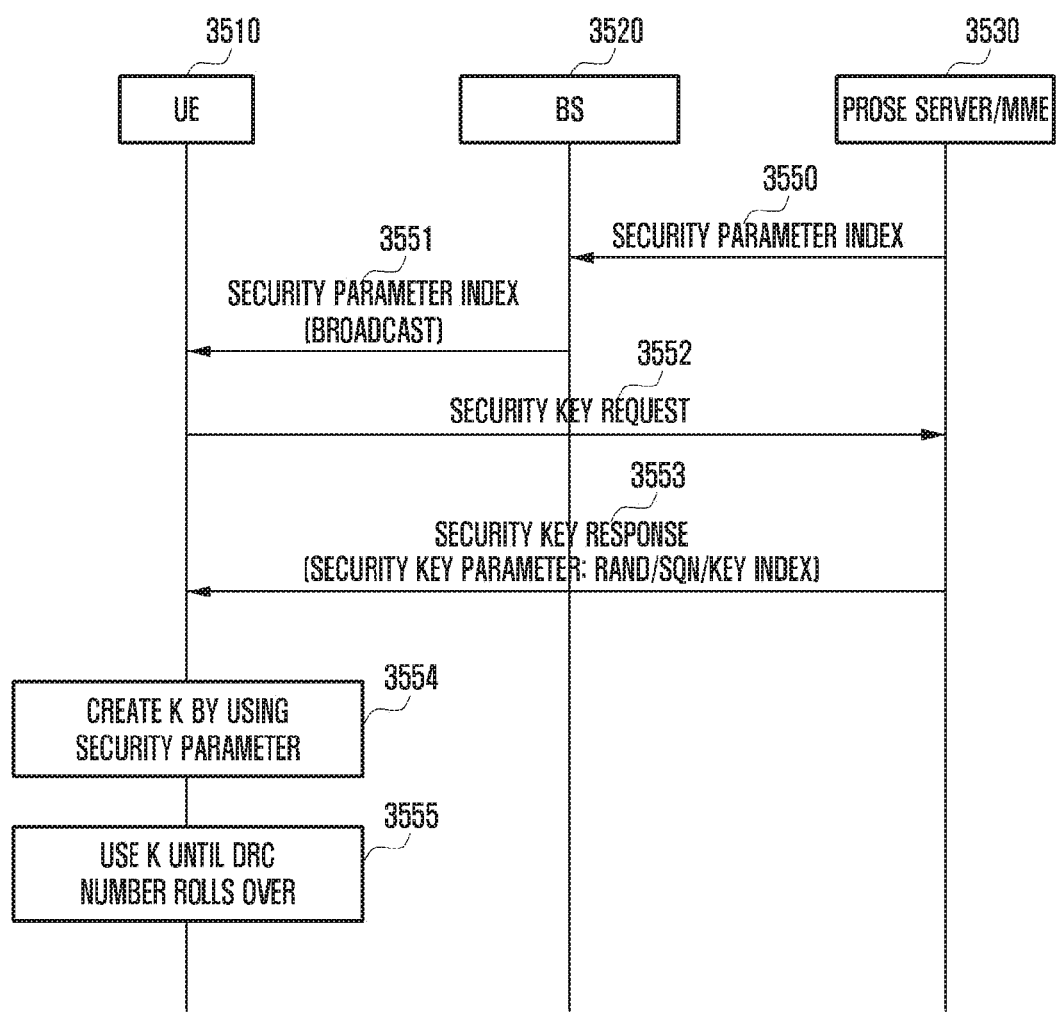
FIG. 35 is a flow diagram illustrating a method of security key exchange according to another embodiment of the present invention.
Figure 36:
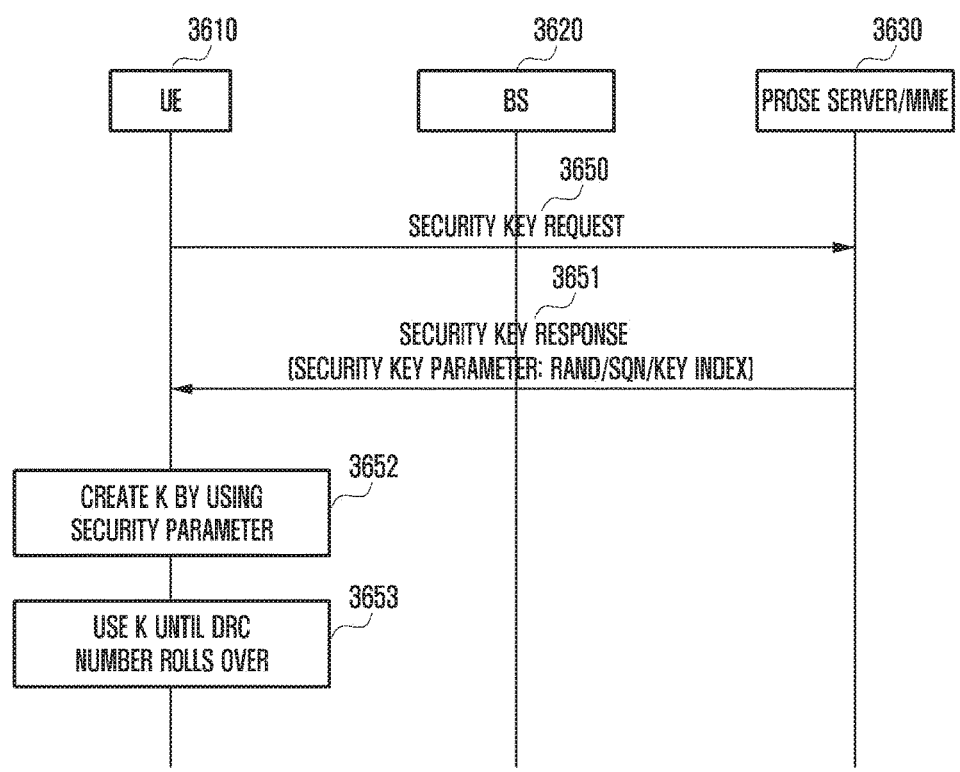
FIG. 36 is a flow diagram illustrating a method of security key exchange according to still another embodiment of the present invention.
Figure 37:
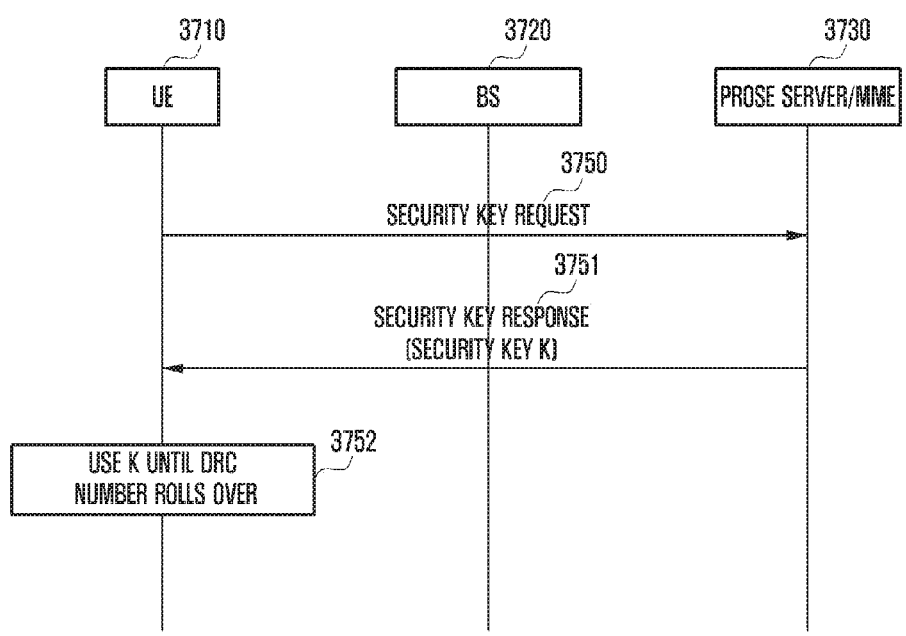
FIG. 37 is a flow diagram illustrating a method of security key reception by UE receiving discovery information according to an embodiment of the present invention.

Security Key for Discovery (First Method):

FIG. 32 is a diagram illustrating a method of security key creation according to an embodiment of the present invention, FIG. 33 is a flow diagram illustrating a method of security key update according to an embodiment of the present invention, FIG. 34 is a flow diagram illustrating a method of security key exchange according to an embodiment of the present invention, FIG. 35 is a flow diagram illustrating a method of security key exchange according to another embodiment of the present invention, FIG. 36 is a flow diagram illustrating a method of security key exchange according to still another embodiment of the present invention, and FIG. 37 is a flow diagram illustrating a method of security key reception by UE receiving discovery information according to an embodiment of the present invention.

One method for creating a security key for open discovery is shown in FIG. 32. UE that supports open discovery (transmission and reception) is formed of a secret key KOD. Alternatively, after UE is allowed to transmit and/or receive discovery information, the secret key KOD may be offered by a ProSe server, an application server, or an authenticator. KOD is a common secret key for open discovery. The security key is stored in a safe location of UE to prevent a key leakage. The security key 'K' for a replay protection/an integrity protection of discovery information may be derived from a security key KOD by using security parameter.

The security parameter may include a random number (RAND) and a sequence number (SQN). In some embodiments, SQN may be not used. In some embodiments, any other parameter such as a security algorithm ID may be further used. K is not exchanged over the air. It is created at UE that performs discovery. The security parameter, i.e., RAND and SQN, is created at a ProSe server or an MME. A replay protection 'K' may be created or not at the ProSe server or the MME.

Security Parameter Update:

In an embodiment, a security parameter, i.e., RAND & SQN, may be updated by the ProSe server/MME whenever DRC numbers roll over. This enables the same key 'K' to be not used through DRC number rollover boundaries. An updated security parameter, i.e., RAND and/or SQN, may be received from the ProSe server/MME by UE in a unicast manner. According to an alternative embodiment, an updated security parameter, i.e., RAND and/or SQN, may be broadcasted through a BS by the ProSe server/MME and read by UE participating in discovery.

In an embodiment, the ProSe server may be synchronized in timing with DRC timing and may create a new security parameter at every rollover of DRC numbers. The MME may query the ProSe server before DRC number rollover so that a security parameter may be used after DRC number rollover. Alternatively, the ProSe server may transmit an updated parameter to the MME without query.

In another embodiment, as shown in FIG. 33, a ProSe server 3320 may not be synchronized with DRC timing. Additionally, at steps 3350, 3355 and 3360, an MME 3310 may send a request for a new security parameter to the ProSe server 3320. The MME 3310 may request in advance a new security parameter from the ProSe server 3320 so as to allow enough time with regard to a key update signal.

Thereafter, referring to FIG. 34, an MME 3430 may broadcast a security parameter through a BS 3420 so that UE 3410 that participates in discovery may read this parameter and then create a key 'K'. Namely, the MME 3430 may deliver a security parameter to the BS 3420 at step 3450, and the BS 3420 may broadcast the security parameter to the UE 3410 at step 3451.

Meanwhile, according to an embodiment, an updated security parameter set may be indexed to prevent confusion between security parameters through boundaries of DRC number rollover. This index may be also broadcasted together with the security parameter.

In this method, at step 3452, the UE 3410 that participates in discovery may read the security parameter broadcasted by the BS 3420 and create a security key 'K' by using a secret key KOD and the security parameter. Then the security key 'K' may be used for transmitting and receiving open discovery information at a DRC. Meanwhile, a security key index may be contained in discovery information by the UE that transmits discovery information.

Additionally, the UE 3410 that participates in discovery may read the security parameter broadcasted by the BS 3420, update the security key 'K', and use the created 'K' before rollover of a DRC number so as not to use the same security key 'K' during the rollover of a DRC number.

In another embodiment, referring to FIG. 35, only a security parameter index instead of a security parameter may be broadcasted by the BS 3520. Namely, an MME 3530 may transmit the security parameter index to a BS 3520 at step 3550, and the BS 3520 may broadcast the security parameter index to UE 3510.

Thereafter, the UE 3510 that participates in discovery may query a ProSe server or the MME 3530 with regard to an updated security parameter. Namely, the UE 3510 may transmit a security key request message to the MME 3530 at step 3552, and in response to this, the MME 3530 may transmit a security key response message to the UE 3510 at step 3553. At this time, the security key response message may include a security key parameter, i.e., RAND, SQN, a security key index, and the like.

In still another embodiment, referring to FIG. 36, a BS 3620 may not broadcast any information about an updated security parameter. In this case, UE 3610 may query an MME or ProSe server 3630 with regard to a security parameter in case of having no security parameter. Thereafter, the UE 3610 that participates in discovery may query the rollover of a DRC number.

In some embodiments, a security parameter (RAND/SQN/idx) may be specified to a BS or an MME or an MME group instead of a ProSe server.

In an embodiment, KOD may be a common secret key for open discovery regarding all type services. In another embodiment, KOD may be a common secret key specified to a specific service type. In this case, a service type may be indicated in signal procedures as shown in FIGS. 33 to 36.

Security Key for Discovery (Second Method):

FIG. 37 is a flow diagram illustrating a method of security key reception by UE receiving discovery information according to an embodiment of the present invention.

UE that supports open discovery and transmits discovery information is formed of a secret key KOD. KOD is a common secret key for open discovery. Such a common secret key is configured in advance to each UE that can perform open discovery. Alternatively, after UE is allowed to transmit discovery information, the secret key KOD may be offered by a ProSe server, an application server, or an authenticator. The security key is stored in a safe location of UE to prevent a key leakage. The security key 'K' for a replay protection/an integrity protection of discovery information may be derived from a security key KOD by using security parameter by UE that transmits discovery information as shown in FIG. 32.

The security parameter may include a random number (RAND) and a sequence number (SQN). In some embodiments, SQN may be not used. In some embodiments, any other parameter such as a security algorithm ID may be further used. K is not exchanged over the air. It is created at UE that performs discovery. The security parameter, i.e., RAND and SQN, is created at a ProSe server or an MME. A replay protection 'K' may be created or not at the ProSe server or the MME.

Security Parameter Update:

In an embodiment, a security parameter, i.e., RAND & SQN, may be updated by the ProSe server/MME whenever DRC numbers roll over. This enables the same key 'K' to be not used through DRC number rollover boundaries. An updated security parameter, i.e., RAND and/or SQN, may be received in a unicast manner from the ProSe server/MME by UE that transmits discovery information. According to an alternative embodiment, an updated security parameter, i.e., RAND and/or SQN, may be broadcasted through a BS by the ProSe server/MME and read by UE participating in discovery.

In an embodiment, the ProSe server may be synchronized in timing with DRC timing and may create a new security parameter at every rollover of DRC numbers. The MME may query the ProSe server before DRC number rollover so that a security parameter may be used after DRC number rollover. Alternatively, the ProSe server may transmit an updated parameter to the MME without query.

In another embodiment, as shown in FIG. 33, a ProSe server 3320 may not be synchronized with DRC timing. Additionally, at steps 3350, 3355 and 3360, an MME 3310 may send a request for a new security parameter to the ProSe server 3320. The MME 3310 may request in advance a new security parameter from the ProSe server 3320 so as to allow enough time with regard to a key update signal.

Thereafter, the MME may broadcast such a parameter through the BS so that UE that transmits discovery information may read this parameter and then create a security key 'K'. According to an embodiment, an updated security parameter set may be indexed to prevent confusion between security parameters through boundaries of DRC number rollover. This index may be also broadcasted together with the security parameter.

In this method, each UE that transmits discovery information may read the security parameter broadcasted by the BS and create a security key 'K' by using a secret key KOD and the security parameter. Then the security key 'K' may be used for transmitting open discovery information at a DRC. Also, according to an embodiment, a security key index may be contained in discovery information by the UE that transmits discovery information.

The UE that transmits discovery information may read the security parameter broadcasted by the BS, update the security key 'K', and does not use the same security key 'K' during the rollover of a DRC number. Since this is similar to the previous description associated with FIG. 34, a detailed description will be omitted.

In another embodiment, only an index instead of a security parameter may be broadcasted by the BS. Thereafter, the UE that transmits discovery information may query a ProSe server or MME with regard to an updated security parameter. Since this is similar to the previous description associated with FIG. 35, a detailed description will be omitted.

In still another embodiment, the BS may not broadcast any information about an updated security parameter. In this case, the UE may query the MME or ProSe server with regard to a security parameter in case of having no security parameter. Thereafter, the UE that transmits discovery information may query the rollover of a DRC number. Since this is similar to the previous description associated with FIG. 36, a detailed description will be omitted.

In this method, UE 3710 that receives discovery information may query an MME/ProSe server 3730 such that a security key 'K' may be used for receiving the discovery information as shown in FIG. 37. The receiving UE 3710 has no information about a secret key KOD, and thus the security key 'K' is delivered to the UE 3710. Before the rollover of DRC, the receiving UE 3710 may request a new key 'K'.

In some embodiments, a security parameter (RAND/SQN/idx) may be specified to a BS or an MME or an MME group instead of a ProSe server.

In an embodiment, KOD may be a common secret key for open discovery regarding all type services. In another embodiment, KOD may be a common secret key specified to a specific service type. In this case, a service type may be indicated in signal procedures as shown in FIGS. 34 to 37.

In an alternative embodiment, KOD may be specified to UE that transmits discovery information, or KOD may be specified to UE transmitting discovery information and at least one UE receiving discovery information. In this case, the receiving UE may send a request for a security key specified to the transmitting UE to a ProSe server or MME. The receiving UE may insert a UE ID of the transmitting UE in the security key request. The transmitting UE may create a security key and update it at every rollover. Then the transmitting UE may offer the security key to the MME or ProSe server by using a safe connection. Alternatively, a key of the transmitting UE may be created by the MME or ProSe server, and the transmitting UE may request it from the MME or ProSe server.

Security Key for Discovery (Third Method):

In this method, a secret key KOD is not configured nor allocated to any UE. The UE that transmits discovery information may request the security key 'K' from the MME or the ProSe server or the application server. The security key 'K' is updated at every rollover of a DRC number. If the network desires, it may be updated initially. The rest of procedure is the same as the second method.

Security Function Location for Discovery Information Protection:

A security function that implements the above algorithm may be located at one of the following positions.

1. ProSe PDCP Protocol Layer
2. Media Access Control Layer
3. Application Layer

<Sixth Embodiment: Encryption Using Discovery Channel System Time Information>

In an embodiment, a security key may be a symmetric key which is used equally by a transmitter and a receiver. In another embodiment, a security key may be an asymmetric key which is used differently by a transmitter and a receiver. According to an embodiment, a key pair of a public key and a private key in which the public key may be used by a transmitter and the private key may be used by a receiver. While a security algorithm creates a MAC in case of the symmetric key, a security algorithm creates a DS in case of the asymmetric key.

In an embodiment, a symmetric security key or asymmetric security key pair may be applied in common to open discovery for all types of services. In another embodiment, a symmetric security key or asymmetric security key pair may be applied to a specific type of service. For example, UE may support one or more services each of which is identified by means of a D2D application ID or D2D service ID. When requesting a D2D application code or D2D service code corresponding to a D2D application ID or D2D service ID, UE may obtain a security key from a D2D server. A D2D service code or D2D application code may be transmitted as part of discovery information by UE. Therefore, each UE may have a plurality of security keys each of which corresponds to each D2D application ID or D2D service ID or each D2D application code or D2D service code. In another embodiment, a symmetric security key or asymmetric security key pair may be also applied to specific UE that transmits discovery information. In still another embodiment, a symmetric security key or asymmetric security key pair may be also applied to specific UE that transmits discovery information to a group of UEs.

Figure 38:
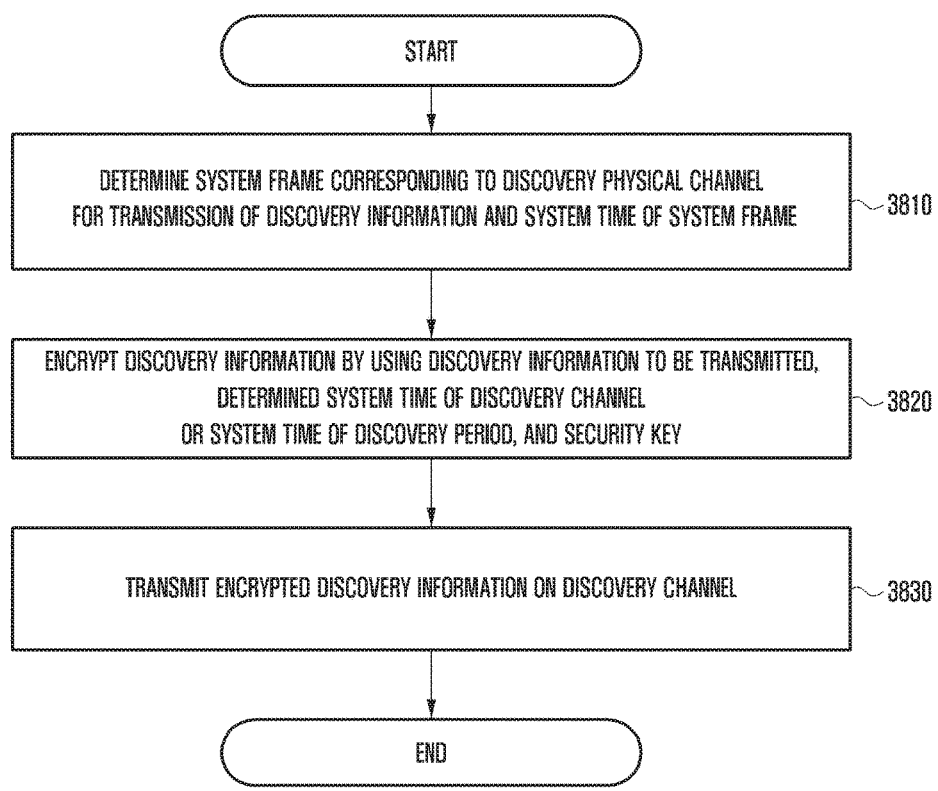
FIG. 38 is a flow diagram illustrating a method for securing discovery information at a transmitter according to an embodiment of the present invention.
Figure 39:
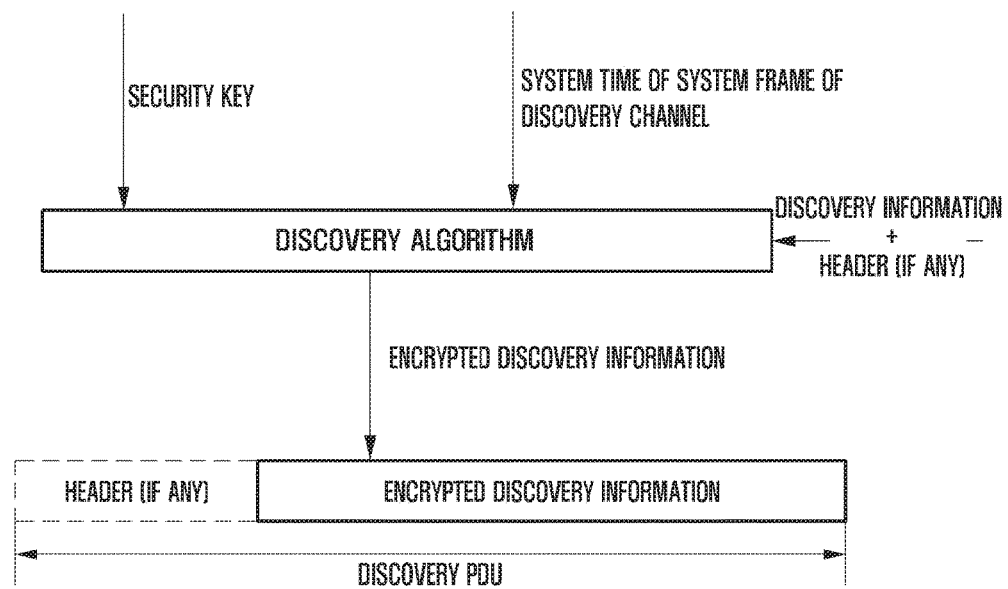
FIG. 39 is a diagram illustrating a method of encryption according to an embodiment of the present invention.

FIG. 38 is a flow diagram illustrating a method for securing discovery information at a transmitter according to an embodiment of the present invention, and FIG. 39 is a diagram illustrating a method of encryption according to an embodiment of the present invention.

In this method, it is supposed that there is synchronization between a system frame and an absolute system time.

Referring to FIG. 38, the transmitter (i.e., D2D UE) has discovery information that needs to be transmitted safely on a discovery channel. At the outset, in case of being not synchronized yet, the transmitter is synchronized with a system frame and/or a universal coordinated time corresponding to the system frame. The synchronization with the universal coordinated time corresponding to the system frame may be obtained by reading system information, transmitted by a BS, carrying the universal coordinated time corresponding to a system frame number. The universal coordinated time indicates an integer count in the unit of 10 ms after 00:00:00, Jan. 1, 1900.

The synchronization with the system frame number may be obtained by reading broadcast information carrying the system frame number. At this time, the broadcast information may be transmitted by a BS or a group leader. According to an embodiment, the system frame number may be transmitted by means of two parts by the BS. The first part that carries MSB of the system frame number and LSB of the system frame number may be transmitted in different blocks of broadcast information. For example, a system information block 'x' may carry LSBs of the system frame number, and a system information block 'y' may carry MSBs of the system frame number. The transmitter may determine the system frame number by reading all blocks of system information.

In an embodiment, thereafter, at step 3810, the transmitter may determine information about a system time (i.e., an integer count in the unit of 10 ms after 00:00:00, Jan. 1, 1900) of a system frame at which a discovery physical channel that carries discovery information is transmitted.

Thereafter, at step 3820, the transmitter may encrypt discovery information by using a security key, the determined system time of a discovery channel, and discovery information to be transmitted.

Specifically, according to an embodiment, in addition to a security key and discovery information to be secured, a system time of a system frame of a discovery physical channel at which discovery information to be secured is transmitted, or a system time of a discovery period may be offered to a security algorithm as shown in FIG. 28. Thereafter, the security algorithm may perform encryption of discovery information.

Meanwhile, according to an embodiment, the 'x' lowermost bit of a system time used for the creation of a MAC or DS may be added to a header or tail of a PDU that carries discovery information. This may handle circumstances where receiving UE and transmitting UE are located at different BS and where BS timing of the receiving UE is different from timing of the transmitting UE.

Thereafter, at step 3830, the transmitter may transmit encrypted discovery information on a discovery channel.

Figure 40:
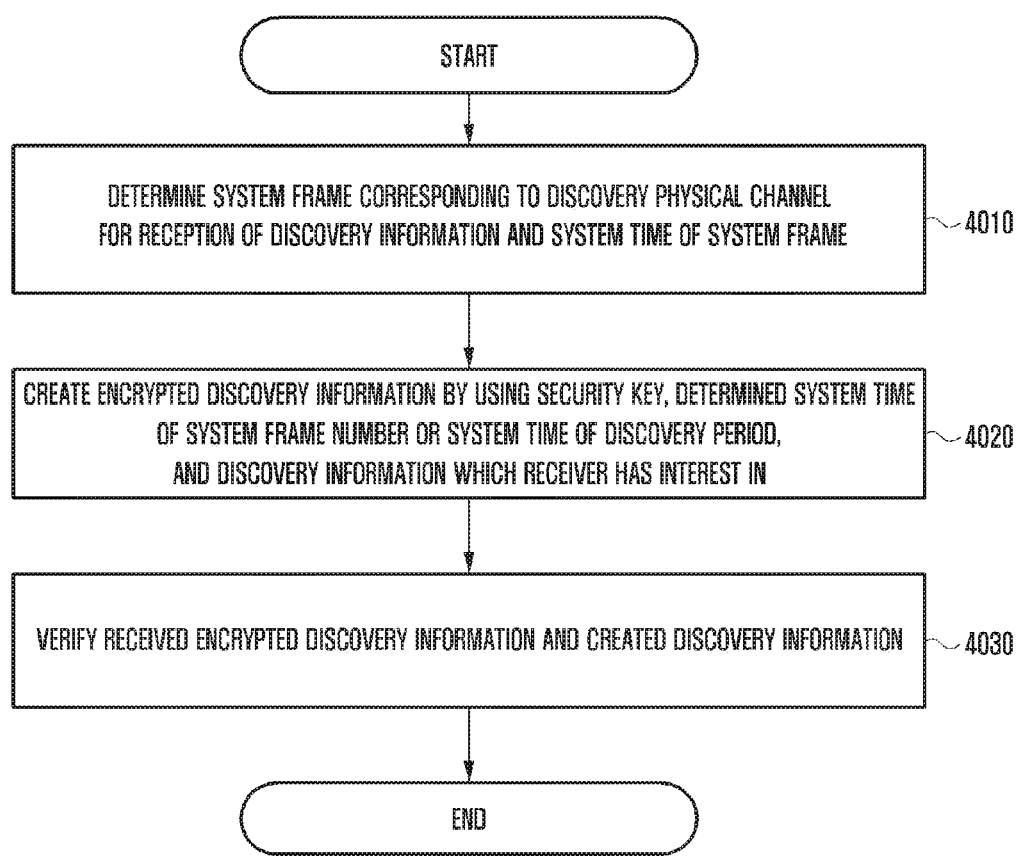
FIG. 40 is a flow diagram illustrating a method for verifying received discovery information at a receiver according to an embodiment of the present invention.

FIG. 40 is a flow diagram illustrating a method for verifying received discovery information at a receiver according to an embodiment of the present invention.

Referring to FIG. 40, the receiver is synchronized with a system frame and/or a universal coordinated time corresponding to the system frame in case of being not synchronized yet. This synchronization may be obtained by reading system information, transmitted by a BS, carrying the universal coordinated time corresponding to a system frame number. The universal coordinated time indicates an integer count in the unit of 10 ms after 00:00:00, Jan. 1, 1900.

In an embodiment, the receiver monitors a discovery channel at step 4010 after being synchronized with the system frame and the universal coordinated time corresponding to the system frame. The receiver (e.g., D2D UE) may receive encrypted discovery information on a discovery channel.

Additionally, at step 4010, the receiver may determine information about a system time (i.e., an integer count in the unit of 10 ms after 00:00:00, Jan. 1, 1900) of a system frame at which a discovery physical channel that carries encrypted discovery information is received. In this embodiment, the receiver knows discovery information which the receiver has interest in.

Thereafter, at step 4020, the receiver may encrypt the receiver-interesting discovery information (already available for the receiver) by using a security key and a system time of a system frame at which a discovery physical channel that carries the encrypted discovery information is received.

Additionally, at step 4030, the receiver may compare the created, encrypted discovery information with received, encrypted discovery information. If both are identical to each other, the receiver may find discovery information which the receiver has interest in. If both are not identical, the receiver may discard the received discovery information. If the receiver finds some pieces of discovery information, the receiver may encrypt each discovery information by using a security key and a system time of a system frame at which a discovery physical channel for carrying the encrypt discovery information is received. Also, the receiver may compare the created, encrypted discovery information with received, encrypted discovery information.

According to an embodiment, a single system frame number may include a plurality of subframes. Also, according to an embodiment, in addition to a system time of a system frame number, a subframe number may be also used for encrypting discovery information.

For example, in an embodiment, discovery information may include an application user ID. The transmitter having an application user ID1 may transmit discovery information. The transmitter may encrypt discovery information by using a system time of a system frame (e.g., a frame 'x') at which a discovery physical channel for carrying the encrypt discovery information is transmitted, or a system time of a discovery period, and a security key. At this time, the receiver may discover a friend of an application user ID2 and an application user ID1. Also, the receiver may receive encrypted discovery information of a frame 'x'. At this time, the receiver may encrypt the application user ID2 by using a system time of the system frame 'x' or a system time of a discovery period and a security key. Thereafter, the receiver may compare the encrypted application user ID2 with received, encrypted discovery information. However, in this case, two pieces of discovery information may be not identical to each other. Thereafter, the receiver may encrypt the application user ID1 by using a system time of the system frame 'x' or a system time of a discovery period and a security key. Additionally, the receiver may compare the encrypted application user ID1 with received, encrypted discovery information. In this case, two pieces of discovery information may be identical to each other. Therefore, the receiver may know the application user ID1 is in discovery information, and thus can find a friend having the application user ID1.

If encrypted discovery information is replayed, a system frame number received by the receiver may be different from a system frame number transmitted by the transmitter.

Therefore, at the receiver, matching of received discovery information and encrypted application user ID1 may result in failure.

According to an embodiment, the 'x' lowermost bit of a system time may be received in a header/tail of a PDU that carries discovery information. Also, the receiver may replace the 'x' lowermost bit of a system time, determined according to discovery information received using a maintained system time, with the 'x' lowermost bit of a received PDU.

In an alternative embodiment, discovery channel logical timing which is a system frame number of transmission/reception of a discovery channel and/or a subframe number of a system frame or a system time of a discovery period may be used for the transmitter and the receiver in addition to a system time of a system frame/a discovery period.

In a still alternative embodiment, discovery channel logical timing, i.e., a DRC number and/or a discovery subframe number and/or a discovery physical channel index may be used for the transmitter and the receiver instead of a system time of a system frame.

In a yet alternative embodiment, discovery channel logical timing, i.e., a system frame number and/or a subframe number of a subframe for transmission/reception of a discovery channel may be used for the transmitter and the receiver instead of a system time of a system frame in embodiments discussed in FIGS. 38, 39 and 40.

The present embodiment may be useful when the receiver knows interested discovery information.

According to an embodiment, a one-way hash function may be used instead of a security algorithm and a security key.

Figure 41:
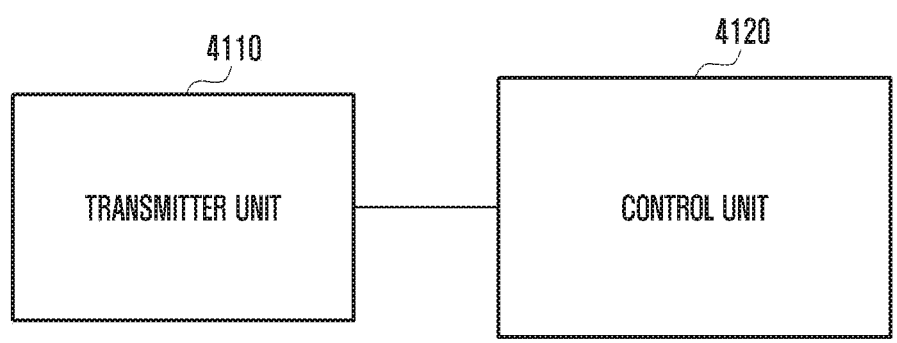
FIG. 41 is a block diagram illustrating the configuration of user equipment according to an embodiment of the present invention.

FIG. 41 is a block diagram illustrating the configuration of user equipment according to an embodiment of the present invention.

Referring to FIG. 41, in an embodiment, user equipment (UE) may include a transceiver unit 4110 that transmits and receives a signal to and from other UE, a BS, an MME, or a ProSe server. Additionally, the UE may include a control unit 4120 that controls the transceiver unit 4110 to transmit or receive data and also processes or determines such data according to the data or predetermined setting. Also, the control unit 4120 may control the UE to perform one of the above-discussed embodiments. At this time, the control unit 4120 may control, for example, but not limited to, synchronizing with a discovery resource cycle number, determining discovery channel logical timing information of a discovery physical channel at which discovery information is to be transmitted, creating security information by using a security key, the determined discovery channel logical timing information, and the discovery information to be transmitted, and transmitting the discovery information including the security information to the discovery physical channel. Alternatively, the control unit 4120 may control synchronizing with a discovery resource cycle number, receiving discovery information including first security information on a discovery physical channel, determining discovery channel logical timing information of the discovery physical channel at which the discovery information is received, creating second security information by using a security key, the determined discovery channel logical timing information, and the received discovery information, and verifying the first security information and the second security information.

Figure 42:
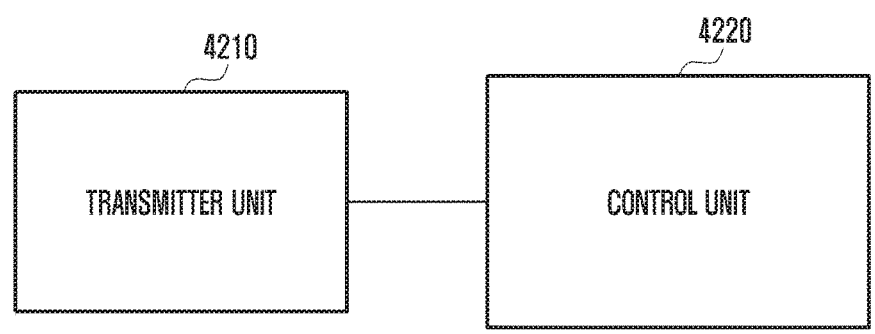
FIG. 42 is a block diagram illustrating the configuration of base station according to an embodiment of the present invention.

FIG. 42 is a block diagram illustrating the configuration of base station according to an embodiment of the present invention.

Referring to FIG. 42, the base station (BS) may include a transceiver unit 4210 that transmits and receives a signal to and from UE, an MME, or a ProSe server. Additionally, the BS may include a control unit 4220 that controls the transceiver unit to transmit or receive data and also processes or determines such data according to the data or predetermined setting. Also, the control unit 4220 may control the BS to perform one of the above-discussed embodiments.

The present invention may be embodied in many different forms and should not be construed as limited to the embodiments set forth herein. Rather, the disclosed embodiments are provided so that this disclosure will be thorough and complete, and will fully convey the scope of this invention to those skilled in the art. The principles and features of the present invention may be employed in varied and numerous embodiments without departing from the scope of the invention. Accordingly, it should be apparent to those skilled in the art that this description is provided for illustration purpose only and not for the purpose of limiting the present invention as defined by the appended claims and their equivalents.

While this invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. A method for transmitting a discovery message by a transmitter in a device-to-device (D2D) communication system, the method comprising:
    identifying coordinated universal time (UTC) information, the UTC information being associated with a time in which the discovery message is transmitted;
    generating the discovery message including discovery information associated with a security key and security information; and
    transmitting the discovery message,
    wherein the security information is calculated based on the identified UTC information, the security key, and the discovery information.

2. The method of claim 1, further comprising:
    receiving the security key from a server.

3. The method of claim 2, wherein a unit of the UTC information is a second.

4. The method of claim 1, wherein a predetermined number of least significant bits of the UTC information are transmitted along with the discovery message.

5. A method for receiving a discovery message by a receiver in a device-to-device (D2D) communication system, the method comprising:
    receiving the discovery message including security information generated based on first coordinated universal time (UTC) information associated with a time in which the discovery message is received;
    generating second UTC information based on a predetermined number of least significant bits of the first UTC information transmitted along with the discovery message; and
    transmitting information included in the discovery message and the second UTC information to a server.

6. The method of claim 5, wherein the predetermined number of least significant bits are used for determining a nearest time to a time indicated by the first UTC information.

7. A method by a server, the method comprising:
receiving information included in a discovery message which is transmitted from a transmitter to a receiver and first coordinated universal time (UTC) information associated with a time from the receiver of a device-to-device (D2D) communication system, the discovery message being transmitted in the time; and
verifying security information included in the discovery message,
wherein the first UTC information is generated by the receiver based on a predetermined number of least significant bits of second UTC information which is transmitted from the transmitter to the receiver.

8. The method of claim 7,
wherein the security information is generated by the transmitter based on a security key which is transmitted from the server.

9. The method of claim 7,
wherein the predetermined number of least significant bits are used for determining a nearest time to a time indicated by the second UTC information.

10. A transmitter in a device-to-device (D2D) communication system for transmitting a discovery message, the transmitter comprising:
a transceiver; and
a controller coupled with the transceiver and configured to:
identify coordinated universal time (UTC) information, the UTC information being associated with a time in which the discovery message is transmitted,
generate the discovery message including discovery information associated with a security key and security information which is calculated based on the identified UTC information and the security key, and
control the transceiver to transmit the discovery message,
wherein the security information is calculated based on the identified UTC information, the security key, and the discovery information.

11. The transmitter of claim 10,
wherein the controller is further configured to control the transceiver to receive the security key from a server.

12. The transmitter of claim 11, wherein a unit of the UTC information is a second.

13. The transmitter of claim 10, wherein a predetermined number of least significant bits of the UTC information are transmitted along with the discovery message.

14. A receiver in a device-to-device (D2D) communication system for receiving a discovery message, the receiver comprising:
a transceiver; and
a controller coupled with the transceiver and configured to:
control the transceiver to receive the discovery message including security information generated based on first coordinated universal time (UTC) information associated with a time in which the discovery message is received,
generate second UTC information based on a predetermined number of least significant bits of the first UTC information transmitted along with the discovery message, and
control the transceiver to transmit information included in the discovery message and the second UTC information to a server.

15. The receiver of claim 14, wherein the predetermined number of least significant bits are used for determining a nearest time to a time indicated by the first UTC information.

16. A server, the server comprising:
a controller configured to:
control a transceiver to receive information included in a discovery message which is transmitted from a transmitter to a receiver and first coordinated universal time (UTC) information associated with a time from the receiver of a device-to-device (D2D) communication system, the discovery message being transmitted in the time, and
verify security information included in the discovery message,
wherein the first UTC information is generated by the receiver based on a predetermined number of least significant bits of second UTC information which is transmitted from the transmitter to the receiver.

17. The server of claim 16,
wherein the security information is generated by the transmitter based on a security key which is transmitted from the server.

18. The server of claim 16,
wherein the predetermined number of least significant bits are used for determining a nearest time to a time indicated by the second UTC information.

* * * * *